US006180018B1

(12) United States Patent
Miyagawa et al.

(10) Patent No.: US 6,180,018 B1
(45) Date of Patent: Jan. 30, 2001

(54) INK JET PRINTING HEAD, MANUFACTURING METHOD THEREFOR, AND INK JET PRINTING APPARATUS

(75) Inventors: Masashi Miyagawa, Yokohama; Hiroshi Sugitani, Machida; Kazuaki Masuda, Kawasaki; Masashi Kitani, Yokohama; Masami Kasamoto, Ayase, all of (JP); Toshihiro Mori, Irvine, CA (US); Shuji Koyama, Kawasaki (JP); Genji Inada, Yokohama (JP); Masaaki Okada, Sanjo (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/843,286

(22) Filed: Apr. 11, 1997

(30) Foreign Application Priority Data

| | | |
|---|---|---|
| Apr. 12, 1996 | (JP) | 8-115641 |
| Apr. 13, 1996 | (JP) | 8-115724 |
| Jun. 20, 1996 | (JP) | 8-160043 |
| Jun. 21, 1996 | (JP) | 8-161611 |

(51) Int. Cl.[7] .......... G01D 15/18
(52) U.S. Cl. .......... 216/27; 347/63; 156/257
(58) Field of Search .......... 216/27, 2, 33; 347/63; 156/257

(56) References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 5,396,042 | 3/1995 | Ishida et al. | 219/78.02 |
| 5,485,185 | 1/1996 | Sueoka et al. | 347/64 |

FOREIGN PATENT DOCUMENTS

| | | |
|---|---|---|
| 0 509 491 | 10/1992 | (EP) . |
| 0 636 480 * | 2/1995 | (EP) . |
| 0 705 703 | 4/1996 | (EP) . |
| 54-56847 | 5/1979 | (JP) . |
| 59-123670 | 7/1984 | (JP) . |
| 59-138461 | 8/1984 | (JP) . |
| 60-71260 | 4/1985 | (JP) . |
| 63-202455 | 8/1988 | (JP) . |

* cited by examiner

*Primary Examiner*—Bruce Breneman
*Assistant Examiner*—Shamim Ahmed
(74) *Attorney, Agent, or Firm*—Fitzpatrick, Cella, Harper & Scinto

(57) ABSTRACT

A method for producing an ink jet printing head comprising a substrate having plural discharge energy generating elements for generating energy to be utilized for discharging an ink and a ceiling plate of a resinous material to be joined to the substrate to constitute, between the ceiling plate and the substrate, ink paths including discharge openings for discharging the ink and plural grooves communicating with the discharge openings and formed in positions corresponding respectively to the discharge energy generating elements is provided which comprises the steps of preparing the substrate provided with the plural discharge energy generating elements, positioning and contacting the ceiling plate and the substrate in such a manner that the discharge energy generating elements are respectively positioned in the grooves, and thermally fusing the contacting portions of the ceiling plate with the substrate while pressing the substrate and the ceiling plate in the positioned state, thereby joining the substrate and the ceiling plate.

30 Claims, 54 Drawing Sheets

BEFORE HEATING
(OR IN PRESSING) →

AFTER HEATING

INK JET PRINTING HEAD, MANUFACTURING METHOD THEREFOR, AND INK JET PRINTING APPARATUS

BACKGROUND OF THE INVENTION

1. Field of the Invention

The present invention relates to an ink jet printing head for effecting printing by discharging a printing liquid (such as ink) as a flying liquid droplet and depositing such liquid droplet onto a printing medium, a manufacturing method therefor, and an ink jet printing apparatus.

The print herein includes that obtained by ink provision onto any ink receiving member capable of receiving such ink provision, including fabric, fiber, paper, sheet member etc., and the printing apparatus includes any information processing equipment or an output device thereof, and the present invention is applicable to these applications.

2. Related Background Art

In the field of the ink jet printing heads (hereinafter simply called printing heads) for effecting printing by discharging ink from a discharge opening, there is known a printing head utilizing an electrothermal transducer as the energy generating element for generating the energy required for ink discharge.

An example of such printing head is composed, as shown in FIGS. 1 and 2, of a substrate 2 (hereinafter also called heater board) provided thereon with a plurality of electrothermal transducers 1 as the energy generating elements, and a ceiling plate 6 which bears grooves 4 for forming ink paths 3 provided corresponding to the positions of the electrothermal transducers 1 and discharge openings 5.

The substrate 2 is provided thereon with a plurality of the electrothermal transducers 1 arranged in parallel manner at a predetermined pitch, and driving circuits (not shown) for driving the electrothermal transducers 1, which are formed by a semiconductor process including steps of etching, evaporation, sputtering etc., and is fixed to a support member 7. The substrate 2 is also provided, as shown in FIG. 2, with plural electrode pads 8 composed of aluminum and connected with the driving circuits of the electrothermal transducers 1. These electrode pads 8 are respectively connected, through aluminum or gold bonding wires 11, to wirings 10 of a circuit board 9 for receiving electrical signals from the recording apparatus (not shown).

On the other hand, the ceiling plate 6 is provided with a common liquid chamber 12 for temporarily holding the ink supplied from an ink tank (not shown), plural grooves 3 provided respectively corresponding to the positions of the electrothermal transducers 1 and communicating with the common liquid chamber 12, and discharge openings 5, opening on an end face of the ceiling plate 6 respectively from the ends of the grooves 3. The grooves 3 of the ceiling plate 6 constitute ink paths with the substrate 2, when the ceiling plate 6 is joined thereto.

The joining of the ceiling plate 6 with the substrate 2 is achieved in the following manner. At first the ceiling plate 6 is positioned with respect to the substrate 2 in such a manner that the electrothermal transducers 1 respectively correspond to the grooves 3, and is fixed for example with a plate spring (not shown). Then an adhesive material for temporary fixation is applied in the joining portions of the substrate 2 and the ceiling plate 6, thereby temporarily fixing the substrate 2 and the ceiling plate 6. Such adhesive material for temporary fixation is generally composed of a UV-curable polyester adhesive (for example UV300 supplied by Grace Japan Co., Ltd.). Finally, on the adhesive material for temporary fixation, there is coated resin of principally silicone family, thereby sealing the joining portions of the substrate 2 and the ceiling plate 6.

However, in the conventional ink jet printing head of such conventional configuration, since each ink path has a very small size, even a slight intrusion of the adhesive material or the sealing material causes clogging of the ink path. Such phenomenon causes insufficient or failed ink discharge in a part of the plural ink paths, thereby lowering the reliability of the ink jet printing head. For this reason, there has been desired a joining method without use of the adhesive material or the like, for the joining of the ceiling plate and the substrate in the manufacture of the ink jet printing head.

For meeting such requirement, there have been proposed methods as shown in FIGS. 3A–3C and FIGS. 4A–4E. These methods are to form the wall portion of the ink paths with a resinous material and to adjoin the substrate and the ceiling plate by the adhering force of the resinous material at the curing thereof.

FIGS. 3A–3C are cross-sectional views showing steps of a joining process by a DF (dry film) method.

In such DF method, at first a dry film 16 of a predetermined thickness is provided, as shown in FIG. 3A, on the upper surface of the substrate 2 for example by lamination. On the dry film 16, there are formed recesses for example by a photolithographic process utilizing a mask (not shown) of a predetermined pattern. The portions of the dry film 16, remaining on the substrate 2, constitute walls 17 of the ink paths as shown in FIG. 3B.

Then, as shown in FIG. 3C, the ceiling plate 6 is placed, via another dry film 18, on the substrate 2 bearing the ink path walls 17. The dry film 18 is thermally cured, and the ceiling plate 6 and the substrate 2 can be firmly joined by the adhesive force at the curing.

FIGS. 4A–4E are cross-sectional views showing steps of a joining process by a so-called molding method.

In the molding method, a resist layer 20 of a predetermined thickness is at first provided, as shown in FIG. 4A, on the upper surface of the substrate 2.

Then the resist layer 20 is subjected to a photolithographic process utilizing a mask (not shown) of a predetermined pattern, whereby portions corresponding to the ink paths remain as a mold 21 for the ink path formation.

Then, as shown in FIG. 4C, a resin layer 22 for forming the walls of the ink paths is formed on the substrate 2 and the mold 21.

Then the ceiling plate 6 is placed, via the resin layer 22, on the substrate 2. The resin layer 22 is thermally cured, and the ceiling plate 6 and the substrate 2 can be firmly joined by the adhesive force at the curing. Finally the face of the discharge openings is cut, and the resist constituting the mold is dissolved out for example with a solvent, thereby forming nozzles.

However, such DF method or molding method, though being capable of avoiding the clogging of the ink paths because of the absence of adhesive material, requires a patterning step in the joining, necessitating the use of an expensive exposure apparatus or the like.

For this reason, there has been desired a less expensive joining method.

For meeting such requirement, there is already known a joining method of mutually positioning the substrate bearing the energy generating elements and the ceiling plate provided with the ink paths and the discharge openings, and then fixing the ceiling plate and the substrate with a pressing spring.

FIG. 5 is an exploded perspective view of an ink jet unit including an ink jet printing head, for explaining the above-mentioned joining method for the ceiling plate and the substrate, utilizing the pressing spring.

In FIG. 5 there are shown a substrate 2 constituting a heater board, consisting of an array of plural electrothermal transducers (discharge heaters) 1 and electrical wirings such as of Al or the like for electric power supply thereto formed by a film forming process on a Si substrate, and a circuit board 9 for the heater board 2.

A grooved ceiling plate 6, provided with partitions (grooves) for separating the plural ink paths and a common liquid chamber for holding ink for supply to the ink paths, is integrally molded with an orifice plate 6a provided with plural discharge openings respectively corresponding to the ink paths. As a material for such integral molding there is preferably employed polysulfone resin, but other resinous materials for molding may also be utilized.

A support member 24, composed for example of a metal, supports the rear surface of the circuit board 9 in flat manner and constitutes the base plate of the ink jet unit. A pressing spring 25, constituting a pressing member, has an M-shaped form, and lightly presses the common liquid chamber by the central portion of the M-shaped form and also presses, in concentrated in linear areas, a part of the ink paths, preferably a part close to the discharge openings, by a hanging front portion 26. The legs of the pressing spring 25 pass through holes 24*a*, 24*b* of the support member 24 and engage with the rear face thereof to support the heater board 2 and the ceiling plate 6 therebetween in a mutually engaged state, and the heater board 2 and the ceiling plate 6 are pressed and fixed by the concentrated biasing force of the pressing spring 25 and the hanging front portion 26 thereof. An ink supply member 27 supplies the ink, fed from an unrepresented ink tank, to the ink paths of the heater board 2 through the ceiling plate 6 fixed thereto under pressure.

The above-explained joining method for the ceiling plate and the substrate by the pressing spring provides an advantage of easily achieving the aforementioned joining without the adhesive material, since the pressing is executed in a direction perpendicular to the surface of the substrate by means of the pressing spring.

It is however difficult, in such joining, to press the walls of the plural ink paths, formed between the ceiling plate and the substrate, against the substrate under a uniform pressure. For this reason, particularly in an ink jet printing head with a large number of the ink paths, there may result a gap C, as shown in FIG. 6, between the substrate 2 and an end portion of the ink path wall 3*a*, and such gap C results in a crosstalk phenomenon. Such crosstalk may lead to a pressure loss where the pressure of the film bubbling B, generated in the ink in the ink path 3 by the thermal energy from the heat generating member 1, leaks to an adjacent ink path (as indicated by the arrow in FIG. 6). Also because of the presence of such gap C, the pressure of the film bubbling B may propagate to the adjacent ink path, thereby inducing a retraction of the ink meniscus at the discharge opening (orifice) of such adjacent ink path toward the heat generating member and causing a fluctuation in the ink discharge amount.

In FIG. 6 there are also shown an anticavitation film 30, a protective film 31, and an interlayer insulation film 32.

The above-mentioned crosstalk is an extremely serious drawback in the ink jet printing head, and the prevention of such crosstalk is an important requirement.

SUMMARY OF THE INVENTION

An object of the present invention is to provide an ink jet printing head with highly reliable joining, capable of securely preventing the crosstalk phenomenon between the ink paths, that may be encountered in the conventional joining method for the substrate and the ceiling plate, and a manufacturing method for such ink jet printing head.

Another object of the present invention is to provide an ink jet printing apparatus capable of printing operation by ink discharge with the ink jet printing head mentioned above.

For attaining the above-mentioned objects, the present invention includes the following embodiments.

According to an embodiment, there is provided a method for producing an ink jet printing head comprising:

a substrate having plural discharge energy generating elements for generating energy to be utilized for discharging an ink; and a ceiling plate of a resinous material to be joined to the substrate to constitute, between the ceiling plate and the substrate, ink paths including discharge openings for discharging the ink and plural grooves communicating with the discharge openings and formed in positions corresponding respectively to the discharge energy generating elements, the method comprising steps of:

preparing the substrate provided with the plural discharge energy generating elements;

positioning and contacting the ceiling plate and the substrate in such a manner that the discharge energy generating elements are respectively positioned in the grooves; and thermally fusing the contacting portions of the ceiling plate with the substrate while pressing the substrate and the ceiling plate in the positioned state, thereby joining the substrate and the ceiling plate.

According to another embodiment, there is provided a method for producing an ink jet printing head comprising:

a substrate having plural discharge energy generating elements for generating energy to be utilized for discharging an ink; and a ceiling plate of a resinous material to be joined to the substrate to constitute, between the ceiling plate and the substrate, ink paths including discharge openings for discharging the ink and plural grooves communicating with the discharge openings and formed in positions corresponding respectively to the discharge energy generating elements, the method comprising steps of:

preparing the substrate provided with plural joining heat generation members in positions different from the positions for arranging the plural discharge energy generating elements and corresponding to joining portions of the ceiling plate; and joining the substrate and the ceiling plate by the heat generated from the joining heat generation members while the joining portions of the ceiling plate are maintained in contact with the positions of the joining heat generation members of the substrate.

According to still another embodiment, there is provided a method for producing an ink jet printing head comprising:

a substrate having plural discharge energy generating elements for generating energy to be utilized for discharging an ink; and a ceiling plate of a resinous material to be joined to the substrate to constitute, between the ceiling plate and the substrate, ink paths including discharge openings for discharging the ink and plural grooves communicating with the discharge openings and formed in positions corresponding respectively to the discharge energy generating elements, the method comprising steps of:

preparing the ceiling plate provided with a joining portion including two or more faces mutually constituting a step difference, at least until joining, with respect to the joining direction with the substrate;

preparing the substrate provided with heat generation members corresponding to the two or more faces of the joining portion of the ceiling plate; and respectively heating and fusing the two or more faces of the joining portion of the ceiling plate by the heat generated from the joining heat generation members while the joining portions of the ceiling plate are maintained in contact with the joining heat generation members of the substrate, thereby joining the substrate and the ceiling plate.

According to still another embodiment, there is provided a method for producing an ink jet printing head comprising a substrate having discharge energy generation means for discharging a liquid droplet, and a grooved plate to be superposed with a surface, bearing the discharge energy generation means, of the substrate and provided with nozzle walls surrounding the discharge energy generation means, by mutually joining the end portions of the nozzle walls of the grooved plate with a surface, bearing the discharge energy generation means, of the substrate, the method comprising the steps of:

forming a resin layer, on a surface, bearing the discharge energy generation means, of the substrate, in positions where the end portions of the nozzle walls are to be superposed;

forming a cover layer, covering the resin layer, on the surface of the surface bearing the discharge energy generation means;

removing a part of the cover layer in a shape corresponding to the faces of the end portions of the nozzle walls, thereby exposing the resin layer; and thermally fusing the resin layer while the end portions of the nozzle walls are pressed to the exposed resin layer, thereby causing the resin, constituting the resin layer, to be present between the end portions of the nozzle walls and the cover layer.

According to still another embodiment, there is provided a method for producing an ink jet printing head comprising a substrate having discharge energy generation means for discharging a liquid droplet, and a grooved plate to be superposed with a surface, bearing the discharge energy generation means, of the substrate and provided with nozzle walls surrounding the discharge energy generation means, by mutually joining the end portions of the nozzle walls of the grooved plate with a surface, bearing the discharge energy generation means, of the substrate, the method comprising the steps of:

forming joining resin layers of an area larger than an area of the end faces of the nozzle walls, on a surface, bearing the discharge energy generation means, of the substrate, in positions where the end portions of the nozzle walls are to be superposed;

forming a cover layer, covering the resin layer, on the surface of the surface bearing the discharge energy generation means;

removing a part of the cover layer in a shape corresponding to the faces of the end portions of the nozzle walls, thereby exposing a part of each of the joining resin layers; and heating the exposed portions of the joining resin layers and the end portions of the nozzle walls in a mutually contacted state thereof, thereby joining the joining resin layers and the end portions of the nozzle walls.

According to still another embodiment, there is provided a method for producing an ink jet printing head comprising a substrate having discharge energy generation means for discharging a liquid droplet, and a grooved plate to be superposed with a surface, bearing the discharge energy generation means, of the substrate and provided with nozzle walls surrounding the discharge energy generation means, by mutually joining the end portions of the nozzle walls of the grooved plate with a surface, bearing the discharge energy generation means, of the substrate, the method comprising the steps of:

forming built up layers of an area greater than an area of the end faces of the nozzle walls, on a surface, bearing the discharge energy generation means, of the substrate, in positions where the end portions of the nozzle walls are to be superposed;

forming a cover layer, covering the built up layers, on the surface of the surface bearing the discharge energy generation means;

removing a part of the cover layer in a shape corresponding to the faces of the end portions of the nozzle walls, thereby forming engaging windows exposing a part of each of the built up layers;

removing the built up layers in the cover layer through the engaging windows; and pressing the end portions of the nozzle walls into the cover layer through the engaging windows and expanding the end portions of the nozzle walls with plastic deformation in the cover layer.

According to still another embodiment, there is provided a method for producing an ink jet printing head comprising a substrate having discharge energy generation means for discharging a liquid droplet, and a grooved plate to be superposed with a surface, bearing the discharge energy generation means, of the substrate and provided with nozzle walls surrounding the discharge energy generation means, by mutually joining the end portions of the nozzle walls of the grooved plate with a surface, bearing the discharge energy generation means, of the substrate, the method comprising the steps of:

forming resin layers of an area greater than an area of the end faces of the nozzle walls, on a surface, bearing the discharge energy generation means, of the substrate, in positions where the end portions of the nozzle walls are to be superposed;

forming a cover layer, covering the resin layers, on the surface of the surface bearing the discharge energy generation means;

removing a part of the cover layer in a shape corresponding to the faces of the end portions of the nozzle walls, thereby forming engaging windows exposing a part of each of the resin layers; and pressing the end portions of the nozzle walls into the resin layers through the engaging windows and thermally fusing the resin layer, thereby expanding the end portions of the nozzle walls with plastic deformation in the cover layer and causing the resin constituting the resin layers to enter between the end portions of the nozzle walls and the cover layer.

According to still another embodiment, there is also provided an ink jet printing head comprising a substrate having plural discharge energy generation elements for generating energy to be utilized for discharging an ink, and a ceiling plate to be joined to the substrate and to form, between the ceiling plate and the substrate, ink paths including discharge openings for discharging the ink and plural grooves communicating with the discharge openings and formed in positions respectively corresponding to the discharge energy generating elements, wherein the substrate comprises heat generation members for joining in positions, different from the positions having provided the plural discharge energy generating elements and corresponding to the joining portions of the ceiling plate with respect to the substrate.

DESCRIPTION OF THE PREFERRED EMBODIMENTS

Now the present invention will be clarified in detail by preferred embodiments, with reference to the attached drawings. In such embodiments, components equivalent to those in the above-explained drawings will be represented by corresponding numbers and will not be explained further.

Embodiment 1

Figure 7:
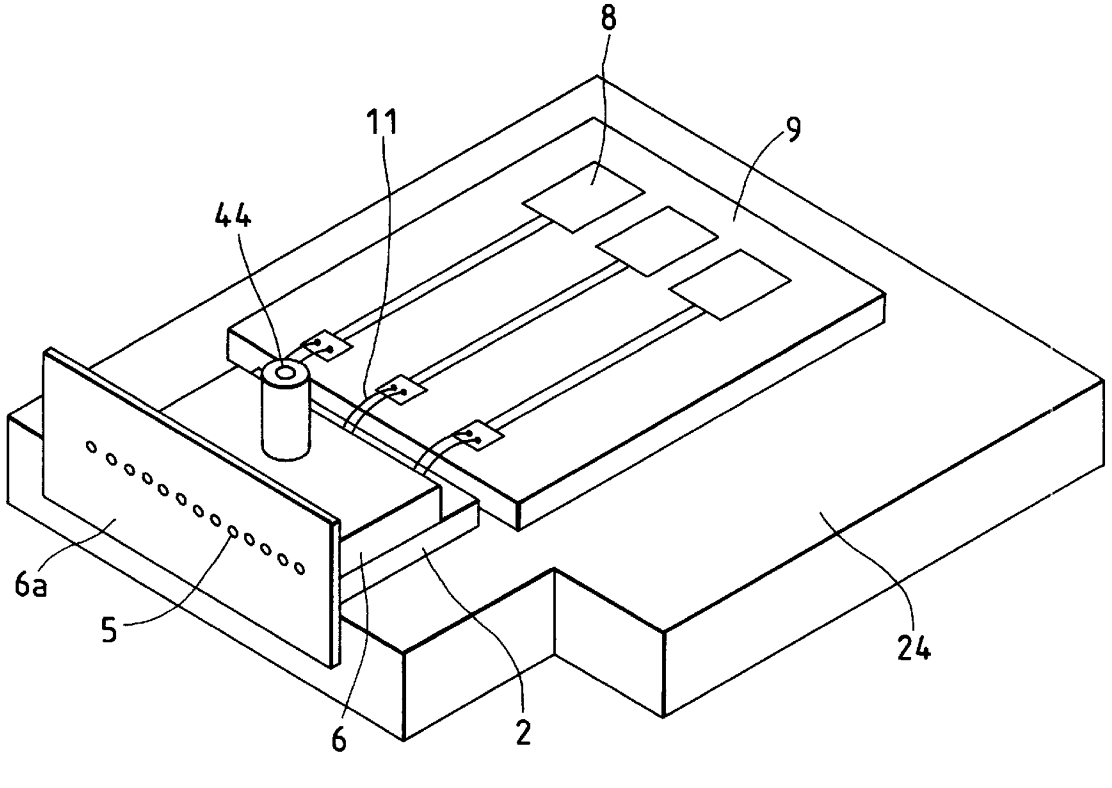
FIG. 7 is a perspective view showing a basic embodiment of the ink jet printing head of the present invention.
Figure 8A:
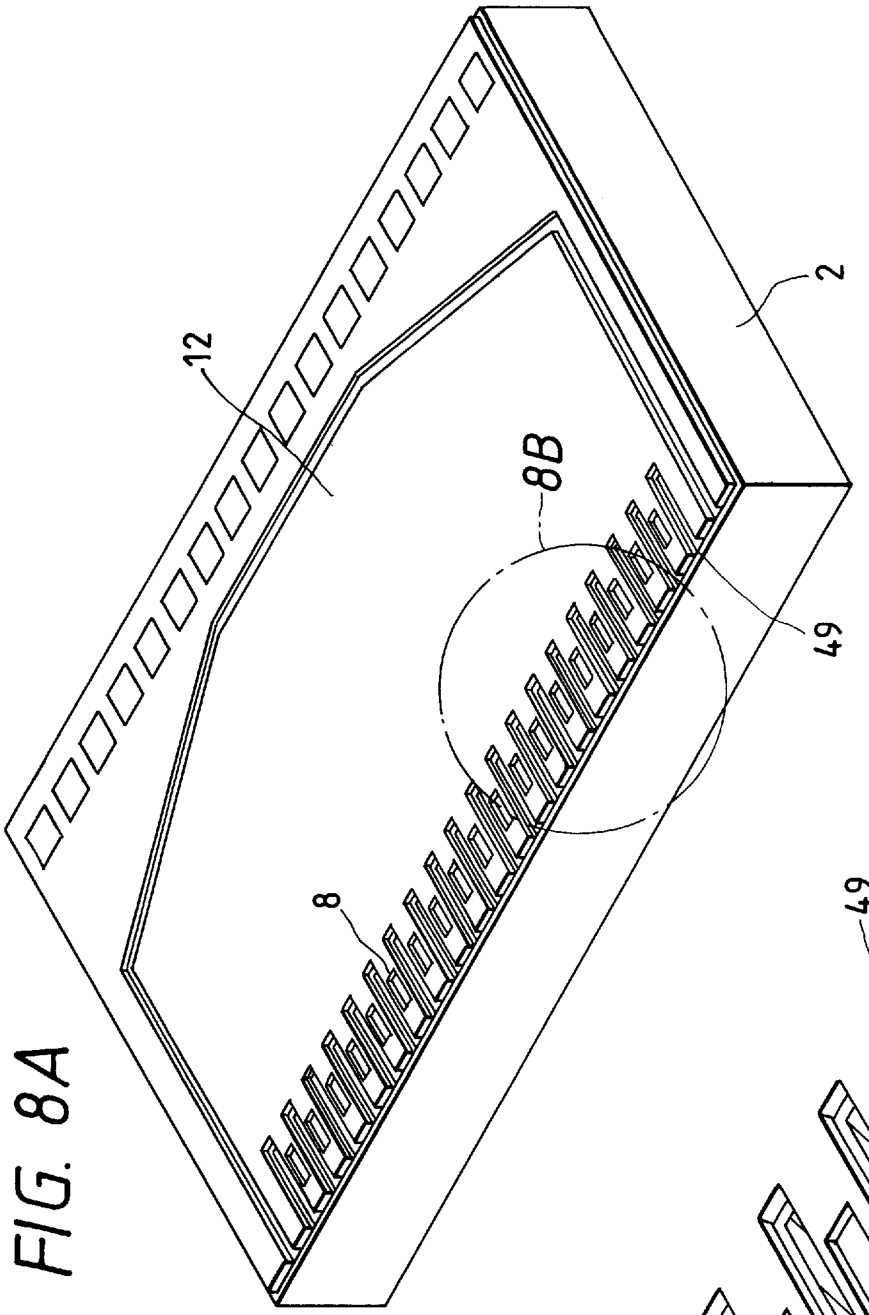
FIG. 8A is a magnified perspective view of the substrate, constituting a principal part in the printing head shown in FIG. 7.
Figure 8B:
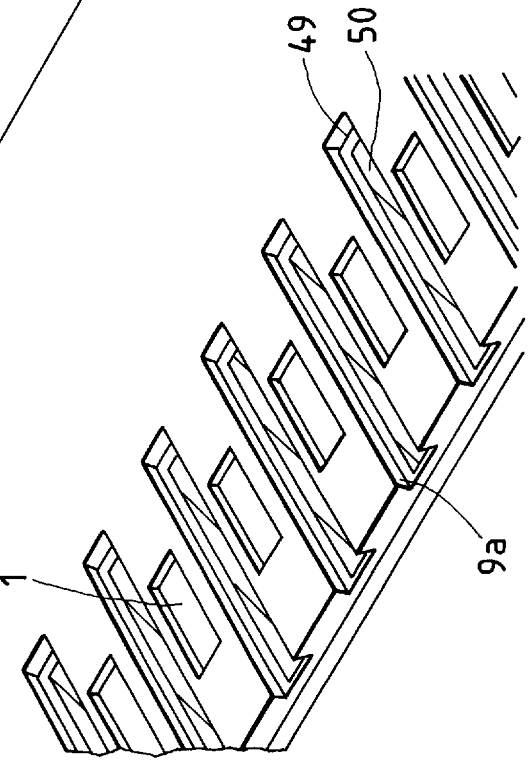
FIG. 8B is a magnified perspective view of a portion 8B in FIG. 8A.

FIG. 7 is a perspective view of an embodiment of the ink jet printing head of the present invention. FIGS. 8A is a magnified perspective view of a substrate, constituting the principal part in the printing head shown in FIG. 7, and FIG. 8B is a magnified perspective view of a portion 8B in FIG. 8A. In these drawings, a substrate 2 is composed for example of silicon, and, on the substrate 2, there is placed a ceiling plate 6 provided with an orifice plate in which plural ink discharge openings (also called orifices) 5 for ink discharge are formed. The substrate 2 is provided thereon, along a lateral edge thereof, with an array of plural ink discharge heaters 1, arranged with a predetermined pitch and constituting discharge energy discharge members for generating the thermal energy for ink discharge. On the substrate 2 and between such ink discharge heaters 1, there are formed joining grooves 49 also with a predetermined pitch, and a joining heater 50 is provided on the bottom of each of the grooves 49. The spaces between the grooves 49 will constitute, at the joining of the substrate 2 and the ceiling plate 6, parts of ink paths (also called nozzles) which communicate with the orifices 5 and which are also connected, at the rear ends thereof, to a common liquid chamber as shown in FIG. 8. The common liquid chamber 12 is connected, as shown in FIG. 7, to an unrepresented ink container through an ink supply portion 44 protruding on the ceiling plate 6. Such substrate 2 is placed on a base plate 24 composed for example of aluminum and serving also as a heat dissipating plate by an adhesive material of satisfactory thermal conductivity, and is also connected, by means of bonding wires 11, to a wiring portion such as contact pads 8 formed on a circuit board 9, which is likewise placed on the base plate 24.

The lateral wall portions 9*a* of the grooves 49 on the substrate 2 are inversely tapered or formed in an overhanging shape as shown in FIG. 8, so that the aperture of each groove 49 is made narrower than the bottom area thereof.

Such overhanging or inversely tapered groove 49 can be prepared by forming a groove forming layer having grooves of an overhanging structure. The grooves of such overhanging structure can be obtained in general by forming a groove forming layer by a vacuum film formation, then forming a resist pattern on such layer, and effecting dry etching or chemical etching. In case of dry etching, the overhanging structure can be obtained by elevating the pressure of the etching gas, thereby reducing the anisotropy of etching. In case of chemical etching, the overhanging structure can be obtained since the etching process is basically isotropic.

The film material, to be employed for forming the groove forming layer for forming the grooves of the overhanging structure, is preferably provided with a high ink resistance and allowing easy film formation. An example of the resin meeting such requirements is silicone polymer. Such polymer, being soluble in organic solvents and spin coatable, allows easy film formation and is highly resistant to the alkaline inks. The general siloxane resins are liquid at the normal temperature, but the polydiphenylsiloxane resins and the ladder silicone resins, being solid at the normal temperature, are also applicable in the present invention.

In addition to polydiphenylsiloxanes, there may also be employed polymethylsilsesquioxanes, polyethylsilsesquioxanes, polyphenylsilsesquioxanes. These silicone resins, being soluble in organic solvents such as esters and ketones, can be easily formed into a film by spin coating. Also the silicone polymers, generally containing unreacted hydroxyl radicals at the end of polymer chains, can be crosslinked by a heat treatment at 200–400° C. after coating. There may also be obtained a silicon oxide film by liberating the hydrocarbon radicals such as methyl or ethyl, by a heat treatment at 400–500° C.

The silicone films mentioned above can be easily worked by forming and patterning a photoresist thereon and effecting dry or chemical etching. The dry etching can be achieved with gas such as $CF_4$ or $C_3H_8$. The A grooves of the overhanging structure can be formed by an etching operation at a pressure of 50 Pa or higher, for reducing the anisotropy of the etching. The chemical etching can be achieved with an etching liquid containing hydrofluoric acid. However, since such etching liquid also etches silicon oxide or silicon nitride which is generally employed for the protective film, there should be employed a protective film resistant to the etchant. A protective film with satisfactorily high selectivity can be obtained most preferably with a polyimide polymer. Examples of such film forming polyimide polymer include PIQ (trade name; manufactured by Hitachi Chemical Co.), Photonice (trade name; manufactured by Toray Corp.), and PIMEL (trade name; manufactured by Asahi Chemical Co.)

Also organic polymer compounds can be used as the material for forming the overhanging grooves. There may be employed any polymer compounds that can be dissolved in a solvent and spin coated, but polysulfones, polyethersulfones and polyetheretherketones (PEEK) are preferred in consideration of the high ink resistance. Also, as the thermosetting resins, epoxy resins and polydialiphthalate resins can be advantageously employed. The grooves of the overhanging structure can be patterned on the polymer film by forming thereon a mask pattern with a material resistant to oxygen plasma and effecting dry etching with oxygen plasma. The simplest patterning method consists of patterning a silicone-type photoresist by a photolithographic process and effecting dry etching, utilizing thus obtained pattern as a mask. Examples of the silicone-type photoresist include CMS (trade name; manufactured by Toso Co.) and FH-SP (trade name; manufactured by Fuji-Hunt Co.) In particular, FH-SP enables easy preparation of the silicone-type mask pattern, since it can be patterned with an ordinary exposure apparatus and can be developed with an alkaline developing liquid.

The dry etching can be achieved by reactive ion etching (RIE) utilizing oxygen plasma. For forming the overhanging structure, it is preferably conducted at a pressure of 20 Pa or higher, and is preferably conducted for a period corresponding to an overetching of 10–50%, with respect to the just etching. In the present invention, since the etching is conducted with oxygen plasma, the underlying protective or anticavitation film can be composed of silicon oxide, silicon nitride or tantalum.

The substrate bearing the electrothermal transducers is generally provided, in the areas where the heaters and the wirings such as of aluminum are not arranged,.with a protective film of silicon nitride and a tantalum film as an anticavitation film on a heat accumulating layer of silicon oxide. Thus a satisfactory overhanging structure can be obtained by etching the tantalum film by wet etching with a mixture of hydrofluoric acid and nitric acid or by dry etching with fluorine-containing gas, and then wet etching the silicon oxide film or the silicon nitride film with a mixture of hydrofluoric acid and ammonium fluoride. In the space between the heaters, there can be secured an area for preparing the above-mentioned overhanging structure, by forming the wirings such as of aluminum under the heater.

In the following there will be explained the joining of the substrate 2 and the ceiling plate 6, with reference to FIGS. 9 and 10.

Figure 9:
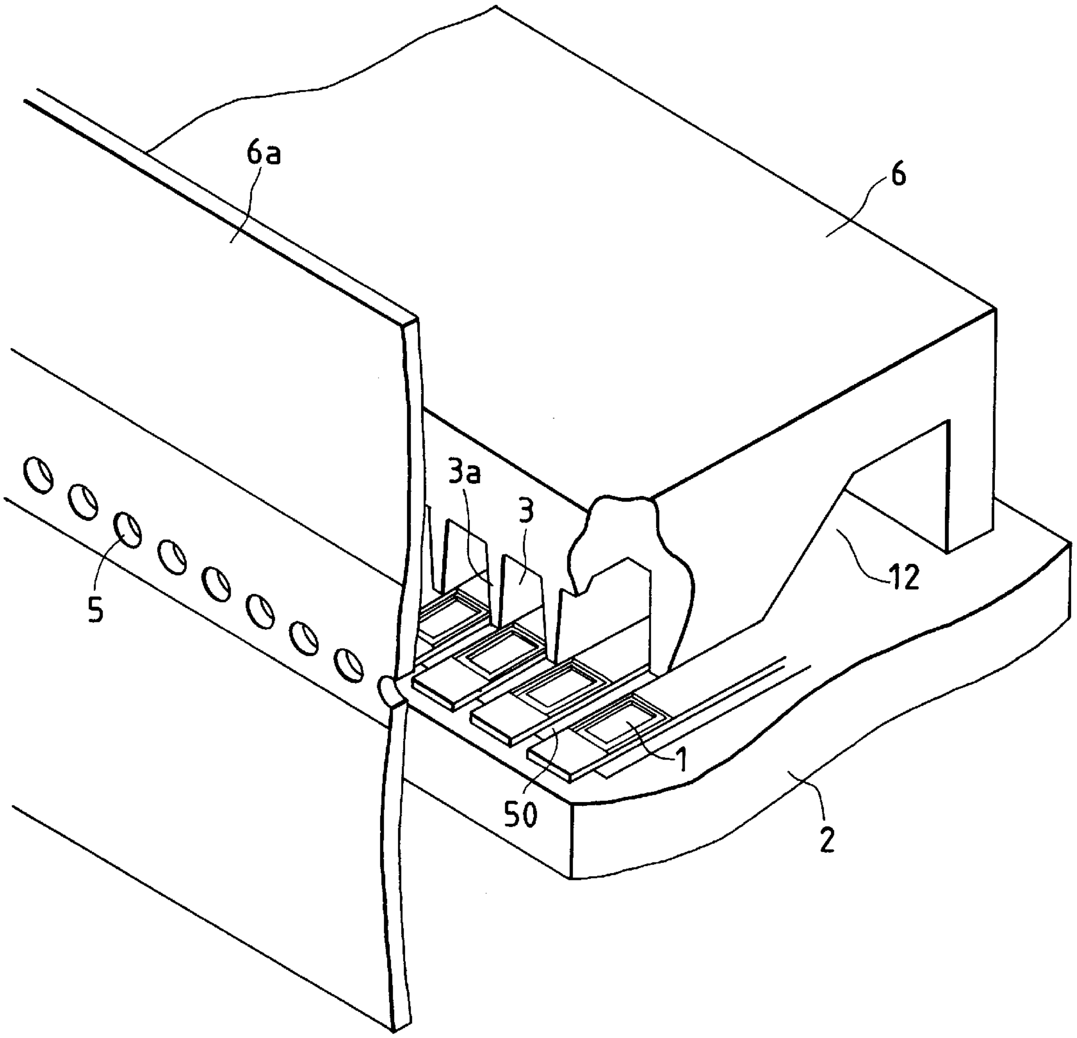
FIG. 9 is a schematic perspective view showing the joining method of the substrate and the ceiling plate in the printing head shown in FIGS. 7, 8A and 8B.
Figure 10:
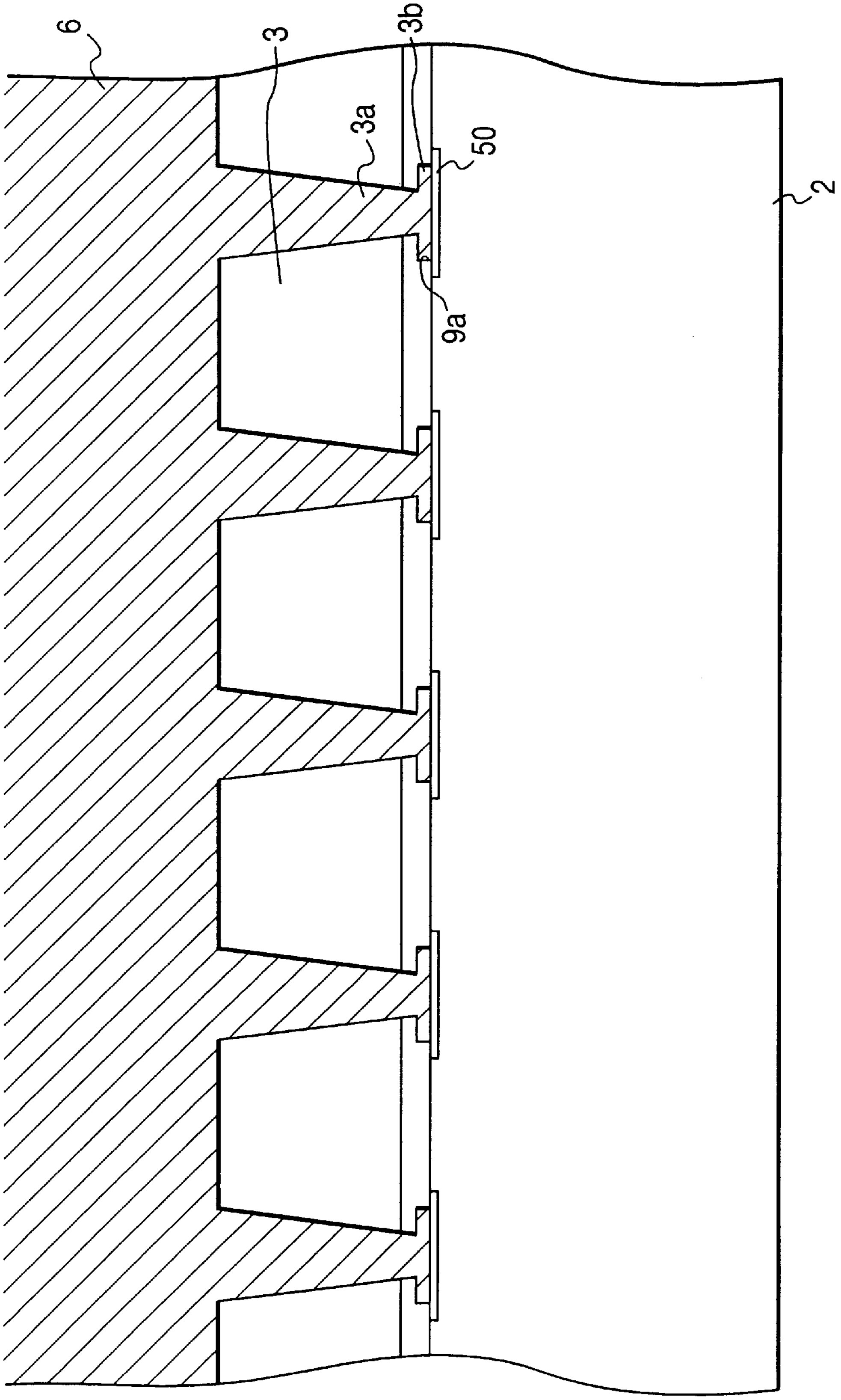
FIG. 10 is schematic cross-sectional view showing the joined state of the substrate and the ceiling plate shown in FIG. 9.

FIG. 9 is a schematic perspective view for explaining the joining method of the substrate and the ceiling plate in the printing head shown in FIGS. 7, 8A and 8B, and FIG. 10 is a schematic cross-sectional view showing the joined state of the substrate and the ceiling plate shown in FIG. 9.

The ceiling plate 6, or so-called grooved ceiling plate, is provided on the lower face thereof with a plurality of ink paths 3 corresponding to the ink discharge heaters 8 on the substrate 2, and such ink paths are mainly formed by ink path walls 3*a* provided at a predetermined pitch. The lower ends of the ink path walls 3*a* have such a shape and a size as to be fitted into the grooves 49 of the substrate 2 when the ceiling plate 6 is joined to the substrate 2.

The lower ends of the ink path walls 3*a* are fitted into the grooves 49 of the substrate 2, by pressing under a pressure of 400 g to 1 kgw. In such fitted state or prior to such fitting, the joining heaters 50 in the grooves 49 of the substrate 2 are energized and actuated. The energization is effected by pulsed current supply, for example for a period of 20 seconds under conditions of a current of 200 mA, a pulse width of 10 $\mu$sec and a frequency of 5 kHz, whereby substantially the lower end portions alone of the ink path walls 3*a* fitted into the grooves 49 are heated, fused and partially deformed. The above-mentioned energizing conditions are selected because of the following reason. If the power is continuously supplied for 1 second, the heater 50 breaks so that the lower end portion of the ink path wall cannot be fused and the required joining force cannot be obtained. On the other hand, if a material capable of withstanding such continuous power supply, the breakage of the heater can naturally be prevented even under continuous power supply, but the temperature of the entire silicon substrate becomes elevated so that the entire ink path wall becomes fused and the shape thereof cannot be well maintained. For this reason, the joining heater 50 is driven by pulsed power supply.

Figure 6:
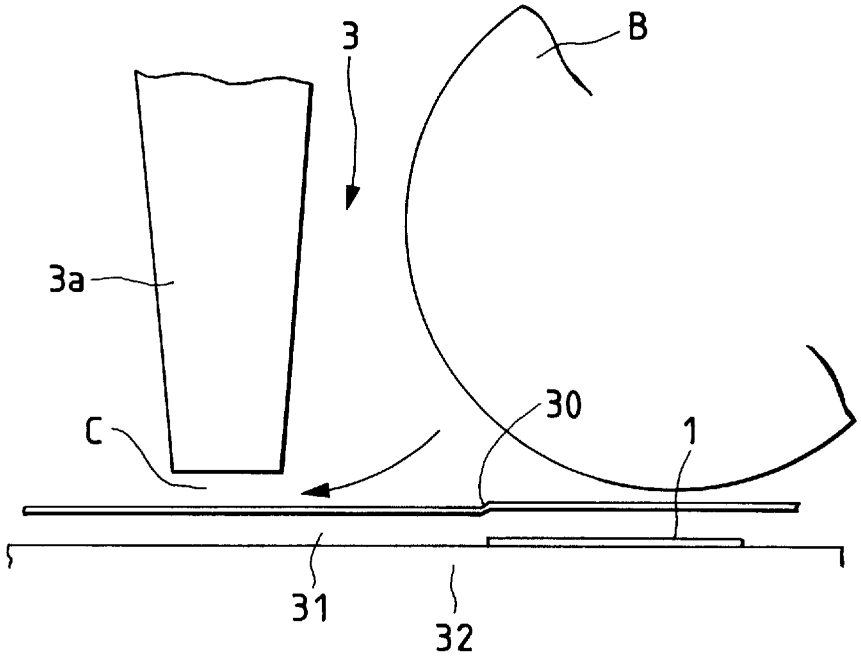
FIG. 6 is a cross-sectional view showing a state of pressure loss in the film bubbling in a conventional ink jet printing head.

As the fused lower end portions of the ink path walls 3*a*, obtained by heating with the joining heaters 50, are cooled in a state filled in the grooves 49, they solidify integrally with the grooves 49 of the substrate 2, in a form close to the overhanging form of the groove walls 9*a*. In the present embodiment, thus solidified portion constitute a laterally protruding portion 3b in a direction along the upper surface of the joining heater 50. Such joining of the ceiling plate 6 and the substrate 2 by the formation of the lateral protrusions 3*b* in the grooves 49 avoids the formation of the gap C between the ink path walls 3*a* and the substrate as shown in FIG. 6, thereby securely preventing the crosstalk between the ink paths 3.

In the present embodiment, the joining heaters 50 are formed by a predetermined film forming process on the silicon substrate 2, then the groove forming layer 51 is formed on the entire area of the silicon substrate 2, including the areas of the heaters 50, and the grooves 9 are formed by removing, from the groove forming layer 51, the areas just on the joining heaters 50 by a photolithographic process. In order to form an overhanging structure in the interior of the groove 9 as in the present embodiment, the upper and lower parts of the groove forming layer 51 are preferably given different properties, so as to make the etched amount larger and smaller respectively in the lower and upper parts. Also the inversely tapered structure can be obtained in the interior of the groove 9 by providing the groove forming layer 51 with a stacked structure thereby stepwise varying the property from the upper part to the lower part.

Basically, the joining heater 50 can be composed of the same material as that of the ink discharge heaters 1. For example, there can be employed thin films such as of $HfB_2$, TaN or TaAl. Also the groove forming layer is composed, for example, of SiN or $SiO_2$, and is formed by the same semiconductor process as that for the silicon substrate.

Embodiment 2

Figures 11A, 11B:
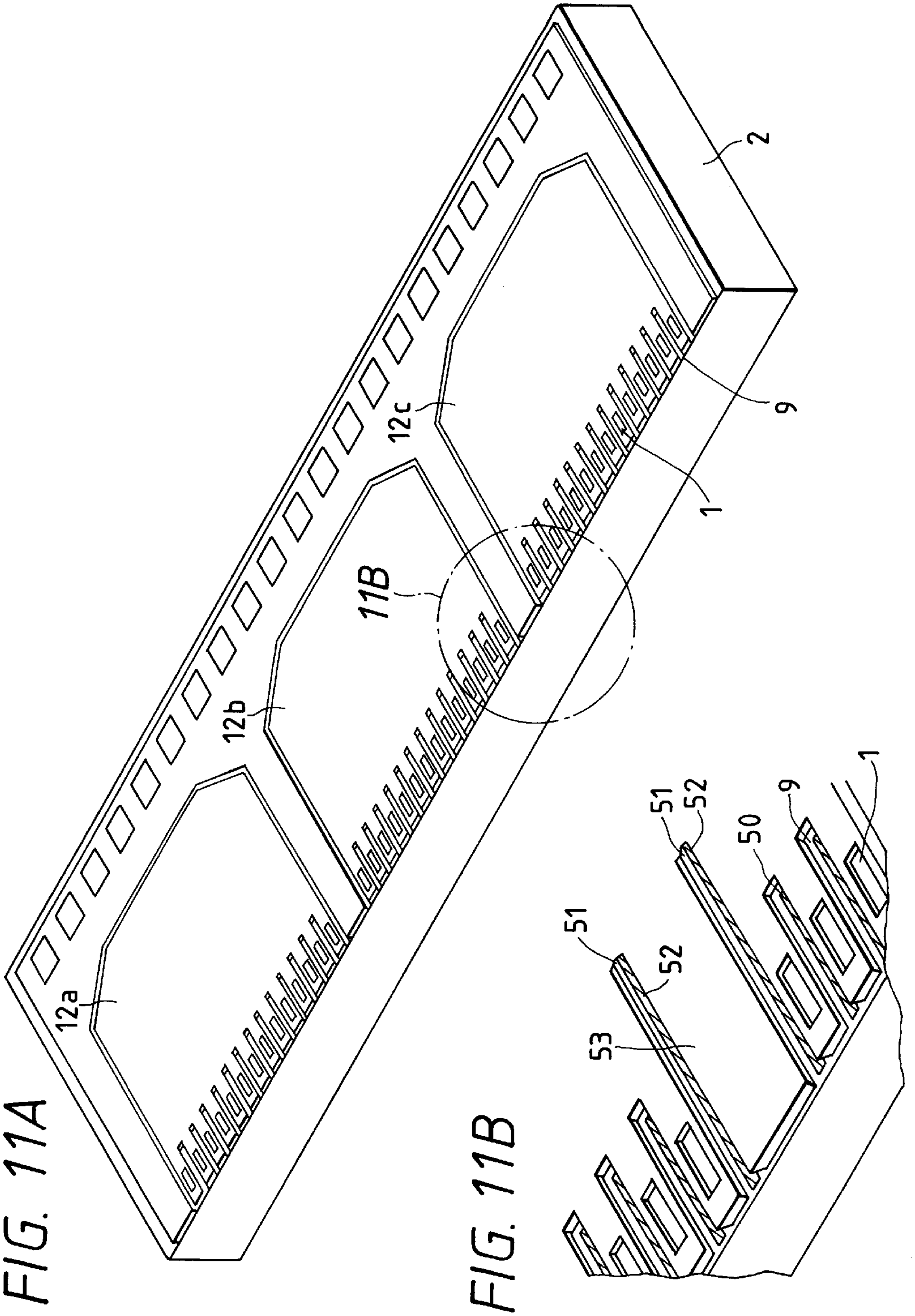
FIG. 11A is a magnified perspective view of the principal part in another embodiment of the ink jet printing head of the present invention.
FIG. 11B is a magnified perspective view of a portion 11B in FIG. 11A.
Figure 12:
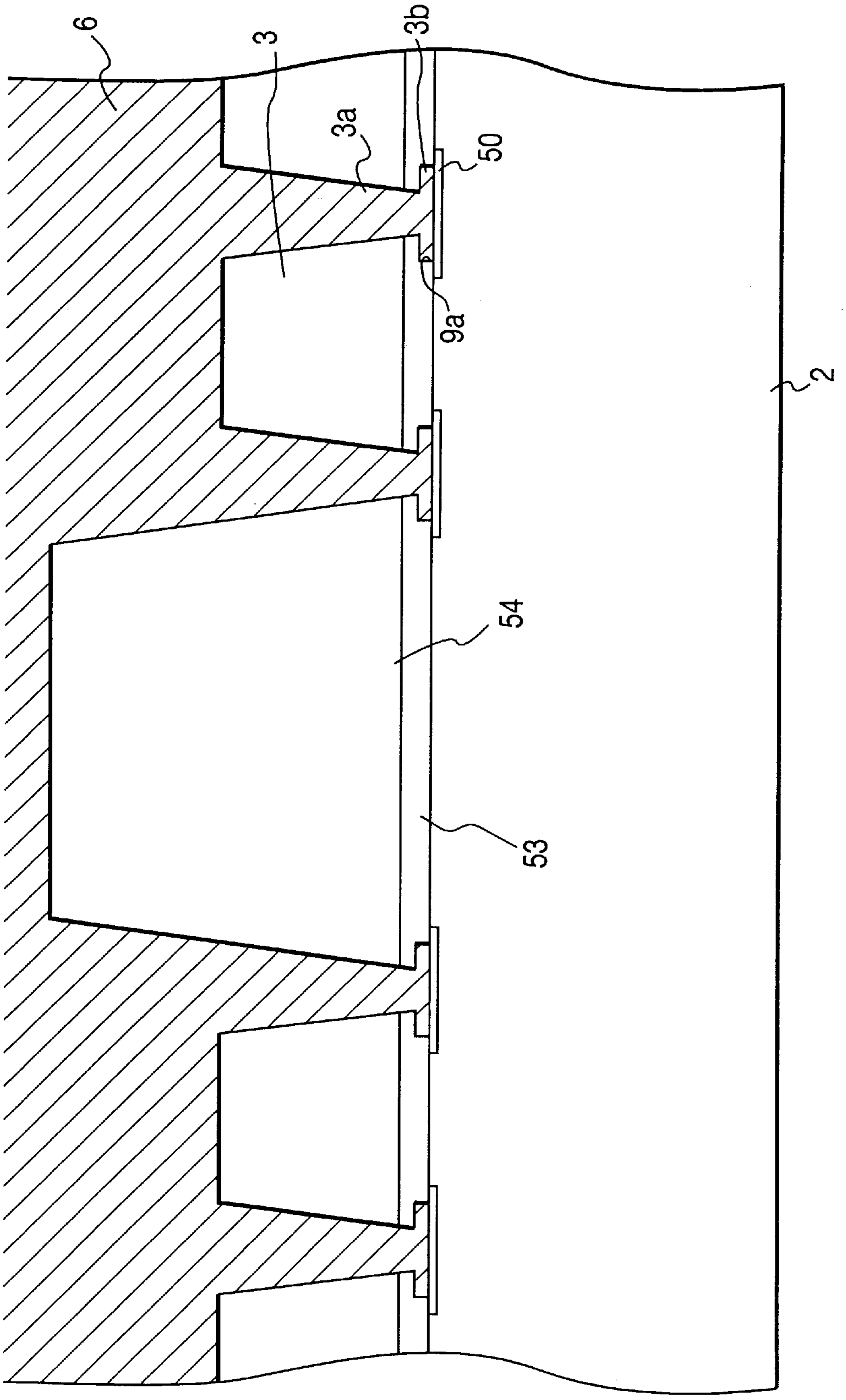
FIG. 12 is a schematic cross-sectional view showing the joined state of the substrate and the ceiling plate in the printing head shown in FIGS. 11A and 11B.

FIG. 11A is a perspective view showing the principal part of another embodiment of the ink jet printing head of the present invention, while FIG. 11B is a magnified perspective view of a portion Y in FIG. 11A, and FIG. 12 is a schematic cross-sectional view showing the joined state of the substrate and the ceiling plate in the printing head shown in FIGS. 11A and 11B.

In the printing head of the present embodiment, the ink discharge heaters 1 arranged in an array on the substrate 2 are divided into three groups as shown in FIG. 11A, and the heaters 1 of these groups are respectively connected to common liquid chambers 12*a*, 12*b*, 12*c*. Between the common liquid chambers, the substrate 2 is provided with separating grooves 51 as shown in FIG. 11B, and a joining heater 52 is provided on the bottom of each separating groove 51. An area 53 between the adjacent common liquid chambers on the substrate 2 is formed as a flat area, and a corresponding portion on the ceiling plate 6 is formed as a recess 54 in order to form a gap of a predetermined size on such area 53. This gap is provided for heat dissipation from the joining heaters 51, for forming joining portions of the ceiling plate 6 to be fitted into the separating grooves 51, and for reducing the weight of the entire printing head including the ceiling plate.

In the present embodiment, the ink paths containing the ink discharge heaters 1 are divided into three groups so that the joining area or distance can be made larger. It is therefore rendered possible to achieve joining with a uniform joining force over the entire head, and to securely prevent the crosstalk between the ink paths or between the common liquid chambers even in a printing head with a large number of ink paths. Also the joining for each common liquid chamber provides a constant joining strength, so that the conventional spring member is no longer required for pinching the ceiling plate and the substrate. It is therefore rendered possible to reduce the number of the components and to dispense with the sealing step with resin between the common liquid chambers. Because of the absence of the sealing step with resin, the distance between the common liquid chambers can be made smaller, so that width of the substrate can be made narrower. It is therefore rendered possible to increase the number of substrates obtainable from a silicon wafer, thereby providing the printing head less expensively.

Embodiment 3

FIGS. 13, 14A to 14D, 15 and 16A to 16H show an embodiment of the manufacturing process for the ink jet printing head of the present invention, and the joining method therefor, by fused joining without the adhesive layer.

Figure 13:
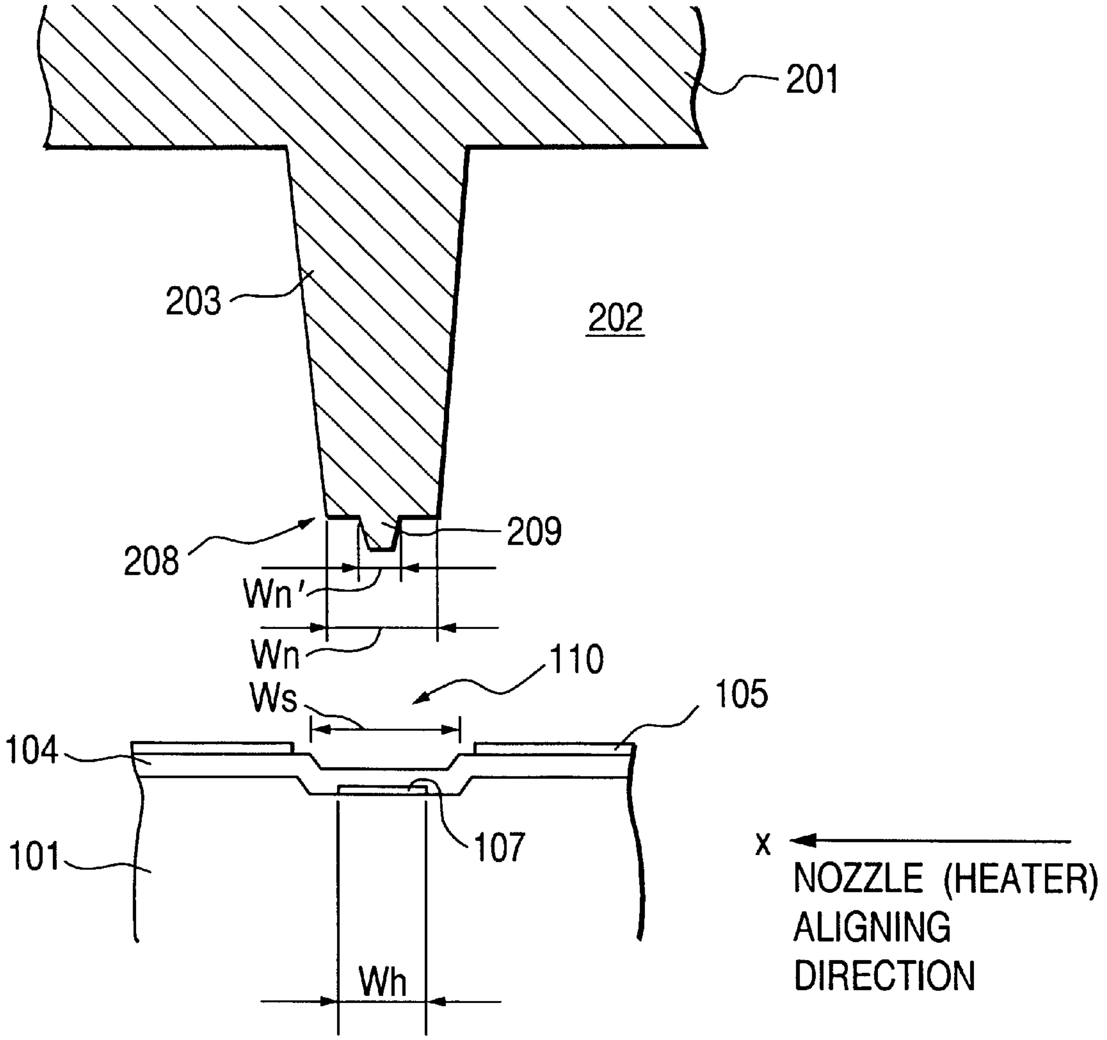
FIG. 13 is a schematic cross-sectional view showing the joined state of the ceiling plate and the substrate of the printing head.
Figure 14A:
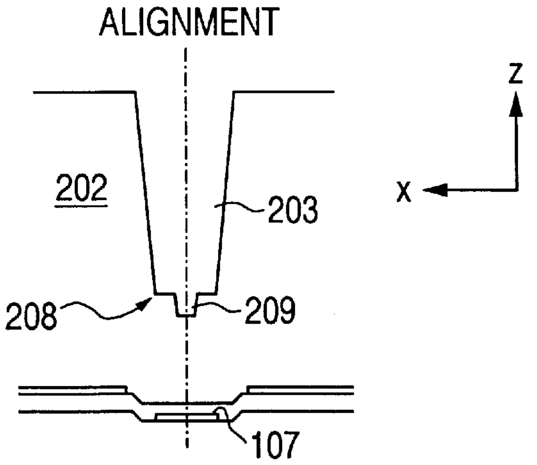
FIGS. 14A, 14B, 14C and 14D are schematic cross-sectional views showing steps of joining of the ceiling plate and the substrate shown in FIG. 13.
Figure 14B:
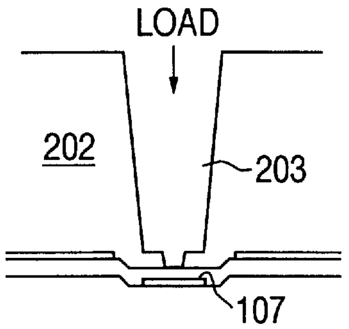
Figure 14C:
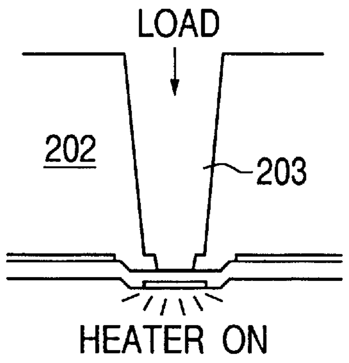
Figure 14D:
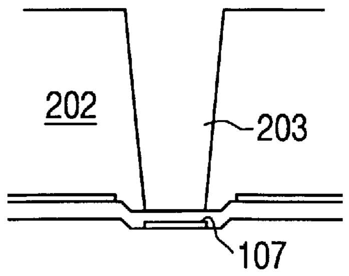
Figure 15:
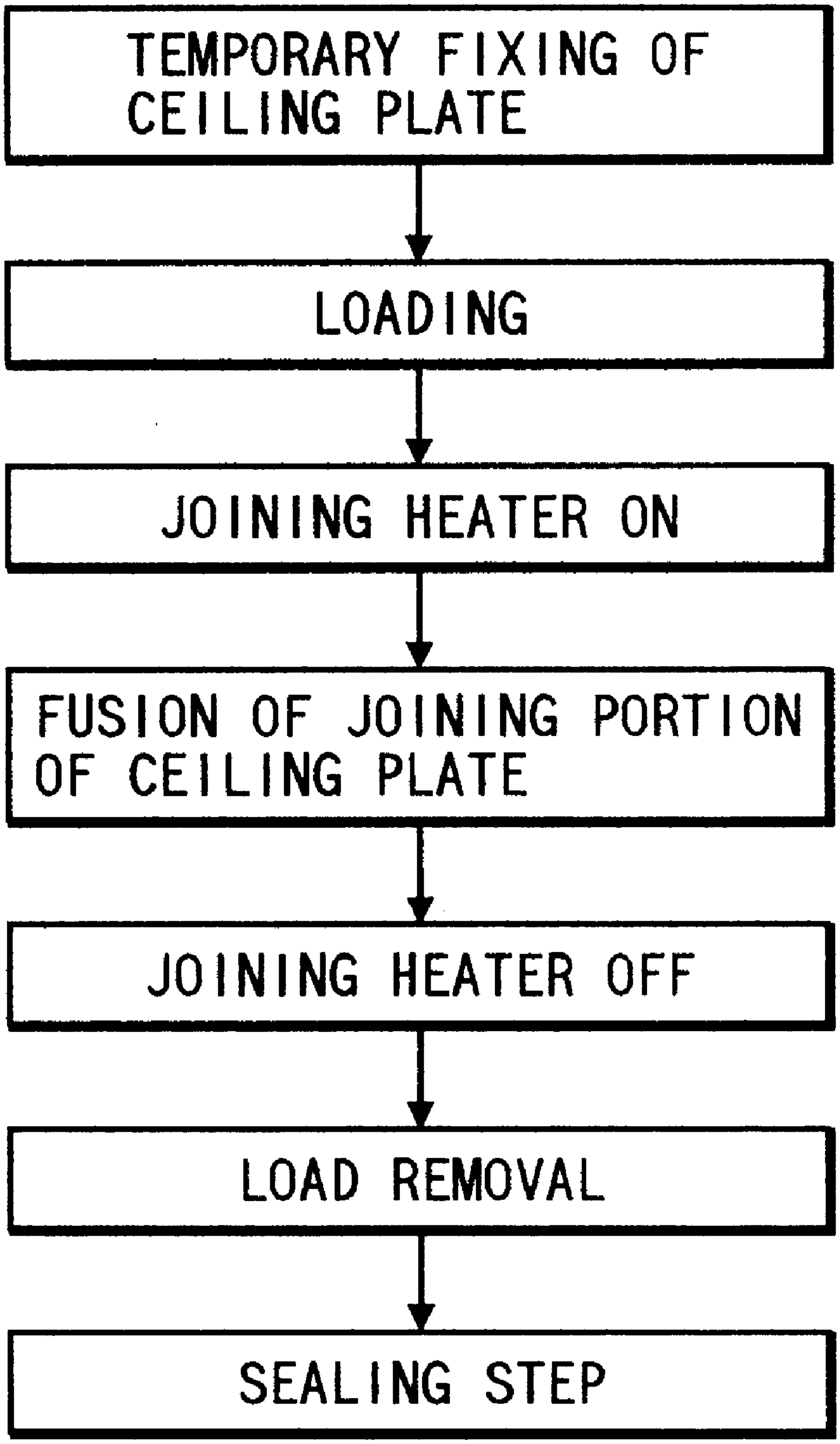
FIG. 15 is a flow chart of the joining method.

FIG. 13 is an enlarged schematic cross-sectional view of the joining portion of the ceiling plate and the substrate of the printing head, while FIGS. 14A–14D are schematic cross-sectional views showing the steps of joining method of the ceiling plate and the substrate shown in FIG. 13, FIG. 15 is a flow chart of the joining method, and FIGS. 16A–16H are schematic cross-sectional views when the shape and the dimension of the joining portions are varied.

FIG. 13 shows an example of the laminar structure of the substrate provided with joining heaters prepared by a semiconductor process.

The joining heater 107 is composed of a material of satisfactory stability in heat generation, as in case of the ink discharge heater, such as $HfB_2$ or $Ta_xN_y$, while electrodes connected to the heater 107 are composed of less expensive material such as aluminum. For avoiding corrosion by direct contact with the ink, the joining heater 107 is covered with an insulating protective layer 104 composed for example of $SiO_2$ or SiN. The protective layer 104 is provided with through-holes for connecting the electrodes with electrode pads (not shown). On the heater area, there is provided an anticavitation layer 105 for example of tantalum, for avoiding destruction by cavitation of the generated bubble.

The joining heater 107 is provided in each joining position of the nozzle wall 203, and is provided at both ends with electrodes for power supply to the heater 107.

The patterns of the electrodes for the joining heaters 107 are so designed that the resistances between the joining heaters 107 and the power source are not mutually different.

FIG. 13 shows the configuration of the present embodiment in a cross section along the direction of array of the ink discharge heaters.

The ceiling plate is composed of polysulfone resin, and the end 208 of the nozzle wall is provided with a projection 209. The nozzle walls 203 are arranged with a pitch of 43.3–43.5 $\mu$m, while the widths Wn, Wn' of the nozzle wall end 208 and the projection 209 are respectively 10 and 4 $\mu$m. The projection 209 has a substantially triangular or trapezoidal cross section, with a height of 4 $\mu$m in the Z direction. The projection 209 is easily crashed and deformed when pressed to the substrate under a load of about 10 gf, thereby functioning as an intermediate material for joining the nozzle wall 208 and the surface of the substrate 101.

On the substrate surface contacted by the nozzle wall 203, there is provided the joining heater 107, of which exposed surface is covered by a $SiO_2$ protective layer 104. In consideration of the adhering property with the polysulfone resin constituting the ceiling plate, there may be exposed, on the contact surface, another oxide material such as $Ta_2O_5$.

On the contacting surface there is also provided a recess 110 featuring the Japanese Patent Application No. 06-179116, and the joining heater 107 is provided therein. In the present embodiment, the widths Ws, Wh of the recess 110 and the joining heater 107 are respectively 12 and 8 $\mu$m. The height of the nozzle 203 is within a range from 30 to 50

$\mu$m, varying locally in the Y direction, in consideration of the ink discharge performance.

In order to obtain the function of the recess described in the Japanese Patent Application No. 06-179116, and in order to obtain the function as a dike for the fused polysulfone resin as will be explained later, the recess 110 and the nozzle wall 203 are preferably so formed as to satisfy a relation Ws>Wn. Also in the cross section shown in FIG. 13, the nozzle wall 203, the projection 209 and the joining heater 107 satisfy a relation:

$$Wn' < Wh < Wn \quad (1)$$

The function of the relation (1) will be explained in the following with reference to FIGS. 16A–16H.

According to the investigation of the present inventors, the energization of the joining heater can locally heat only the contacting surface and the vicinity thereof to 180–300° C., thereby fusing the resin in the contacting portion of the ceiling plate. More specifically, the polysulfone resin of only the vicinity of the contacting portion of the ceiling plate could be fused by supplying the joining heater with several hundreds to several ten thousands pulses of an energy of 2.4 $\mu j/\mu m^2$/pulse, at a frequency of about 1 kHz.

Figure 16A:
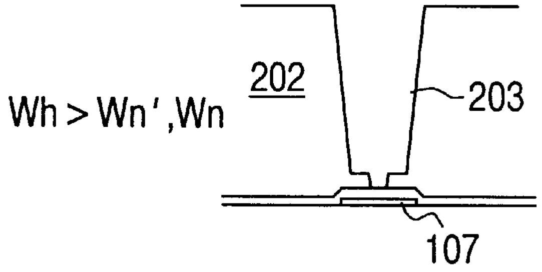
FIGS. 16A, 16B, 16C, 16D, 16E, 16F, 16G and 16H are schematic cross-sectional views showing the joined states in case the shapes and dimensions of the joined portions are varied.
Figure 16B:
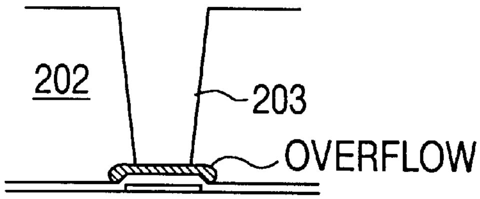

A configuration shown in FIG. 16A has a margin in the precision of alignment of the ceiling plate and the substrate in the direction of array of the nozzles, but is associated with a danger that the resin may flow to both sides of the nozzle wall, thus covering the end portions of the ink discharge heater as shown in FIG. 16B. Such configuration in FIG. 16A is disadvantageous, because of the above-mentioned drawback, particularly in case the nozzle pitch is about 35–45 $\mu$m or less due to the limited clearance between the nozzle wall and the heater.

Figure 16C:
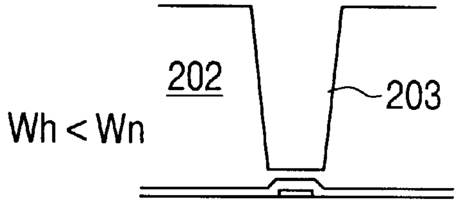
Figure 16D:
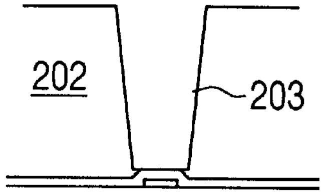
Figure 16E:
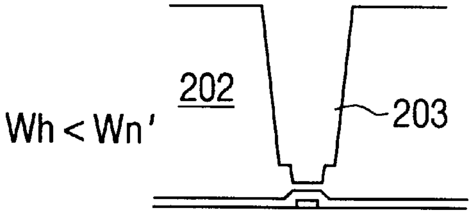
Figure 16F:
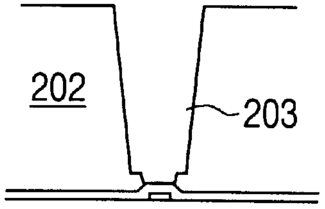

Also in configurations shown in FIGS. 16C and 16E, it is difficult to obtain sufficient joining force between the nozzle wall end and the substrate, because incompletely fused portions may be generated on both sides of the nozzle wall, as shown in FIGS. 16D and 16F.

Figure 16G:
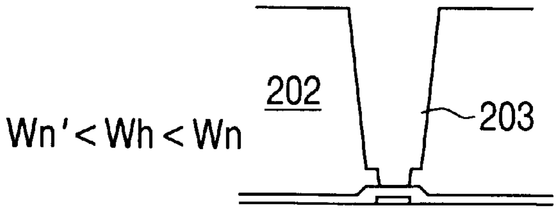
Figure 16H:
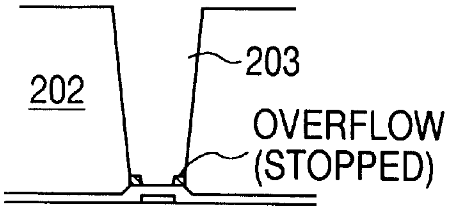

On the other hand, a configuration shown in FIG. 16G can achieve fusion securely, because the projection 209 which is crashed and brought into contact with the joining heater 107 is contained in the heating area thereof. In case the fused resin flows toward the nozzle, it can be rapidly solidified in a space, present between the end of the joining heater 107 and the nozzle wall end 208 and functioning as a cooling area as shown in FIG. 16H, and does not therefore flows into the nozzle 202. Consequently the configuration in FIG. 16G is particularly effective in case of a small nozzle pitch of 65 $\mu$m or smaller.

In the following steps of joining of the ceiling plate in the configuration shown in FIG. 13 will be explained with reference to FIGS. 14A–14D and 15.

At first the ceiling plate and the substrate are aligned in a predetermined positional relationship and temporarily fixed (FIG. 14A). Then a load is applied to the ceiling plate in the Z direction, thereby maintaining the nozzle wall end 208 and the substrate 101 in pressure contact (FIG. 14B). In this step, the projection 209 is crashed and deformed on the substrate. Thus the gap between the nozzle walls and the substrate, resulting from the bending of the ceiling plate, can be eliminated. The nozzle walls are uniformly contacted with the substrate, and a heat insulation layer, generated by the separation of the nozzle walls 203 to be fused and the substrate constituting the heat source, is not generated.

After the contacting, the Joining heaters 107 are energized to fuse the polysulfone resin (FIG. 14C) and to substantially fill the space between the joining portions of the ceiling plate and the substrate surface with the fused substance, whereby the joining of the nozzle walls 203 and the substrate is completed. Such filling with resin is preferable for cooling the fused resin overflowing from the heating area of the heater 107 and for increasing the joining strength between the nozzle walls and the substrate after heating. Also, even if the resin cannot be sufficiently cooled by local overheating by the joining heaters, resulting for example from a fluctuation in the thickness of the heat generating member, the configuration shown in FIG. 13 can terminate the flow of the fused resin at the edges of the recess.

The load applied for contacting may be temporarily or completely removed after the joining step, but the attachment of the pressing spring, known in the conventional configuration of the thermal ink jet head, may be made in the load applying step shown in FIG. 15.

The ceiling plate may sink toward the substrate by the fusion of the contacting portions of the ceiling plate as a result of the energization of the joining heaters, but the load may be suitably adjusted so as to avoid a significant variation in the contacting force.

Embodiment 4

Figure 17:
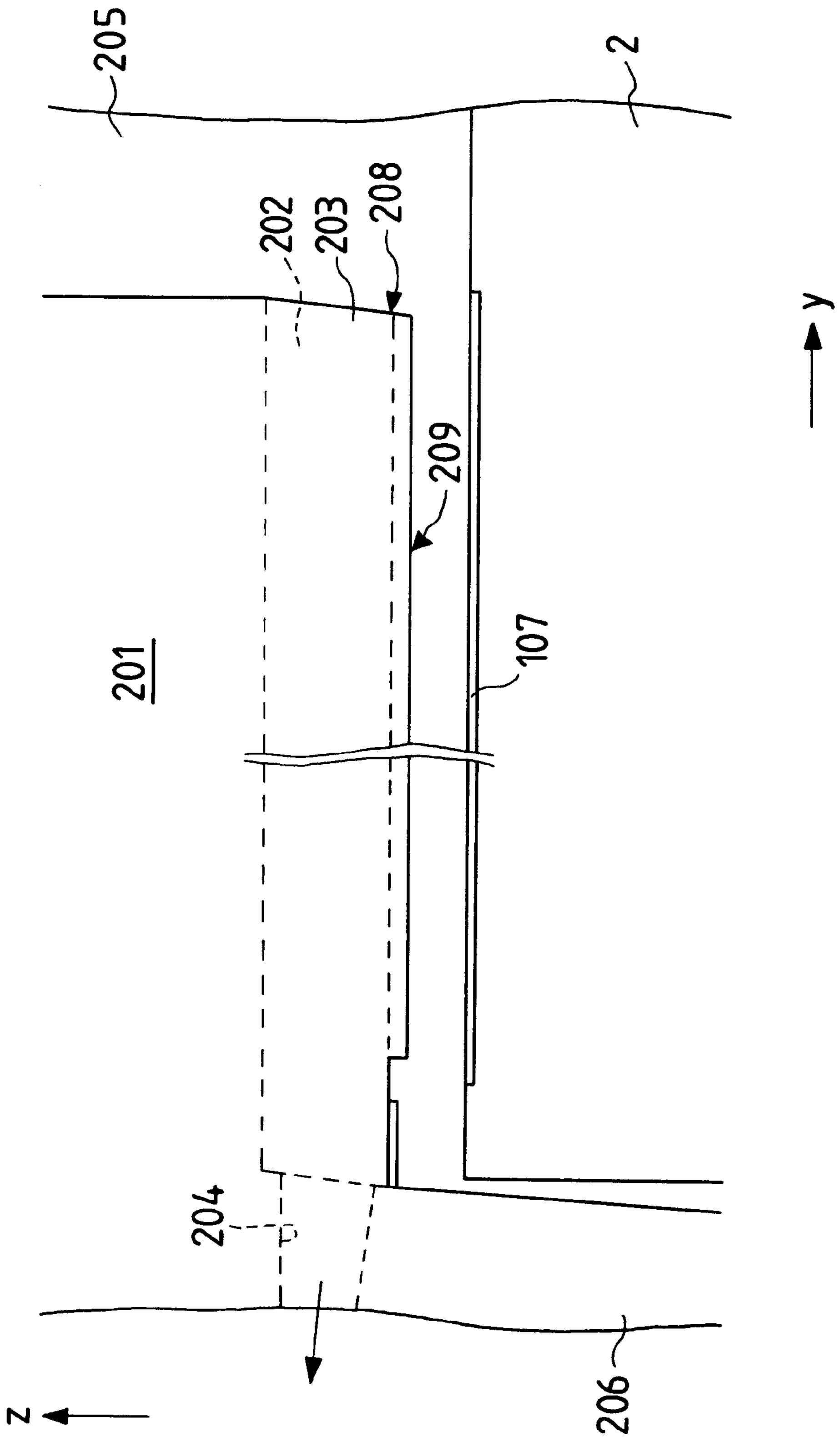
FIGS. 17 and 18 are schematic cross-sectional views showing other embodiments of the manufacturing process for the ink jet printing head of the present invention.

FIG. 17 is a schematic cross-sectional view showing another embodiment of the manufacturing process for the ink jet printing head of the present invention.

The present embodiment is featured by a fact that the projection 209 of the nozzle wall end 208 is not extended, as shown in FIG. 17, to the vicinity of the orifice 204 formed in the orifice plate 206, and that the joining heater 107, provided on the substrate 101 corresponding to the projection 209, is also not extended to the vicinity of the orifice 204.

In the present embodiment, even if the resin fused by the heat of the joining heater 107 starts to flow along the substrate, it can be rapidly solidified in a position where the joining heater 107 is no longer present, in front of the liquid chamber or the orifice. Consequently the solidified substance does not affect the internal structure of the ink path (nozzle) 202 and does not hinder the ink flow at the recording operation.

Embodiment 5

Figure 18:
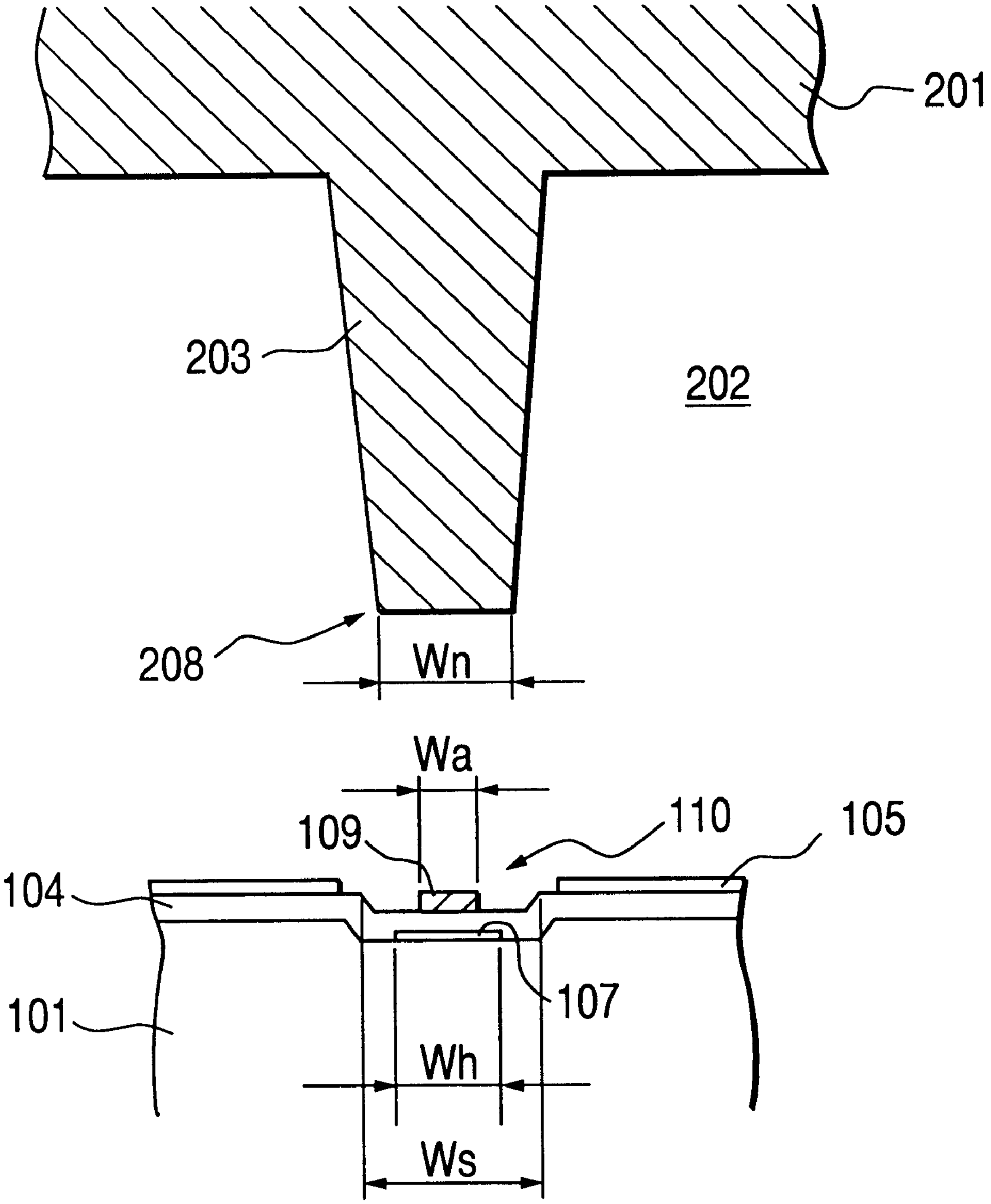
Figure 19:
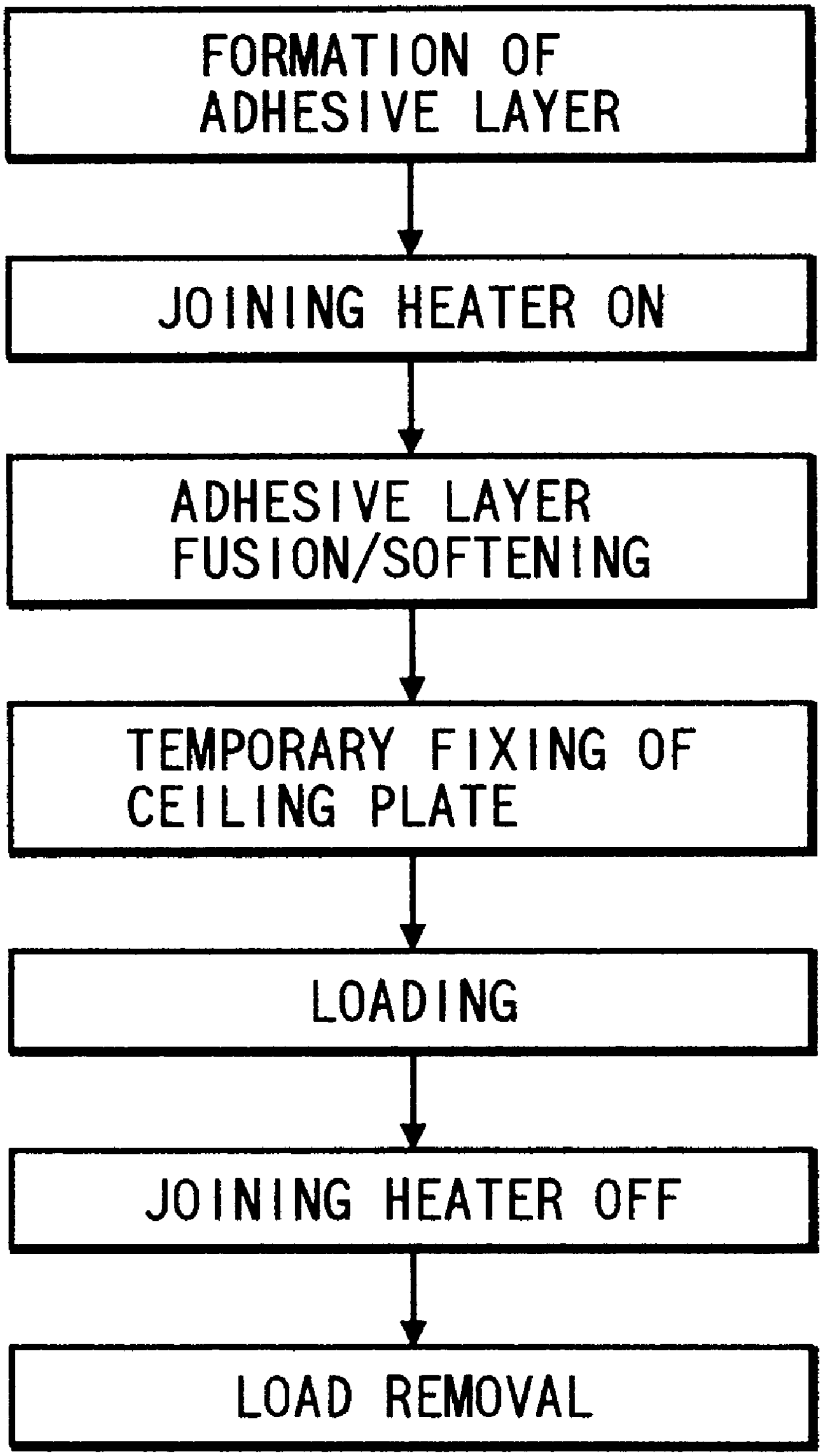
FIG. 19 is a flow chart showing the joining method in the manufacturing process shown in FIG. 18.

FIG. 18 is a schematic cross-sectional view of another embodiment of the manufacturing process for the ink jet printing head of the present invention, and FIG. 19 is a flow chart of the joining method in the manufacturing process shown in FIG. 18.

The present embodiment is featured by the use, at the joining of the ceiling plate, of an adhesive layer in the contacting portions between the substrate and the ceiling plate.

FIG. 18 shows the configuration of the present embodiment in a cross section along the direction of array of the discharge heaters 102, wherein the widths Wa, Wh of the adhesive layer 109 and the joining heater 107 are so selected as to satisfy a relation:

$$Wa < Wh \quad (2).$$

The adhesive layer 109 is formed by patterning a film, obtained by dissolving the polysulfone resin constituting the ceiling plate in a solvent coating the obtained solution with a predetermined thickness on the substrate 101.

In FIG. 18, the nozzle walls 203 are arranged with a pitch of 43.3 $\mu$m, and Wn, Wa and Wh are respectively 10, 3 and 7 $\mu$m.

In the dimensional relationship of the present embodiment, the thickness of the adhesive layer 109 is preferably 5 μm or less, more preferably in a range of 2–4 μm, in order that the entire polysulfone adhesive layer can be fused.

The adhesive layer can also serve, in addition to the joining of the ceiling plate and the substrate, as a cushion layer for absorbing the bending of the ceiling plate in the Z direction. As long as these objectives can be met, the material of the adhesive layer need not be limited to that constituting the contacting portions of the ceiling plate nor to the thermoplastic materials.

FIG. 19 shows the steps of ceiling plate joining in the present embodiment. In comparison with the foregoing embodiment shown in FIG. 15, the present embodiment is featured by a fact that the adhesive layer is heated and softened/fused, prior to the temporary joining. This is to exploit the above-mentioned two functions of the adhesive layer 109 more effectively.

In the configuration of the present embodiment satisfying the foregoing relation (2), the adhesive layer 109 present between the nozzle wall end 208 and the substrate surface by the temporary joining is entire included in the heating area of the joining heater 107 and can therefore be securely fused by the heat therefrom. If the polysulfone resin constituting the adhesive layer 109 is fused and flows toward the nozzle, it can be rapidly solidified in a space, present between the end of the joining heater 107 and the nozzle wall end 208 and serving as a resin cooling area, so that the ink flow or the bubble generation in the nozzle 202 is not hindered at the recording operation.

Embodiment 6

Figure 20:
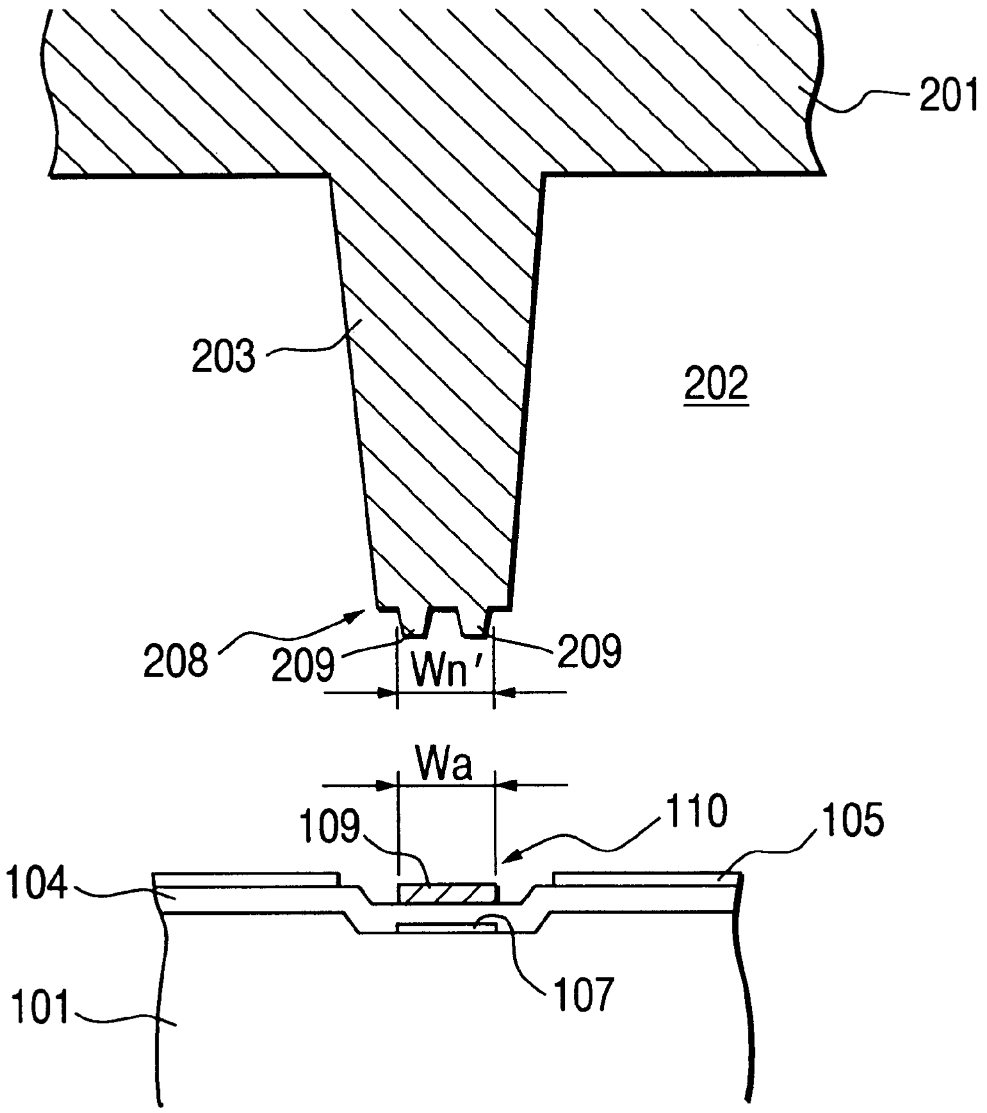
FIG. 20 is a schematic cross-sectional view showing another embodiment of the manufacturing process for the ink jet printing head of the present invention.

FIG. 20 is a schematic cross-sectional view of another embodiment of the manufacturing process for the ink jet printing head of the present invention.

The present embodiment is featured by a fact that the nozzle wall end 208 is provided with plural projections 209, and that an adhesive layer 109 is provided directly above the joining heater 107 in the substrate. In this configuration, the two projections serve, in addition to the function explained in the foregoing embodiment 3, to increase the apparent contact surface area with the adhesive layer.

In the configuration of FIG. 20, the joining heater 107 is required to thermally fuse the adhesive layer 109 and/or the projections 209. Consequently, the width of the projections, relative to the joining heater 107, can be defined by the distance between the both outer ends of projections, represented by Wn' in FIG. 20. Also in consideration of the foregoing relations (1) and (2), Wa, Wn', Wn and Wh can be so selected, in the configuration of FIG. 20, as to satisfy a relation:

$$\min(Wa, Wn') < Wh < Wn \quad (3).$$

Embodiment 7

Figure 21:
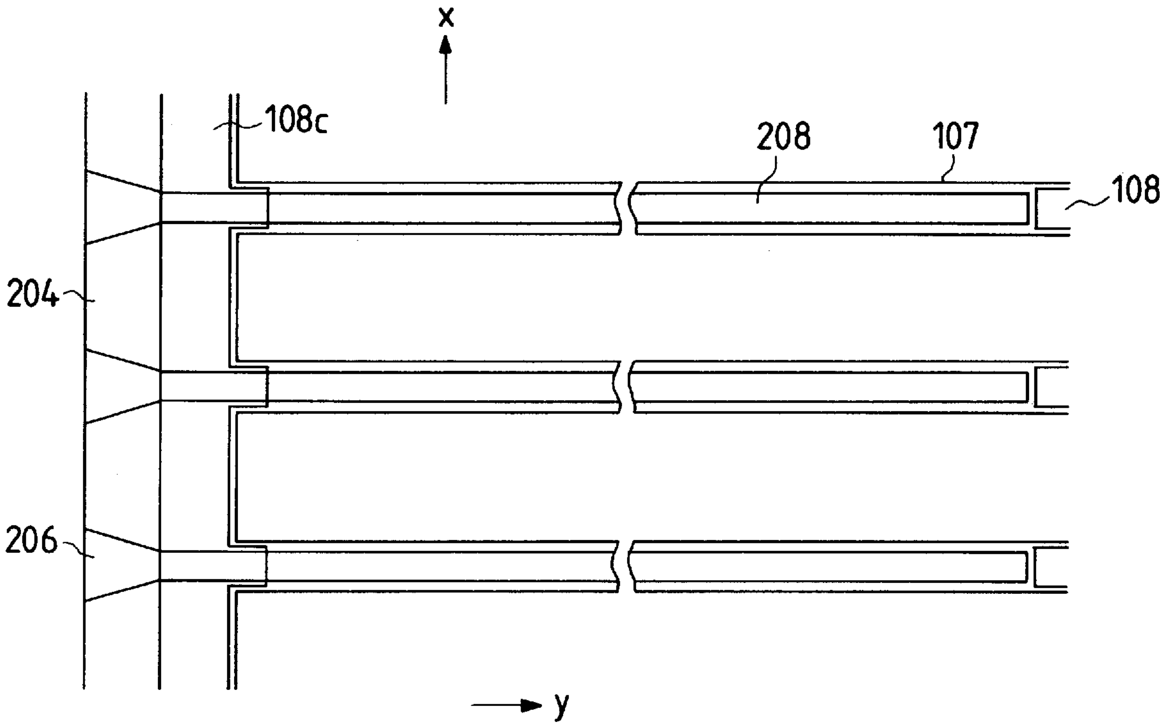
FIG. 21 is a schematic plan view showing another embodiment of the manufacturing process for the ink jet printing head of the present invention.
Figure 22:
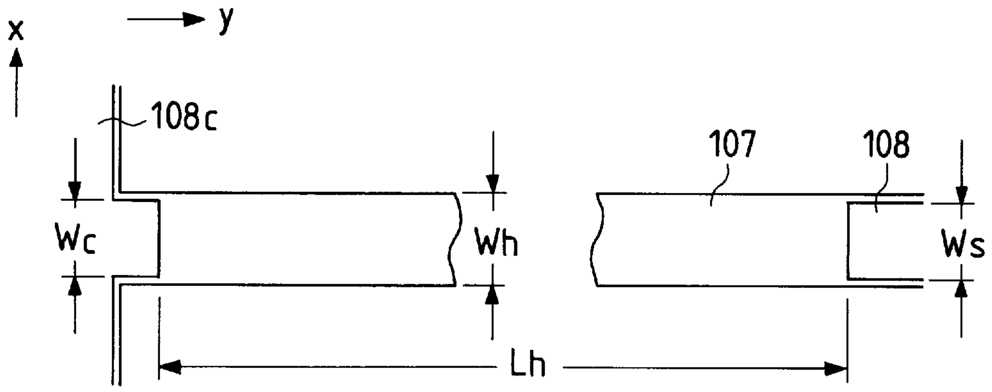
FIG. 22 is a magnified plan view showing the configuration between the electrodes in the printing head shown in FIG. 21.

FIG. 21 is a schematic plan view showing another embodiment of the ink jet printing head of the present invention, and FIG. 22 is a magnified plan view showing the configuration between electrodes in the printing head shown in FIG. 21.

The present embodiment is featured by a fact that the ceiling plate and the substrate are joined by fusion, without the use of the adhesive layer.

In FIG. 21 and FIG. 22, the ink discharge heater and the electrodes thereof are omitted for the ease of understanding. FIG. 22 is a magnified view of the vicinity of electrodes 108, **108*c* shown in FIG. 21**.

The joining heater 107, provided on the substrate 101 of the ink jet head of the present embodiment, has a substantially constant width of the heater Wh in a direction perpendicular to the direction of the current, between the electrodes at both ends. The joining heaters 107 are connected to a common electrode **108*c***, and the pattern thereof is so designed that the resistances between the joining heaters and the power source become mutually same. The ceiling plate is formed with polysulfone resin.

The present embodiment is featured by a fact that the heat generating material has a substantially constant thickness throughout the joining heater, and that the widths Ws, Wc of the electrodes at the ends of the joining heater do not exceed the width Wh of the heater member, wherein Ws=Wc.

In the configuration of the present embodiment, the sheet resistance of the heat generating member is substantially uniform over the entire joining heater, and there will not result a local concentration of the current density on the heat generating member of the joining heater 107. The current density is smaller at both ends of the joining heater 107 in the X direction than in other parts, but such end portions generate relatively small amounts of heat and have only limited influence on the ceiling plate joining step. More specifically, apart from the physical size of the joining heater 107, its practical heater portion effective in the thermal sense is an area of a length Lh (in the direction of current) and a width (Y direction) Wh'=Wc=Ws (such area being hereinafter called effective heater area). In such area the current density is substantially uniform, so that, at the energization of the joining heater 107, there will not be generated so-called heat spot where the temperature is locally extremely higher than in other portions. Consequently the joining heater of the configuration shown in FIG. 21 and FIG. 22 can uniformly heat and fuse the contacted end portion 209 of the nozzle wall.

Figure 1:
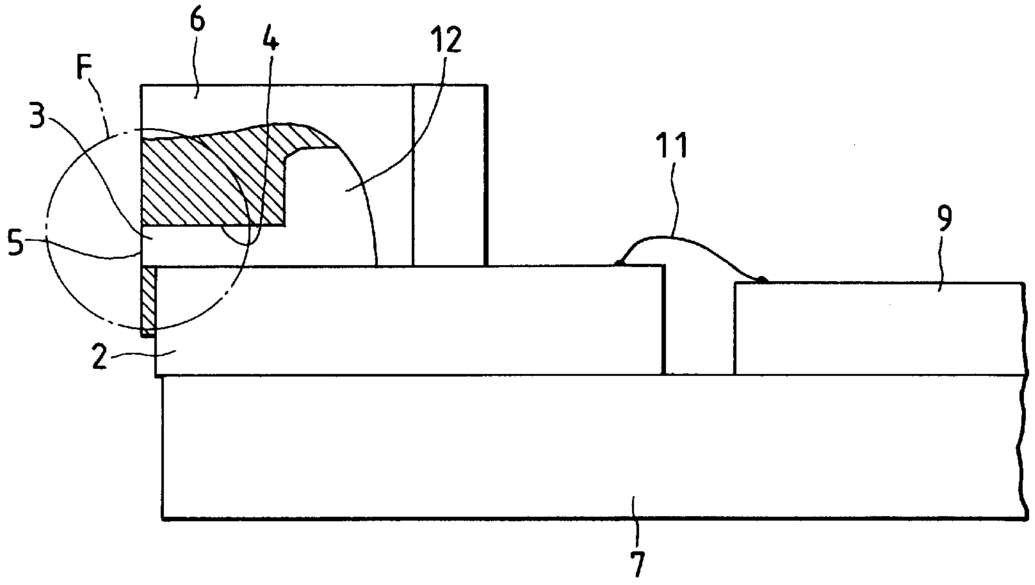
FIG. 1 is a partially cross-sectional lateral view, showing the principal parts of a conventional ink jet printing head.
Figure 2:
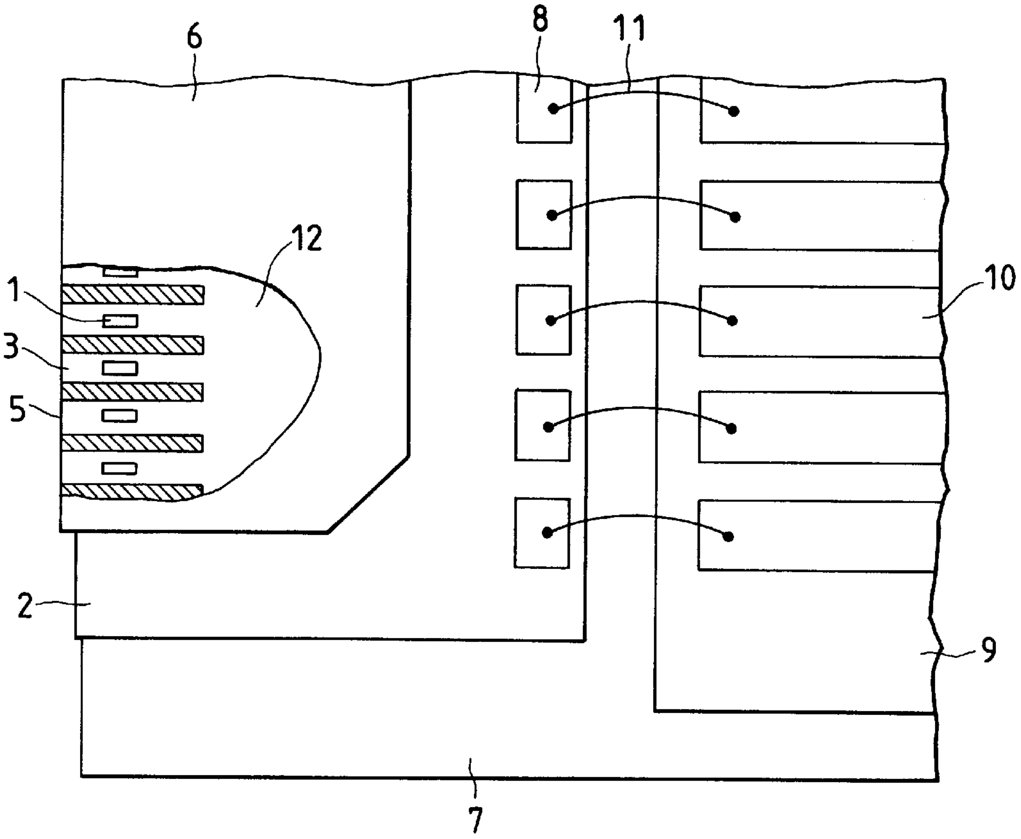
FIG. 2 is a partially cross-sectional plan view, showing the principal parts of the conventional ink jet printing head shown in FIG. 1.
Figure 3A:
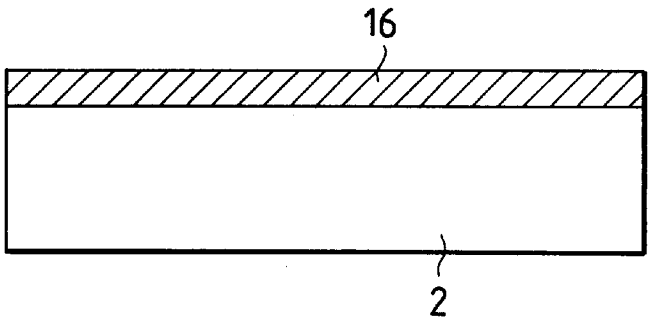
FIGS. 3A, 3B and 3C are cross-sectional views showing steps of joining of a ceiling plate and a substrate by a DF (dry film) method.
Figure 3B:
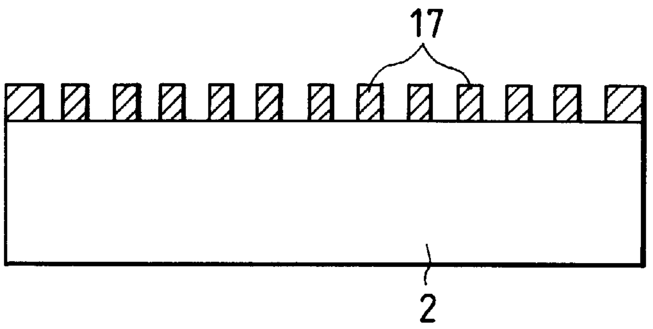
Figure 3C:
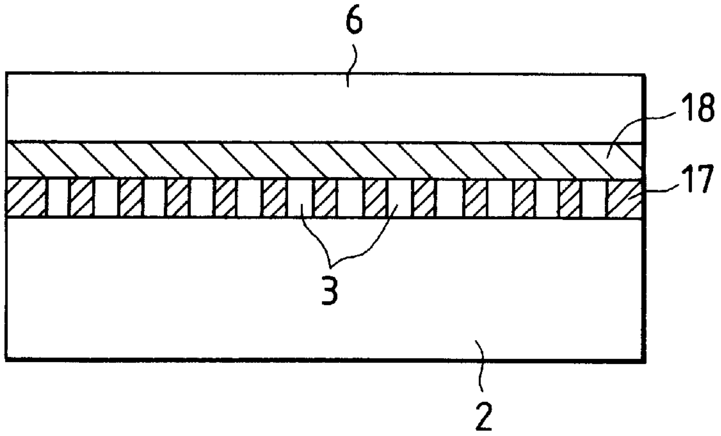
Figure 4A:
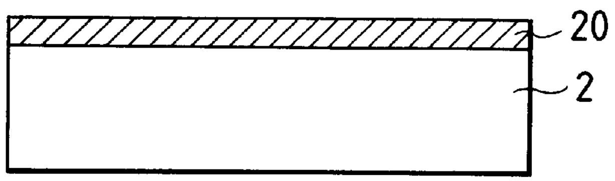
FIGS. 4A, 4B, 4C, 4D and 4E are cross-sectional views showing steps of joining of the ceiling plate and the substrate by a so-called molding method.
Figure 4B:
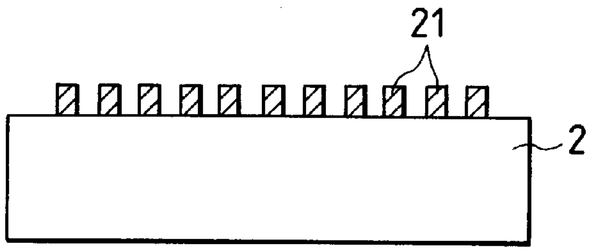
Figure 4C:
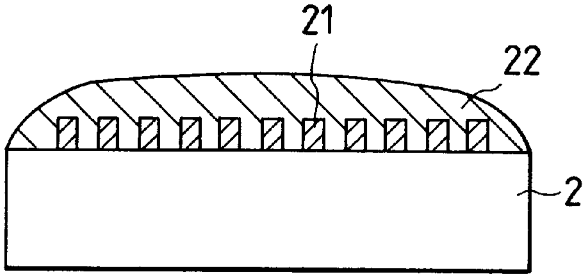
Figure 4D:
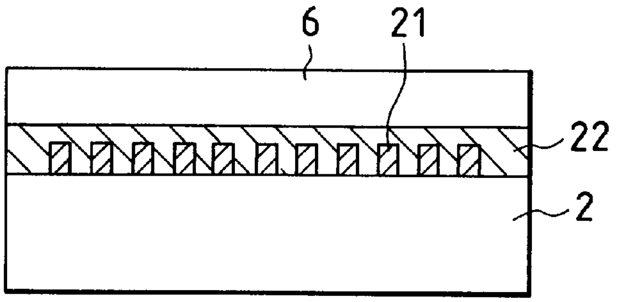
Figure 4E:
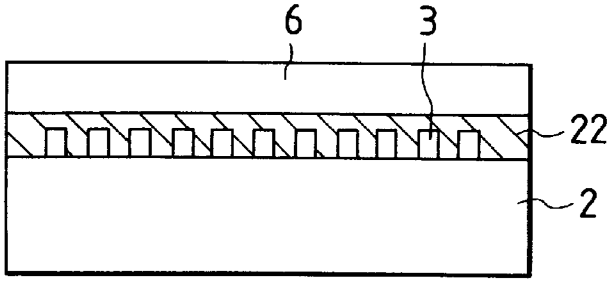
Figure 5:
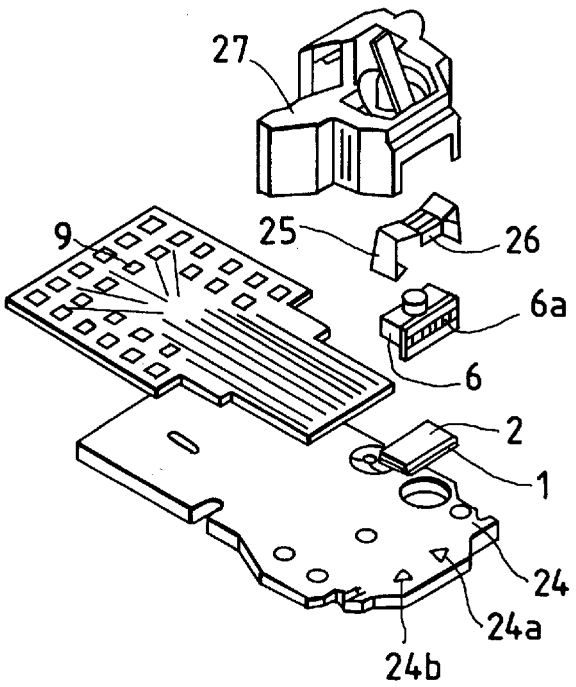
FIG. 5 is an exploded perspective view of an ink jet unit including an ink jet printing head, showing a conventional joining method for the ceiling plate and the substrate with a pressing spring.
Figure 23:
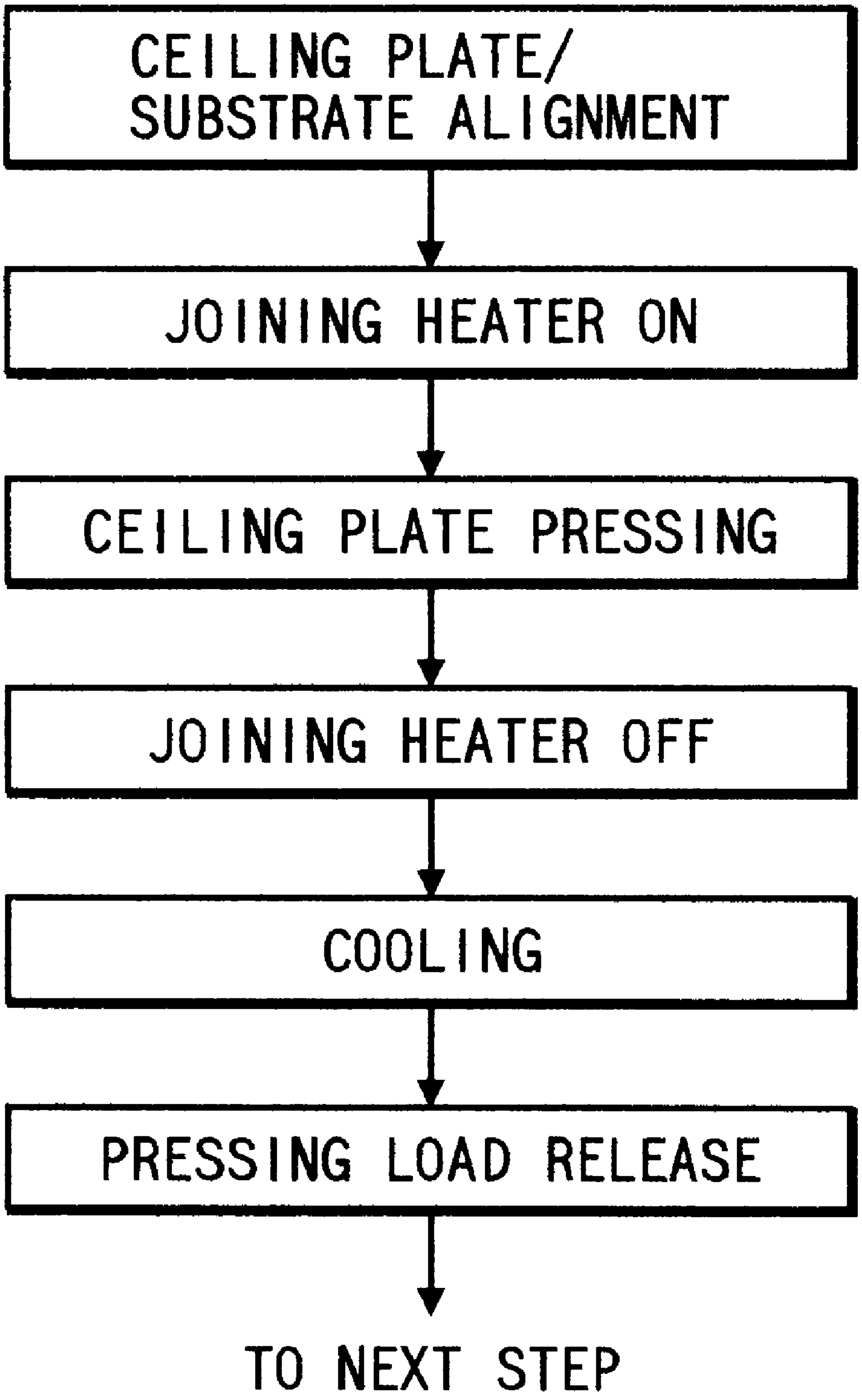
FIG. 23 is a flow chart showing another embodiment of the manufacturing process for the ink jet printing head of the present invention.
Figure 24A:
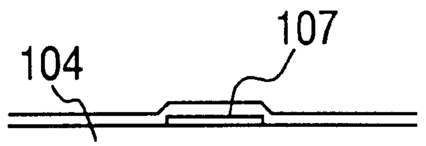
FIGS. 24A, 24B, 24C and 24D are schematic cross-sectional views showing the joining method in the manufacturing process shown in FIG. 23.
Figure 24B:
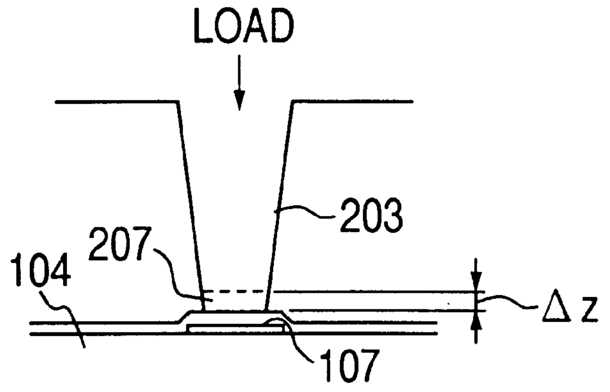
Figure 24C:
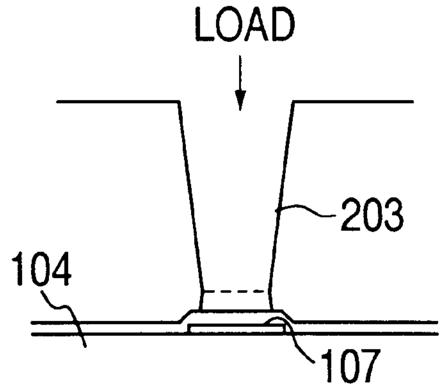
Figure 24D:
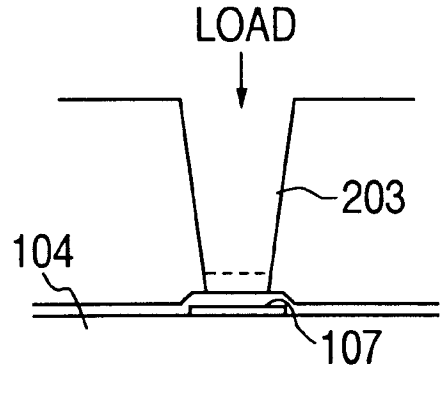
Figure 25:
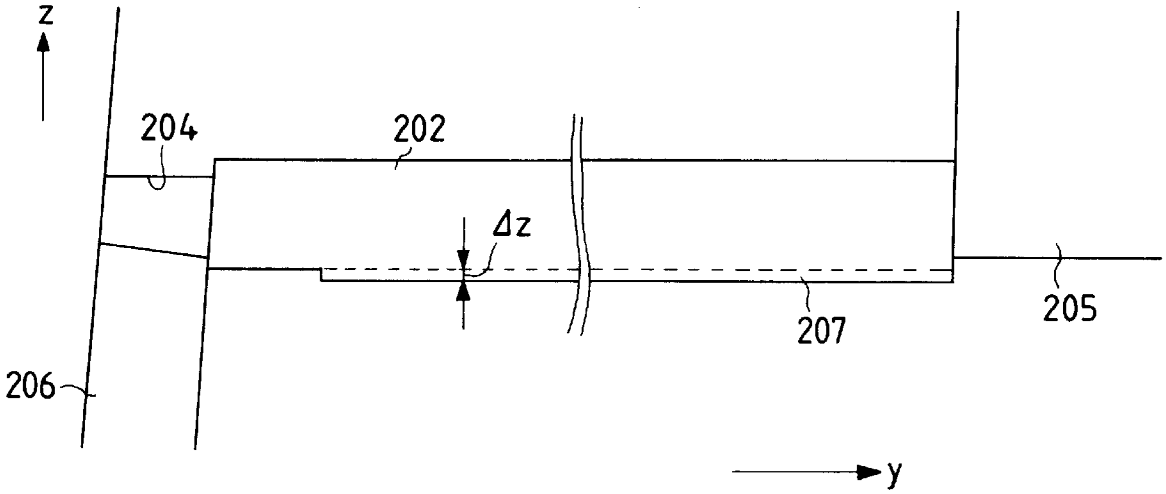
FIG. 25 is a schematic cross-sectional view showing an actual heater area as the principal part in the printing head shown in FIG. 24.

In the following there will be explained the details of the ceiling plate joining method with reference to FIGS. 23, 24A to 24D and 25, in which FIG. 23 is a flow chart of another embodiment of the manufacturing process for the ink jet printing head of the present invention, FIGS. 24A–24D are schematic cross-sectional views showing the joining method in the manufacturing process shown in FIG. 23, and FIG. 25 is a schematic cross-sectional view showing the effective heater area as the principal part in the printing head shown in FIGS. 24A to 24D. By the alignment of the ceiling plate and the substrate in a predetermined positional relationship, the end portion 208 is placed on the effective heater area of the substrate. The end portion of the nozzle wall 203, corresponding to the effective heater area and also corresponding to a portion F in FIG. 1, is provided, as illustrated in FIG. 25, with a shape 207 extended toward the negative Z-direction, in comparison with other portions of the ceiling plate opposed to the substrate. As will be explained later, such extension constitutes a marginal portion to be fused by the heat of the joining heater. The size ΔZ of such fusible portion 207 is preferably so large as to absorb the bending, in the Z direction, of the joining face of the ceiling plate opposed to the substrate, but is usually in the order of 10 μn or less in order to achieve practical joining of the ceiling plate.

At first the joining heaters 107 are energized to pre-heat the heater surface (FIG. 24A), and the ceiling plate is pressed to the substrate under a load (FIG. 24B). In this state, the load serves to correct the bending of the ceiling plate, thereby bringing the joining portions such as the end portions 208 of the ceiling plate into intimate contact with the substrate. After the pressed contact of the ceiling plate is achieved, the energization of the joining heaters is continued to such a time when the vicinity of the joining portions thereof is fused and joined with the substrate while other parts are not fused nor deformed (FIG. 24C). The driving conditions for the joining heater have to be so selected that the maximum temperature at the heater surface exceeds the glass transition point of the polysulfone resin. The plural joining heaters within a same substrate are preferably so driven that the fusion of the plural nozzle walls takes place without a significant difference in timing, and, more preferably all the heaters are driven at the same time. According to the investigation of the present inventors, there could be obtained a relatively satisfactory result of fusing the desired portions only of the ceiling plate, by driving the heaters 107 with pulses, each providing the heater with a maximum surface temperature of about 350° C. or higher, for a period of about 30 to 60 seconds with a frequency of 1 to 5 kHz.

Then the heaters 107 are deactivated to cool the substrate and the ceiling plate (FIG. 24D), and, after the end of the cooling step, the ceiling plate and the substrate are liberated from the pressing load. The loading on the ceiling plate and the substrate is continued during the cooling period, in order to prevent cleavage of the joined parts resulting from contraction of polysulfone resin by cooling.

The end portions 208 of the ceiling plate are intimately joined to the surface of the substrate on the joining heaters 107 through the above-explained steps. Then, in order to improve the reliability of the joining of the ceiling plate, the periphery of the joined part is sealed with a silicone sealant.

In this manner there can be achieved highly reliable joining, free from leaking between the adjacent nozzles.

The protruding shape of the fusible portion 207 is not an essential factor in the present invention, but it facilitates the control of the steps related to fusion. Also the ceiling plate and the substrate may be provided, in a portion of the frame of the liquid chambers, with a configuration similar to that in the joining parts of the nozzles.

In case the joining heaters are prepared by a semiconductor process, in consideration of the possible aberration between the patterns of the electrode and the heat generating member, Wc and Ws are preferably selected at a value not exceeding (Wh−precision of alignment in the semiconductor process).

Embodiment 8

Figure 26:
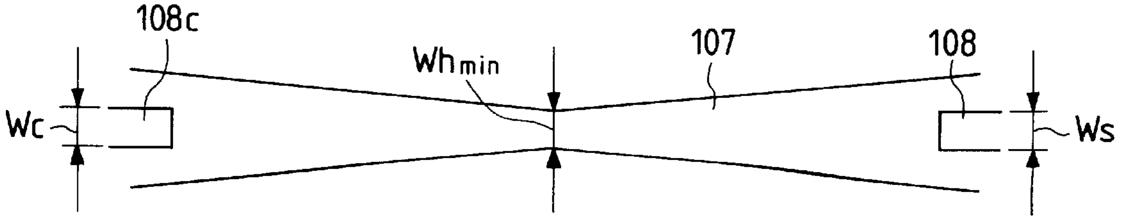
FIG. 26 is a schematic plan view showing the configuration of a joining heater in another embodiment of the ink jet printing head of the present invention.

FIG. 26 is a schematic plan view showing the configuration of the joining heater in another embodiment of the ink jet printing head of the present invention.

In the present embodiment, in case the joining heater is so shaped that the width thereof, perpendicular to the direction of current, varies along the direction of current as shown in FIG. 26, the width of the electrodes is selected smaller than the minimum width Whmin of the heater. As a specific example, in the configuration shown in FIG. 26, neither of Wc and Ws exceeds Whmin, wherein Wc is preferably equal to Ws.

Embodiment 9

Figure 27:
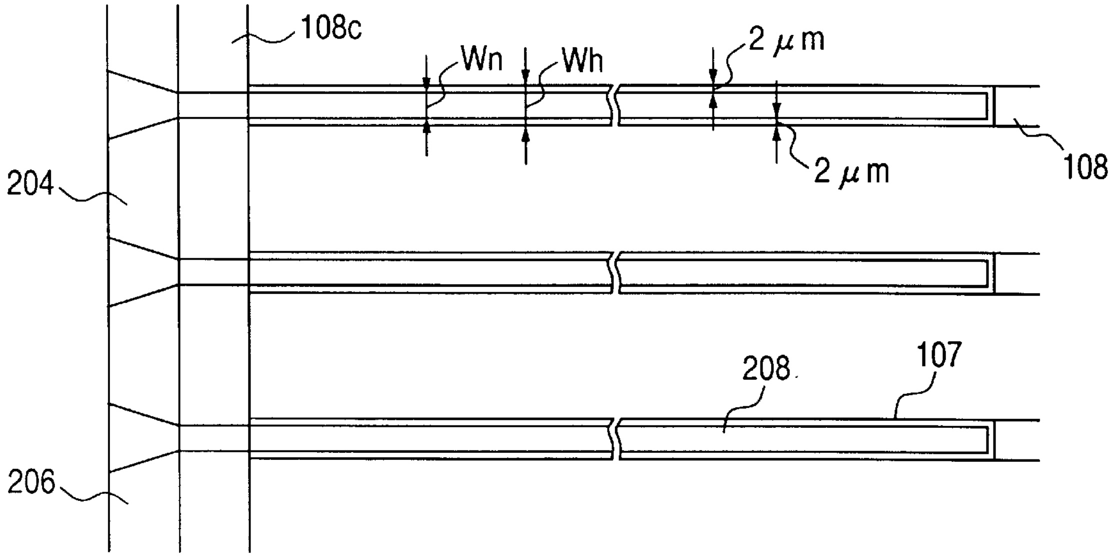
FIG. 27 is a schematic cross-sectional view showing another embodiment of the ink jet printing head of the present invention.
Figure 28A:
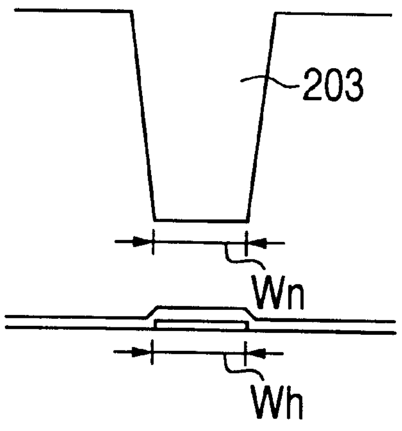
FIGS. 28A and 28C are schematic cross-sectional views showing the joining method of the ceiling plate and the substrate in the printing head shown in FIG. 27.
Figure 28B:
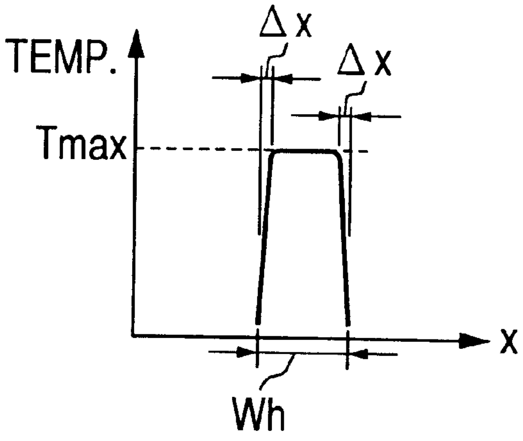
FIG. 28B is a chart showing the temperature distribution on the joining heater.
Figure 28C:
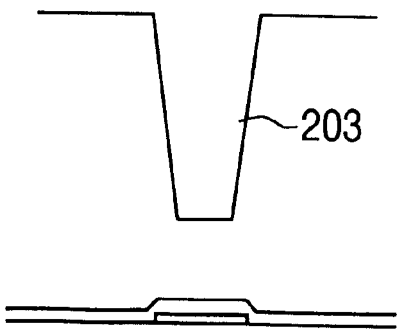

FIG. 27 is a schematic cross-sectional view of another embodiment of the ink jet printing head of the present invention, while FIGS. 28A and 28C are schematic cross-sectional views for explaining the joining method for the ceiling plate and the substrate in the printing head shown in FIG. 27, and FIG. 28B is a chart showing the temperature distribution on the joining heater. More specifically, the present embodiment defines the dimensional relationship between the end portion 208 and the joining heater 107, in order to transmit the heat for fusing the contacting portion of the ceiling plate sufficiently to the end portions of the nozzle walls.

In FIG. 27, as the width Wh of the joining heater 107 is smaller than the width of the electrodes 108, the heater width Wh is substantially equal to the width of the effective heater area.

According to the investigation of the present inventors, it is not preferred, in case the entire end portion 208 is directly joined to the substrate, that the width Wn of the joining heater 107 is smaller than that Wn of the end portion 208. For example, when the nozzle wall 203 was contacted with the surface of a heater 107 satisfying a relation Wh=Wh' (width of effective heater area)=Wn (FIG. 28A), the surface of such heater 107 showed a temperature distribution as shown in FIG. 28B. Thus, areas of a lower temperature exist at both ends of the heater 107. The maximum temperature Tmax varies with the input power, but Δx is generally within a range of 2–5 μm in case the protective layer 104 of the substrate is composed of a silicon-containing material such as $SiO_2$ or SiN and has a thickness not exceeding about 5 μm and if Wh is of a magnitude of several ten microns or less. Consequently the both ends of the end portion 208 are less easily fusible in comparison with the remainder and the uniform joining is difficult to achieve. Therefore, in a practical ink jet head, there is required a dimensional relationship Wh>Wn in order that the end portion 208 does not touch the low temperature portions of the joining heater 107, at least in the preferred alignment state. More specifically, according to the situation shown in FIG. 28B, there is preferred a relation Wh≧Wn+2×Δx=Wn+4 μm, more preferably Wh≧Wn+6 μm.

In consideration of the temperature characteristics of the surface of the heater 107 mentioned above, the present embodiment selects the width Wn of the end portion 208 equal to Wh−4 μm as shown in FIGS. 27 and 28, thereby enabling uniform heat supply from the heater 107 to the end portion 208.

In the configuration of the present embodiment, since the contacting portion of the ceiling plate is joined to the position of a relatively high temperature in the heater surface, there can be achieved highly reliable joining and the thermal efficiency is also improved for this reason.

In the foregoing embodiment, the nozzle wall 203 and the heater 107 have to be mutually so aligned that the central axes thereof substantially coincide. In consideration of the error in the alignment of the both, it is necessary to select Wh so as to satisfy Wh≧Wn+4 μm+(alignment error), in order that the end portion of the nozzle wall does not touch the low temperature areas at both ends of the heater 107.

Also in case the width Wn' of the effective heater area is equal to or less than the geometrical width of the joining heater as shown in FIG. 21, Wh is to be replaced by Wh' in the above-mentioned dimensional relationship.

Embodiment 10

Figure 29A:
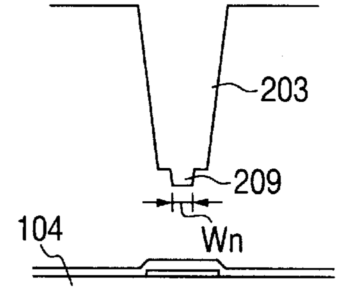
FIGS. 29A and 29B are schematic cross-sectional views showing another embodiment of the manufacturing process of the ink jet printing head of the present invention.
Figure 29B:
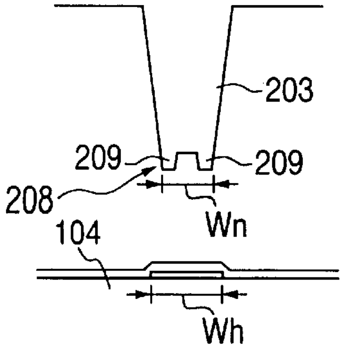

FIGS. 29A and 29B are schematic cross-sectional views showing another embodiment of the manufacturing process for the ink jet printing head of the present invention, and indicating a preferred dimension for the joining heater 107, in case the contacting portion of the ceiling plate is provided with a projection for improving the reliability of joining as disclosed in the Japanese Patent Laid-open Application No. 4-150048.

More specifically, in case the end portion of the nozzle wall 203 to be contacted with the substrate is provided with a projection as shown in FIGS. 29A and 29B, the width Wh of the heater 107 in the configuration in FIG. 29A is to be selected equal to or larger than (Wn'+4 μm) wherein Wn' is the width of the projection 209 in the X direction. In case plural projections 209 are provided as shown in FIG. 29B, the width Wh of the heater 107 is to be selected equal to or larger than (Wn"+4 μm) wherein Wn" is the width of the projections 209 on both ends.

Embodiment 11

Figure 30:
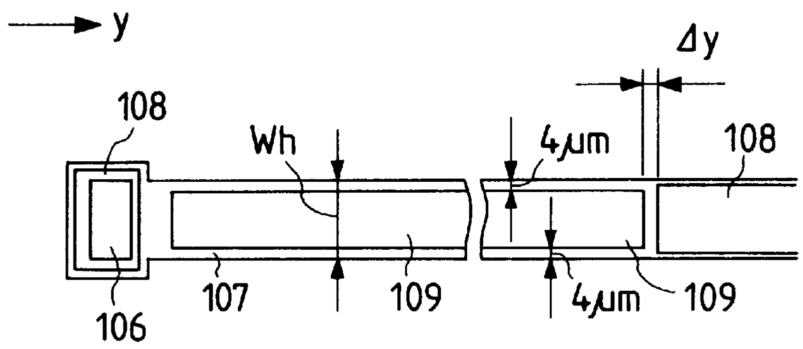
FIGS. 30 and 31 are magnified schematic plan views of the joining heater in other embodiments of the ink jet printing head of the present invention.

FIG. 30 is a schematic magnified plan view of another embodiment of the ink jet printing head of the present invention, showing a configuration provided with an adhesive layer at the contacting portion of the substrate and the ceiling plate at the joining thereof.

In the present embodiment, in combination with the ceiling plate composed of thermoplastic polysulfone resin, the adhesive layer is patterned, on the joining heaters 107, as a thin film of polysulfone of a thickness of 1–4 μm. In order to prevent drawbacks such as an inclined state of the ceiling plate relative to the substrate, resulting from the uneven fused deformation of the nozzle wall end, the surface of the joining heater on which the adhesive layer is to be formed has to be free from the heat spot. Also in case the width Wn of the end portion 208 of the nozzle wall a is equal to or larger than the width of the effective heater area of the joining heater 107, it is preferable that the adhesive layer is provided in the effective heater area, namely not in the low temperature areas at both ends of the joining heater as shown in FIG. 28B. If the adhesive layer is provided both inside and outside the effective heater area, the adhesive layer outside the effective heater area may remain unfused or unsoftened at the energization of the joining heater, whereby such unsoftened portion functions as a spacer and hinders the joining of the ceiling plate and the substrate.

The adhesive layer 109 is provided in an internal area of the heater 107, separated at least by Δx from the edge thereof, in order not to be present on the low temperature area in the peripheral part of the heater 107. In case the width of the effective heater area is smaller than the geometrical width of the heater, the adhesive layer is preferably provided in an internal area, separated at least by Δx from the edge of the effective heater area.

In a practical ink jet head, Δx is at least 2 μm.

In the present embodiment, the distance between the adhesive layer 109 and the edge of the joining heater 107 is selected as 4 μm, and, in consideration of the step difference between the electrode 108 and the surface of the heater 107, there is also provided, in the Y direction, a gap of ΔY=2 μm between the adhesive layer 109 and the electrodes 108, 108*c*.

The configuration of the present embodiment can uniformly fuse the adhesive layer, since the adhesive layer 109 is provided in a portion showing a relatively high uniform temperature in the joining heater 107.

In the present embodiment, since the adhesive layer 109 is provided corresponding to the effective heater area of the joining heater 107 and can therefore be entirely fused or softened in secure and simultaneous manner, the ceiling plate and the substrate can be joined at the contacting portions, regardless of the dimensional relationship of the width Wn of the nozzle wall ends and Wh.

Also since the dimensional relationship of the adhesive layer and the joining heater in the present embodiment allows uniform heating of the entire adhesive layer on the joining heater, the adhesive layer may be composed of other thermally reactive materials such as thermosetting resin.

Embodiment 12

Figure 35A:
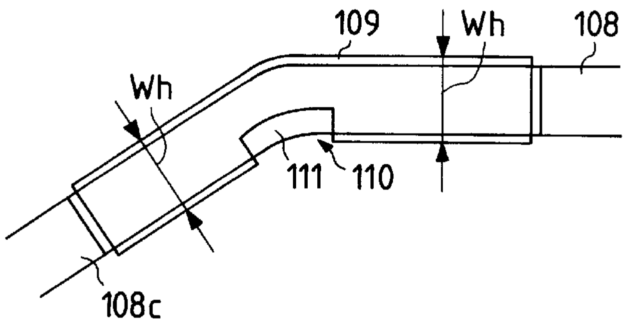
FIGS. 35A and 35B are schematic plan views showing the configuration of the joining heater in other embodiments of the ink jet printing head of the present invention.
Figure 35B:
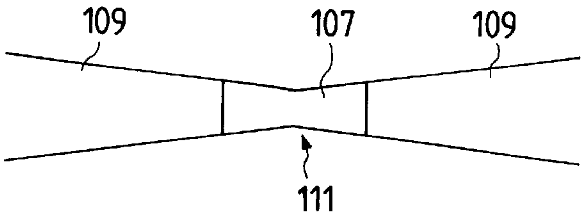

FIGS. 35A and 35B are schematic plan views showing the configuration of the joining heater in other embodiments of the ink jet printing head of the present invention. The joining heater of a form shown in FIG. 35A has a constant heater width between the electrodes, but may generate a heat spot 111 because of a current concentration in an inside portion 110 where the heater 107 is curved. According to the investigation of the present inventors, the heat spot generated under the adhesive layer in the solid state causes rapid fusion of the adhesive layer only in the vicinity of such heat spot, eventually generating a bubble in the position of such heat spot.

As a result, the adhesive layer is peeled in a film form from the joining heater, thereby hindering the heat conduction to the adhesive layer. For this reason, at the patterning of the adhesive layer 109, it is not provided in the vicinity of the inside portion 110. Also in the configuration shown in FIG. 35A, the outside area of the curved portion may become lower in temperature, so that it is conceivable to eliminate the adhesive layer from such outside area. It is therefore rendered possible, by such configuration, to efficiently and uniformly fuse the adhesive layer corresponding to the heat generating area of the joining heater.

In case of the joining heater which varies in the width along the direction of the current as shown in FIG. 35B, it is conceivable not to provide the adhesive layer in the narrowest portion where the current density becomes maximum and in the vicinity thereof.

Embodiment 13

Figure 36A:
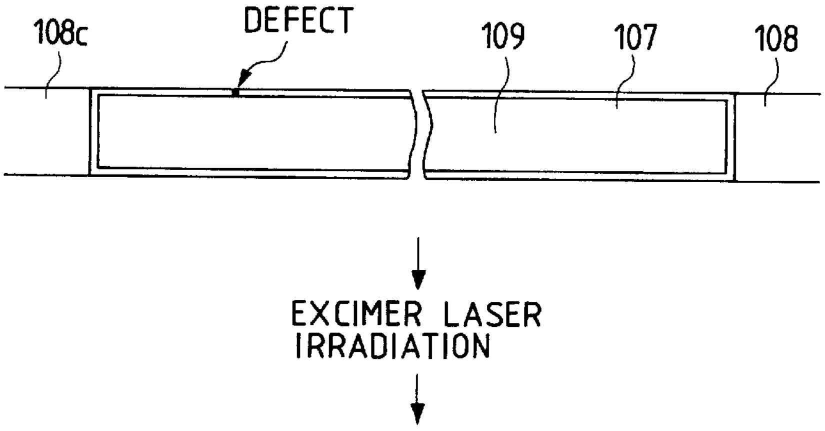
FIGS. 36A and 36B are schematic plan views showing the configuration of the joining heater in another embodiment of the ink jet printing head of the present invention, respectively before and after the irradiation with excimer laser.
Figure 36B:
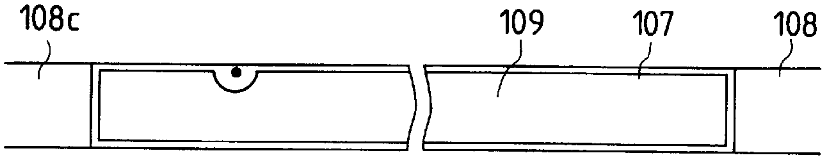

FIGS. 36A and 36B are schematic plan views showing the configuration of the joining heater in other embodiments of the ink jet printing head of the present invention, wherein FIGS. 36A and 36B respectively show states before and after the excimer laser irradiation.

The present embodiment is featured, in case an undesirable defect is present on the joining heater, by eliminating the adhesive layer on such defect prior to the joining of the ceiling plate.

In the preparation of the joining heater by a semiconductor process, there may eventually result a defect such as a pattern notch, for example by a particle deposited on the substrate. The position of such heater defect may be abnormal with respect to the heat generation, it is preferable to remove the adhesive layer in the position of such defect.

Figure 33:
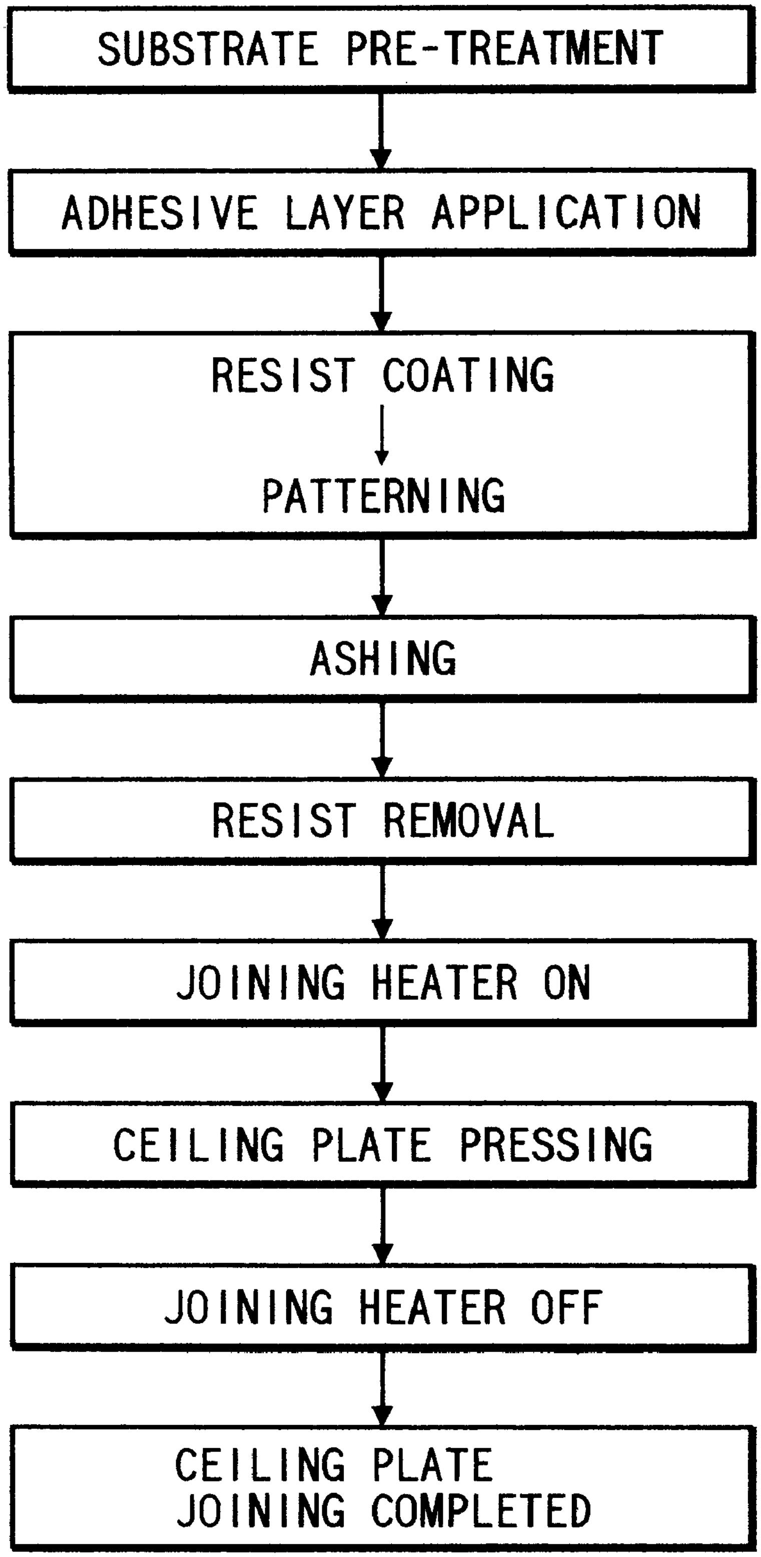
FIG. 33 is a flow chart of the joining method in the manufacturing process for the printing head shown in FIG. 31.

In the present embodiment, the process follows the chart shown in FIG. 33 up to the patterning of the adhesive layer as shown in FIG. 36A.

In case a heater defect is found in the inspection prior to the pressing of the ceiling plate, the adhesive layer after patterning is irradiated, in a position on such defect, with an excimer laser spot and is thus eliminated (FIG. 36B).

In a multi-nozzle ink jet head, the above-mentioned step may result in a fluctuation in the joining strength of the nozzle wall ends, but, since the heater defect is usually generated accidentally and locally, the joining strength of the ceiling plate is practically not lowered by the presence or absence of such heater defect.

Embodiment 14

Figure 32A:
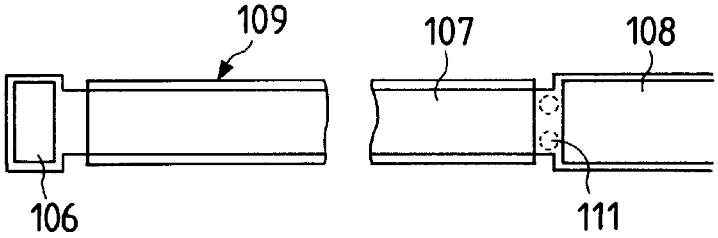
FIGS. 32A and 32B are schematic plan views showing variations of the printing head shown in FIG. 31.
Figure 32B:
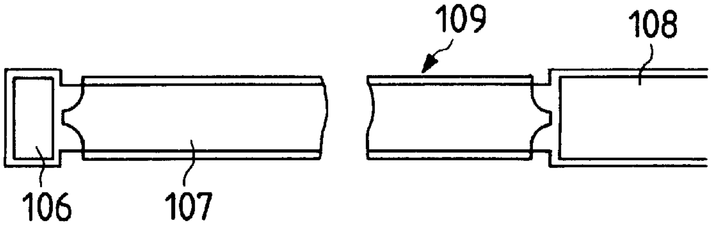
Figure 31:
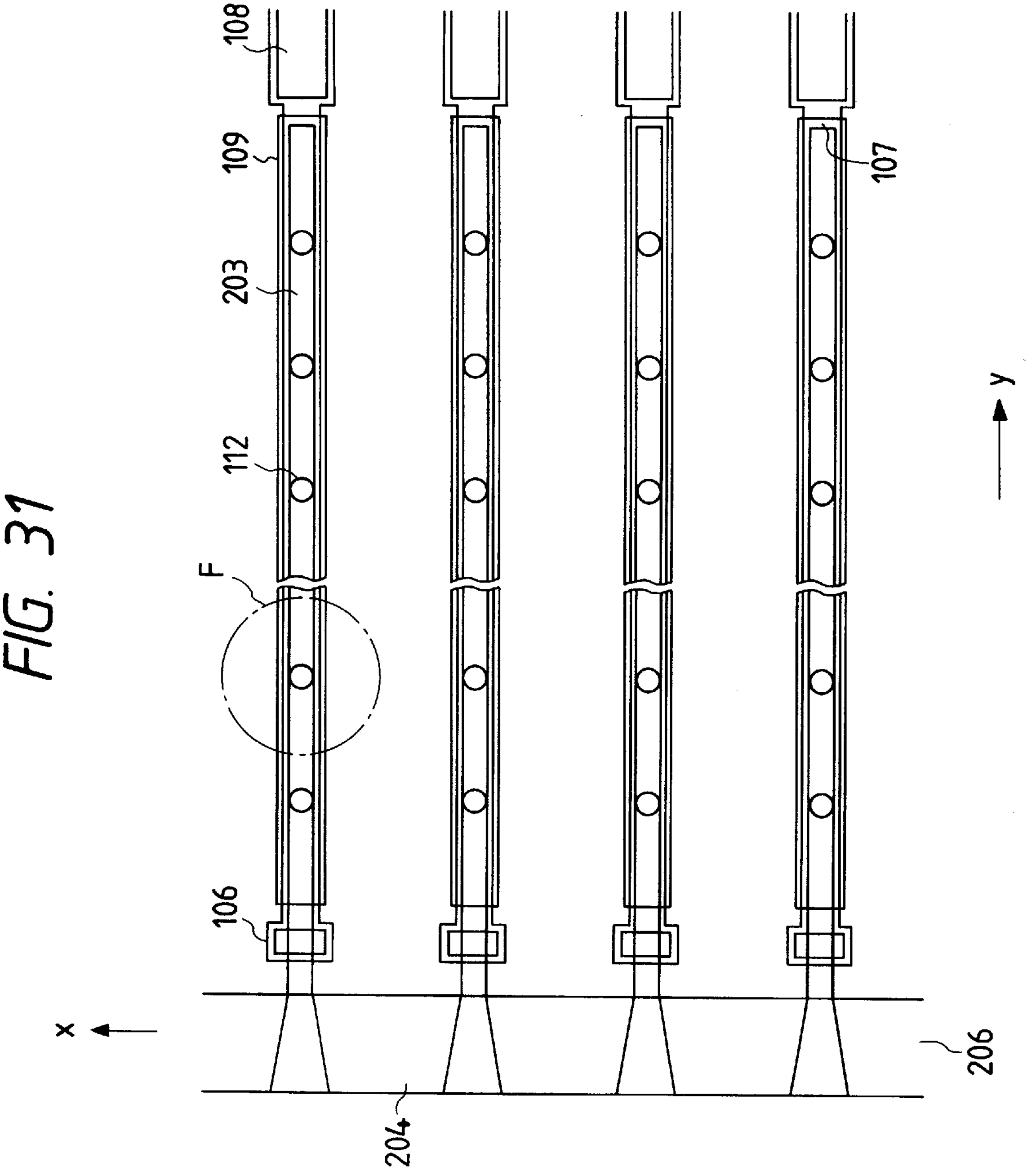

FIG. 31 is a schematic magnified plan view of the joining heater in another embodiment of the ink jet printing head of the present invention, while FIGS. 32A and 32B are schematic plan views showing variations of the configuration shown in FIG. 31, and FIG. 33 is a flow chart showing the joining method in the manufacturing process of the printing head shown in FIG. 31.

In the present embodiment, the ceiling plate and the adhesive layer are principally composed of polysulfone.

The joining heater shown in FIG. 31 is composed of a heat generating material of a substantially uniform thickness, but, because the width of the electrodes 108, perpendicular to the direction of current, is larger than the width of the heat generating material, the current density becomes maximum at a position where the width of the heat generating material is reduced whereby a heat spot may be generated.

On the other hand, the configuration of the electrodes in FIG. 31 can enlarge the effective heater width, and is advantageous in the spatial efficiency in the ink Jet head in which the nozzles 202 are arranged in a high density. Also in case the thickness of the heat generating material is locally smaller, a heat spot may be generated in such position and in the vicinity thereof.

In the configuration of the present embodiment, the adhesive layer 109 is not provided on the surface of the joining heater 107, as shown in FIG. 32A, in the vicinity of the electrodes 108, 108*c* at both ends, in the direction of current, of the joining heater 107. This is to eliminate the adhesive layer on the heat spot. The position of the heat spot 111 can be easily estimated by the calculation of the point where the current density becomes maximum. In case the heat spot is anticipated small with respect to the heater area, there can also be conceived a configuration as shown in FIG. 32B.

Also in the present embodiment, in the central area of joining heater 107 distant from the electrodes 108, there are provided patterns 112 at a predetermined interval, where the adhesive layer is eliminated. In case a film defect on the joining heater 107 generates a heat spot at the position of such defect, this structure relaxes the peeling force acting on the interface between the adhesive layer and the joining heater. Such filmless patterns 112 are arranged at a predetermined interval because the film defect mentioned above may be generated in random manner, and such patterns need not necessarily be of a same shape nor provided at a constant interval.

In the X direction, the width Wa of the adhesive layer 109, the width Wh of the joining heater 107 and the width Wn of the nozzle wall end are so selected as to satisfy a relation (5), in order to achieve satisfactory joining. More preferably there is adopted a condition $Wn \leqq Wh-4\ \mu m$, because of the reason to be explained later.

In the following there will be explained the configuration featuring the present embodiment and the steps of ceiling plate joining, with reference to FIGS. 33 and 34A–34E.

Figure 34A:
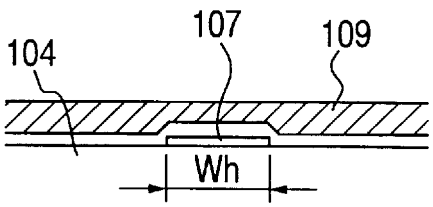
FIGS. 34A, 34B, 34C, 34D and 34E are schematic cross-sectional views showing the joining method in another embodiment of the ink jet printing head of the present invention.
Figure 34B:
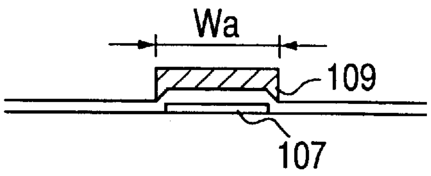

In consideration of the adhesion of the ceiling plate to the adhesive layer, the substrate is preferably so constructed that silicon oxide or tantalum oxide is exposed on the surface of the joining heater. In the present embodiment, the protective layer 104 is composed of $SiO_2$, and polysulfone dissolved in a solvent is spin coated thereon with a thickness of several microns or less (FIG. 34A). After the adhesive layer is cured, photoresist is so patterned thereon as to cover areas where the adhesive layer is to remain on the substrate, and the adhesive layer in the unnecessary areas, such as on the heat spot of the joining heater, for example by ashing. Then the photoresist is washed off to leave the adhesive layer only in the desired areas of the joining heater (FIG. 34B). The adhesive layer in the unnecessary areas may be eliminated also by excimer laser irradiation.

At the joining of the ceiling plate, the joining heater is at first energized to fuse the adhesive layer 109 on the joining heater 107. After the adhesive layer 109 is fused in the predetermined areas, the end portions 208 of the nozzle walls 203 of the ceiling plate are pressed to the substrate through the adhesive layer 109.

In order to fuse the adhesive layer in contact with the heat source such as the joining heater or the contacting portion of the thermoplastic ceiling plate, it is preferable, regardless whether the adhesive layer is present or absent, to repeatedly apply short pulses of 0.1–10 ms, each having sufficient energy for fusion, at a frequency of several kHz or less. A continuous DC power supply may cause transmission of the heat, generated in the heater 107, to the adhesive layer or to the ceiling plate, thus leading to the scattering of the adhesive layer onto the surrounding substrate or the fused deformation of the entire nozzle walls of the ceiling plate in the extreme case.

Figure 34C:
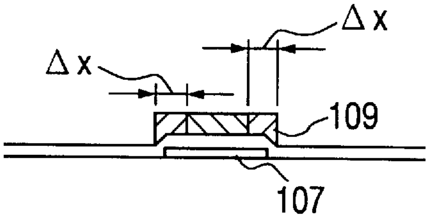

When the heater 107 of the configuration shown in FIG. 31 prepared by a film forming process is energized, heat is generated in the substantially entire area of the heater, but a temperature slope is generated in small areas $\Delta x$ at the heater ends shown in FIG. 34C and, in such areas, a sufficient amount of heat cannot be transmitted to the adhesive layer. It is therefore easily possible, in a portion corresponding to such low temperature areas and in its outside area, to select such a heating state for the adhesive layer 109 as to retain polysulfone in unfused state.

According to the investigation of the present inventors, $\Delta x$ is generally within a range of 2–5 $\mu$m in case the protective layer 104 of the substrate is composed of a silicon-containing material such as $SiO_2$ or SiN and has a thickness not exceeding about 5 $\mu$m and if Wh is of a magnitude of several ten microns or less. Consequently, in the film configuration explained above, the width Wh of the heater 107 is preferably 4 $\mu$m or larger, more preferably 10 $\mu$m or larger, in order to achieve satisfactory function.

According to the investigation of the present inventors, in case the polysulfone adhesive layer had a thickness of about 2–4 $\mu$m, the application of an energy of 0.7 mj/$\mu m^2$ did not fuse the polysulfone resin distant by at least about 2 $\mu$m from the heater 107, but the polysulfone in the other area corresponding to the heater 107 was fused satisfactorily for joining.

In the present embodiment, the unfused adhesive layer, positioned at and outside the above-mentioned low temperature area is positively utilized as a dike member for the adhesive material in the fused state. Thus the polysulfone resin of the adhesive layer fused at the joining of the ceiling plate does not flow to cover a part of the heater 102, which is adjacent to the joining heater 107 in the X direction of the substrate.

Figure 34D:
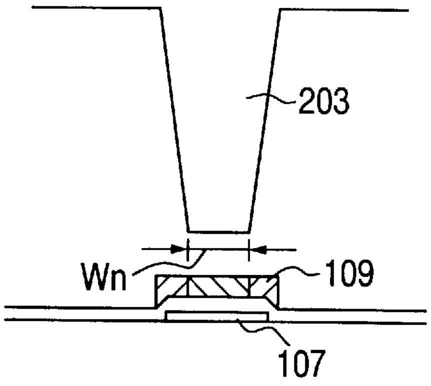

More specifically, in order to prevent the flow of the fused material of the adhesive layer and to bring the nozzle wall end 208 of the ceiling plate in contact with the fused adhesive layer at the same time as shown in FIG. 34D, there is required the following dimensional relationship:

$$Wa>Wh>Wn \quad (5)$$

According to the investigation of the present inventors explained in the foregoing, in the above-mentioned condition, the following relation $Wh \geqq Wn+2\times\Delta x=Wn+4\ \mu m$ is more preferred.

Figure 34E:
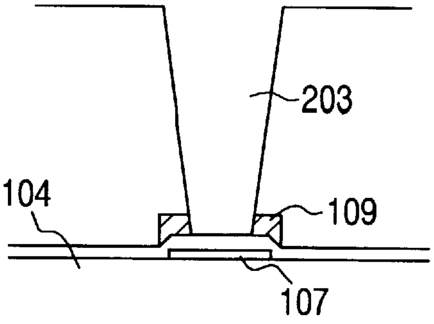

The ceiling plate and the substrate are joined by the steps explained above, and the ceiling plate joining process is terminated by the deactivation of the joining heaters. In a preferred joined state, all the nozzle walls are joined as shown in FIG. 34E, but, if the ceiling plate involves a bending in the Z direction, a thin layer of the adhesive material may be present between the end portion of the nozzle wall 203 and the surface of the joining heater 107 of the substrate.

In the present embodiment, the constitution that the adhesive layer is formed on the substrate containing the joining heater and a part of the adhesive layer on the joining heater is removed before joining to thereby provide no adhesive layer is employed. However, the advantages of the present invention can be obtained by single use of each.

In the present embodiment, the adhesive layer is composed of a thermoplastic material, but there may also be employed a thermosetting material. However the thermoplastic material is preferred in case a part of the adhesive layer positioned on the joining heater is removed.

Also in a joining portion which does not have the underlying adhesive layer, there may be employed the structure featuring the Japanese Patent Application Laid-open No. 4-25004, in order to improve the reliability of joining.

Embodiment 15

Figure 37:
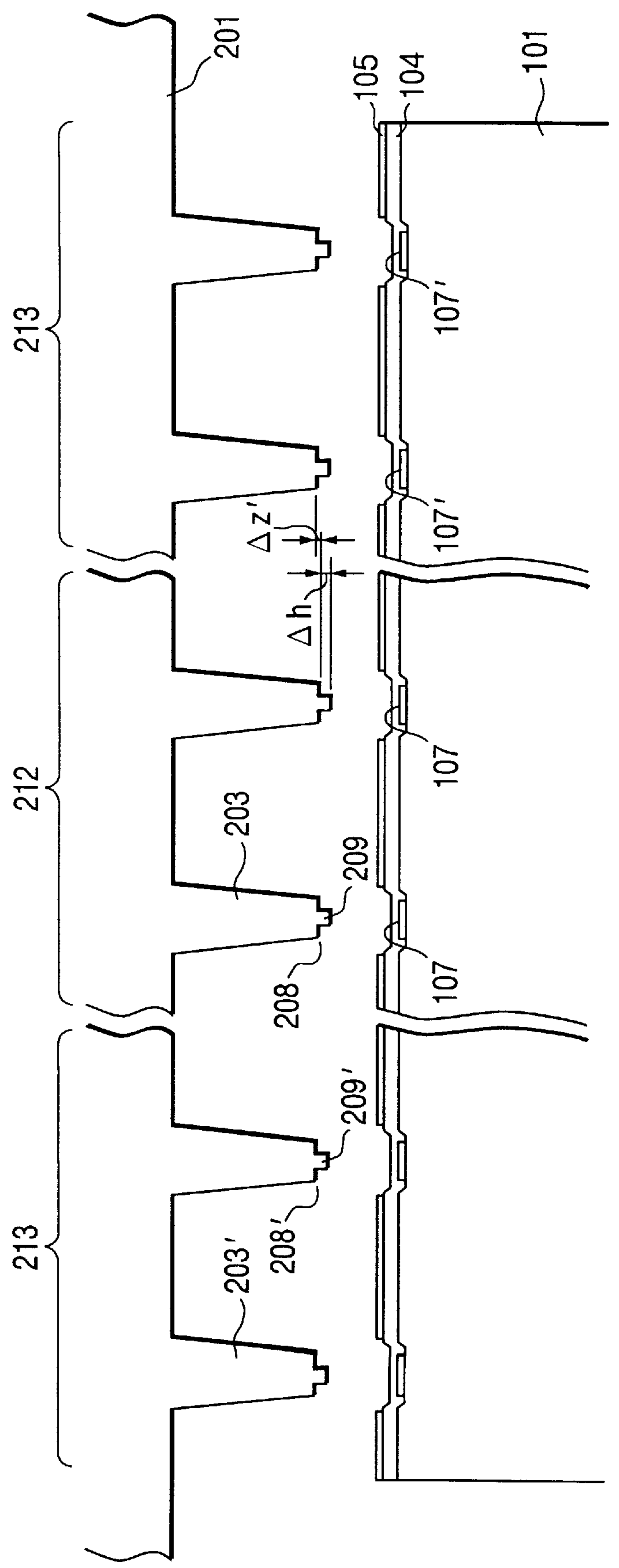
FIG. 37 is a schematic plan view showing another embodiment of the manufacturing process for the ink jet printing head of the present invention.
Figure 38A:
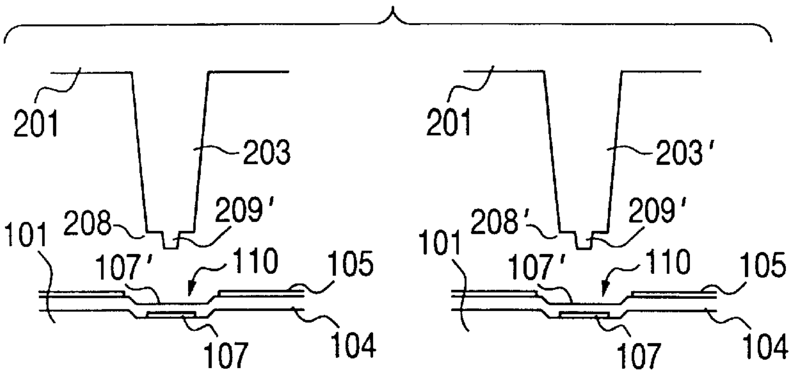
FIGS. 38A, 38B, 38C, 38D and 38E are schematic cross-sectional views showing the joining method in the printing head shown in FIG. 37.
Figure 38B:
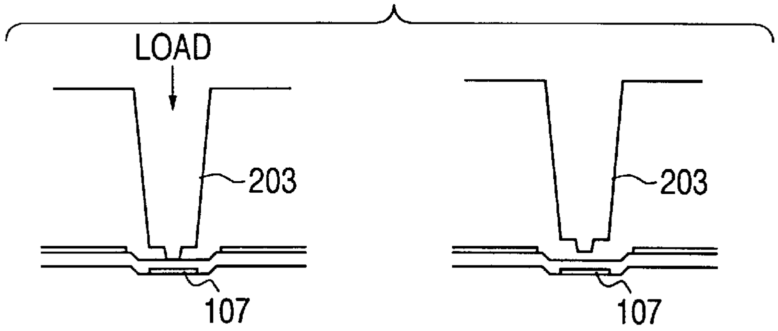
Figure 38C:
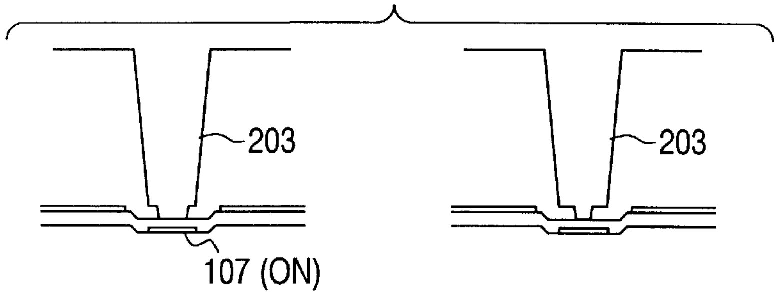
Figure 38D:
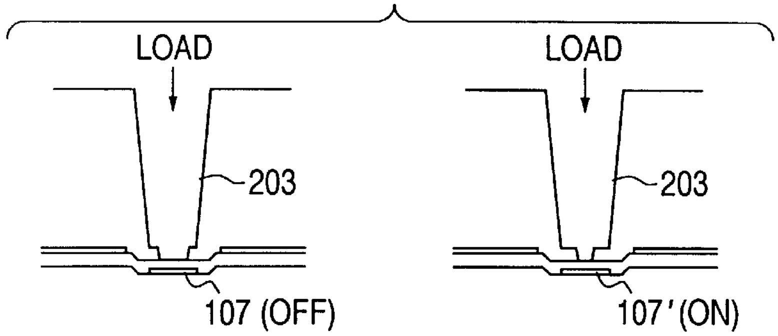
Figure 38E:
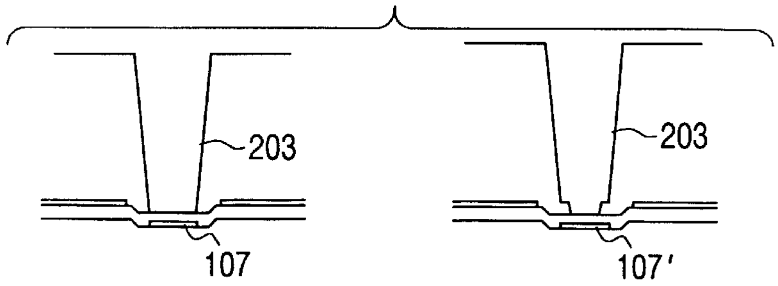
Figure 39:
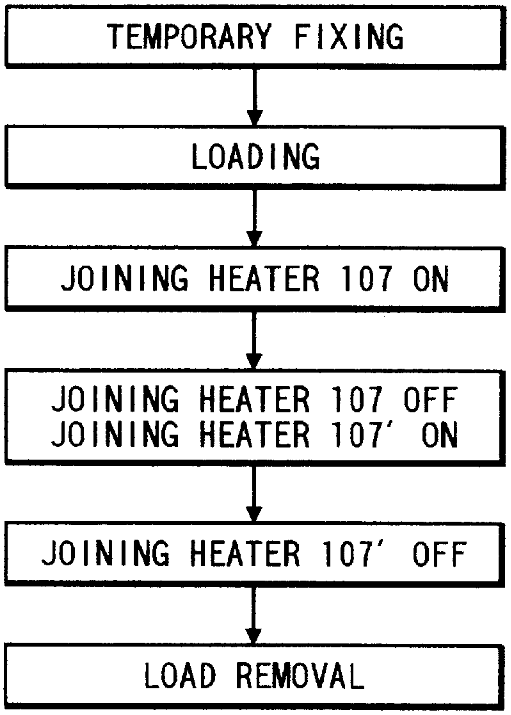
FIG. 39 is a flow chart showing the steps in FIGS. 38A through 38E.
Figure 40:
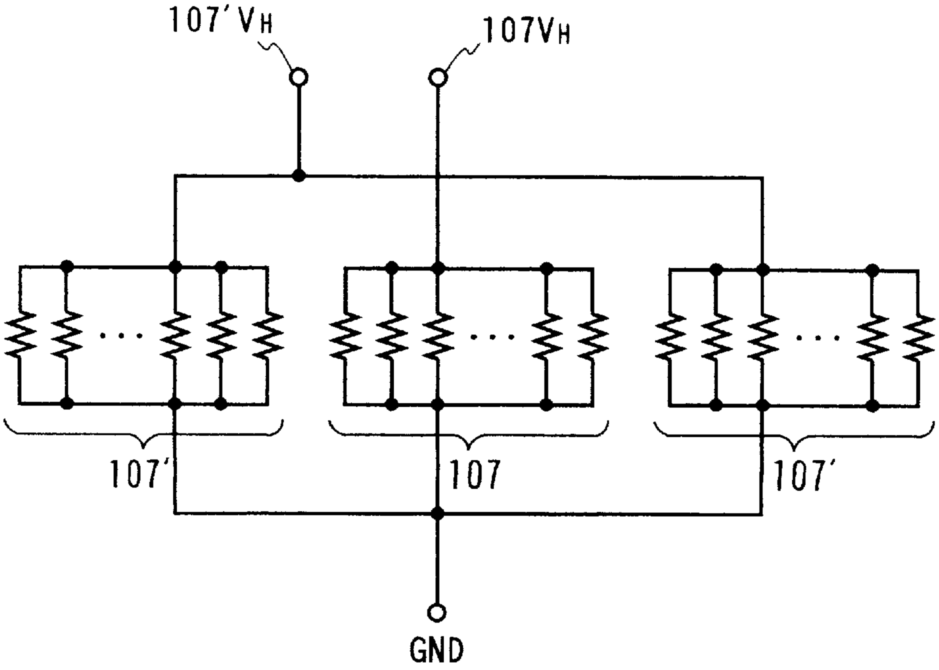
FIG. 40 is a circuit diagram relating to the joining heater of the present embodiment.

FIG. 37 is a schematic cross-sectional view showing another embodiment of the manufacturing process for the ink jet printing head of the present invention, while FIGS. 38A–38E are schematic cross-sectional views showing the joining method in the printing head shown in FIG. 37, and FIG. 39 is a flow chart of the steps shown in FIGS. 38A–38E. Also FIG. 40 is a circuit diagram relating to the joining heater in the present embodiment.

The present embodiment employs joining by fusion, without using the adhesive layer.

FIG. 37 shows a ceiling plate provided with an array 212 of grooves for forming nozzles for discharging liquid droplets (hereinafter, referred to as "nozzle groove array"), and, on both sides of such array, with arrays 213 of grooves for forming dummy nozzles (hereinafter, referred to as "dummy nozzle groove array"). The nozzle walls 203 and the dummy nozzle walls 203' are respectively provided, on end portions thereof, with projections 209, 2091 for ensuring initial contact between the ceiling plate and the substrate. The projections 209, 209' are so designed as to easily crash and deform in spaces between the joining heaters 107 and the ends 208, 208' of the nozzle wall, by the downward load in the Z direction, applied for temporary joining of the ceiling plate and the substrate.

In the nozzle array requiring secure joining for achieving stable liquid droplet formation, the end portions 208 of the nozzle walls 203 of the nozzle groove array 212 protrude more than the end portions 2081 of the nozzle walls 203' of the dummy nozzle groove array 212, in the direction of joining. This structure is to securely contact the nozzle walls 203 of the nozzle groove array 212 with the substrate even in case the ceiling plate itself contains a bending deformation in the Z direction. The dummy nozzle groove array 213 protrudes more than a liquid chamber frame 210.

The end portions of the nozzle walls 203 and the dummy nozzle walls 203' have a substantially identical form, in the cross section shown in FIG. 37.

In the present embodiment, the nozzle walls are arranged with a density of 600 dpi, and the width of the end of the nozzle wall and the height of the nozzle wall are respectively 8 $\mu m$ and 25–45 $\mu m$. The height of the nozzle wall may be selected, in advance, larger than a value suitable for liquid droplet formation, in consideration of the possible sinking of the nozzle wall by the melting to be explained later.

The amount $\Delta Z1$ of the above-mentioned protrusion of the nozzle walls 203 and the height $\Delta h$ of the projections 209, 209' in the Z direction are respectively about 4 and 6 $\mu m$. The plane of the liquid chamber frame 210 is positioned at the side of the nozzle walls 203' opposing to the side of the joining position, and the amount $\Delta Z2$ of the protrusion of the nozzle walls 203 toward the substrate, with respect to the liquid chamber frame is 8 $\mu m$.

According to the condition $\Delta Z1<$(protruding height) in the configuration of the present embodiment, when the ceiling plate sinks in the Z direction in such a manner that the nozzle walls 203 are substantially joined to the substrate by the energization of the joining heaters 107, the nozzle walls 203' are at the same time brought into contact, across the projections 209', with the surface of the joining heaters 107' of the substrate.

The present embodiment may be have further the feature that the joining heaters 107, 107' are provided on the substrate, respectively corresponding to the nozzle walls 203, 203', and that the joining heaters 107 corresponding to the nozzle groove array 212 are connected by parallel circuit in such a manner that the resistances of the segments become mutually equal. On the other hand, the joining heaters 107' corresponding to the dummy nozzle groove array 213 are connected by parallel circuits which are drivable independently from those for the Joining heaters 107 (cf. FIG. 40). As a result, the group of the joining heaters 107 and that of the heaters 107' can be given mutually different energies and/or drive timings.

In the following there will be explained, with reference to FIGS. 38A–38E and 39, the procedure of joining of the ceiling plate of the configuration, having a step difference on the face to be joined by fusion, as shown in FIG. 37.

At first the ceiling plate and the substrate are mutually aligned in a predetermined positional relationship and are temporarily fixed (FIG. 38A). Then a load is applied to the ceiling plate in the Z direction, thereby maintaining the nozzle wall ends 208 and the substrate 101 in pressure contact (FIG. 38B). in this step, the projections 209 are crashed and deformed on the substrate. Thus, in the nozzle groove array 212, the gap between the nozzle walls and the substrate, resulting from the bending of the ceiling plate, can be eliminated. The nozzle walls 203 are uniformly contacted with the substrate under pressure, and a heat insulation layer due to the separation of the nozzle walls 203 to be melton and the substrate constituting the heat source is not generated.

After the pressure contact, the joining heaters 107 are energized to melt the polysulfone resin (FIG. 38C) and to substantially fill the space between the joining portions of the ceiling plate and the substrate surface with the melton substance, whereby the main step of the joining of the nozzle walls 203 and the substrate is completed. In order to heat the contacting portions only of the ceiling plate and to avoid melting the entire ceiling plate, the joining heaters are preferably driven by the supply of a pulsed intermittent current at a frequency of 1–10 kHz rather than a DC current supply.

In this state the nozzle walls 203' are contacted, across the deformed projections 209', with the substrate. Then the joining heaters 107' are energized to start thermal melting of the nozzle wall ends 209' (FIG. 38D). Approximately at the same time the joining heaters 107 are deactivated, in order to avoid excessive heating of the nozzle walls 203. With such deactivation of the heaters 107, the surfaces of the heaters 107 are rapidly cooled by heat dissipation into the substrate and to the main body of the ceiling plate.

In case the ceiling plate sinks by the melting of the nozzle wall ends 209', also the nozzle walls 203 are further pressed to the substrate. Therefore, if the joining heaters 107' are activated after the deactivation of the heaters 107, it is preferable to re-start the sinking before the resin of the nozzle wall ends 209 solidifies. In case the substrate 101 is based on crystalline silicon with a thickness not exceeding 1 mm, the delay time between the deactivation of the joining heaters 107 and the activation of the heaters 107' is preferably 1 sec or less, more preferably 100 msec or less.

By the energization of the joining heaters 107', the joining of the nozzle walls 203 and the substrate is completed also in the dummy nozzle groove array 213, in the same manner as in the nozzle groove array 212 (FIG. 38E).

The load applied for the pressure contact may be temporarily or completely removed after the joining step, but the attachment of the pressing spring, known in the conventional configuration of the thermal ink jet head, may be made in the load applying step shown in FIG. 39.

In the configuration explained above, it is rendered possible to heat only a necessary portion each of the surfaces formed with a step difference at a desired timing, in the heating step for the nozzle wall ends 208' and the projections 209', by deactivating the joining heaters 107 corresponding to the nozzle walls 203 which have already been melton and joined with the substrate, thereby preventing the deterioration in the reliability and the strength of joining of the nozzle groove array 212 due to the excessive heating. Also it is possible to reduce the amount of discharged heat by resulting from the supply of excessive energy, thereby achieving energy saving in the process.

In addition, since the group of the joining heaters 107 and that of the heaters 107' are not energized at the same time, the joining apparatus can be designed with a lowered electrical load and can therefore reduced in cost.

In order to drive the group of the joining heaters 107 and that of the joining heaters 107' under mutually different conditions, it is possible to connect these groups to a common diode matrix circuit or a common shift register and to differentiate the driving condition or timing for the two groups by the combination of input signals. Also the drive circuit for the joining heaters may be incorporated into the circuit for the heaters 102 for liquid droplet formation.

In the present embodiment, all the joining heaters 107 to be used for forming the nozzles, other than those for the dummy nozzles, are connected in parallel and are driven simultaneously under a same energy. But there may also be adopted a circuit configuration capable of dividing the heaters into blocks in consideration of the shape and position of the nozzle walls and driving such blocks with delay and/or under different application conditions. Also different drive conditions may be adopted for individual joining heaters.

Embodiment 16

The foregoing embodiment 15 shows a configuration without using the adhesive layer. But, in a position requiring a particularly high reliability of joining, such as at the nozzle wall end, or in case the ceiling plate shows a bending deformation of a level that cannot be corrected, in the Z direction by the load applied at the energization of the joining heaters, it is also considered to form an adhesive layer of a thermoplastic material in the contacting portions of the substrate and/or the ceiling plate, more preferably to form an adhesive layer within the effective area of the surface of the joining heater, to activate the joining heater directly under such adhesive layer at the start of the heating step, and to execute the temporary joining step and the subsequent step for the ceiling plate when such adhesive layer is softened.

The above-explained procedure enables satisfactory joining of the ceiling plate in a relatively simple manner, without requiring precise correction in the shape of the ceiling plate for compensating the step difference, resulting from the thickness of the adhesive layer itself, in the joining face between the ceiling plate and the substrate.

Embodiment 17

Figure 41:
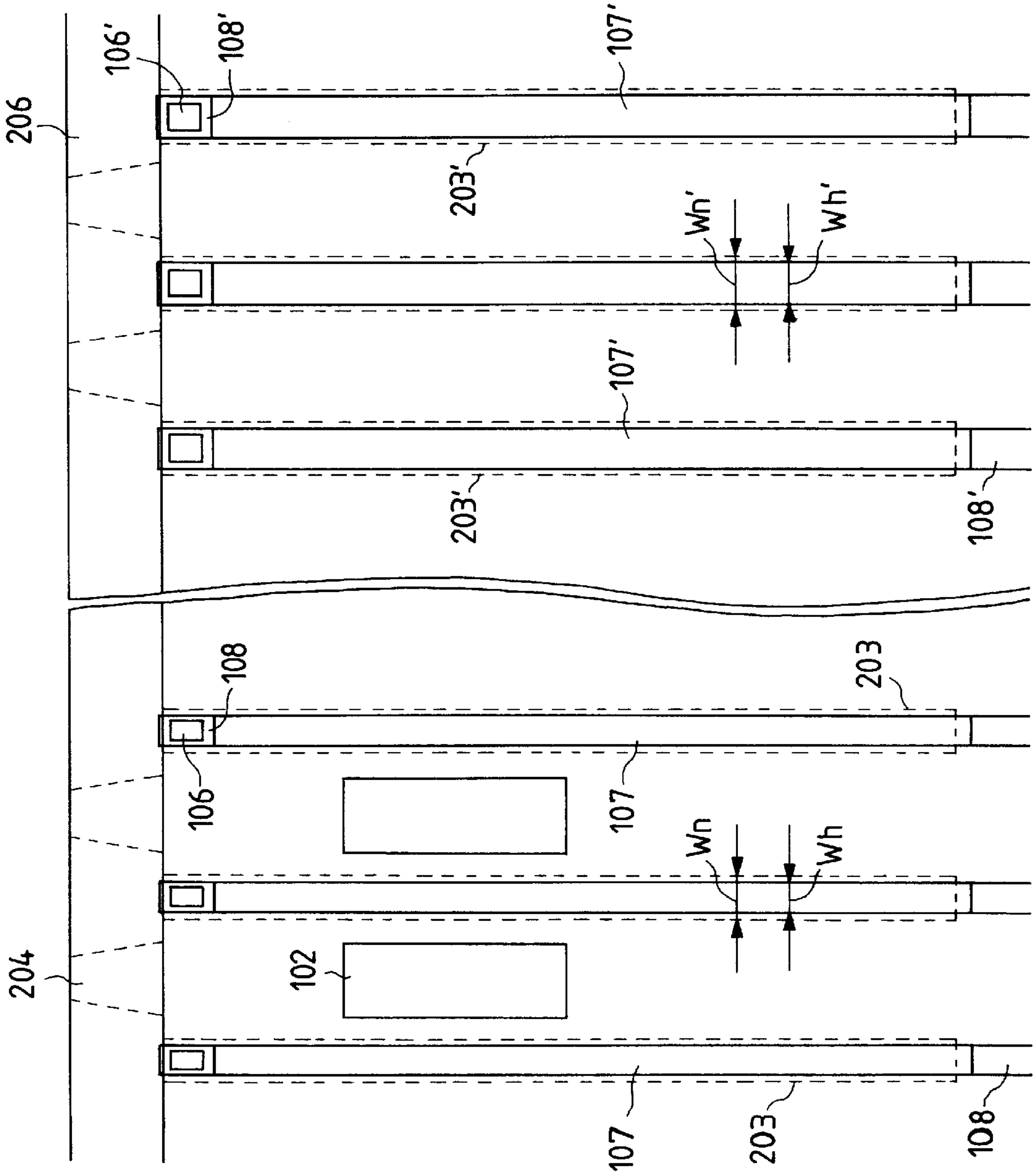
FIG. 41 is a schematic plan view showing the configuration of the joining heater in another embodiment of the ink jet printing head of the present invention.
Figure 42:
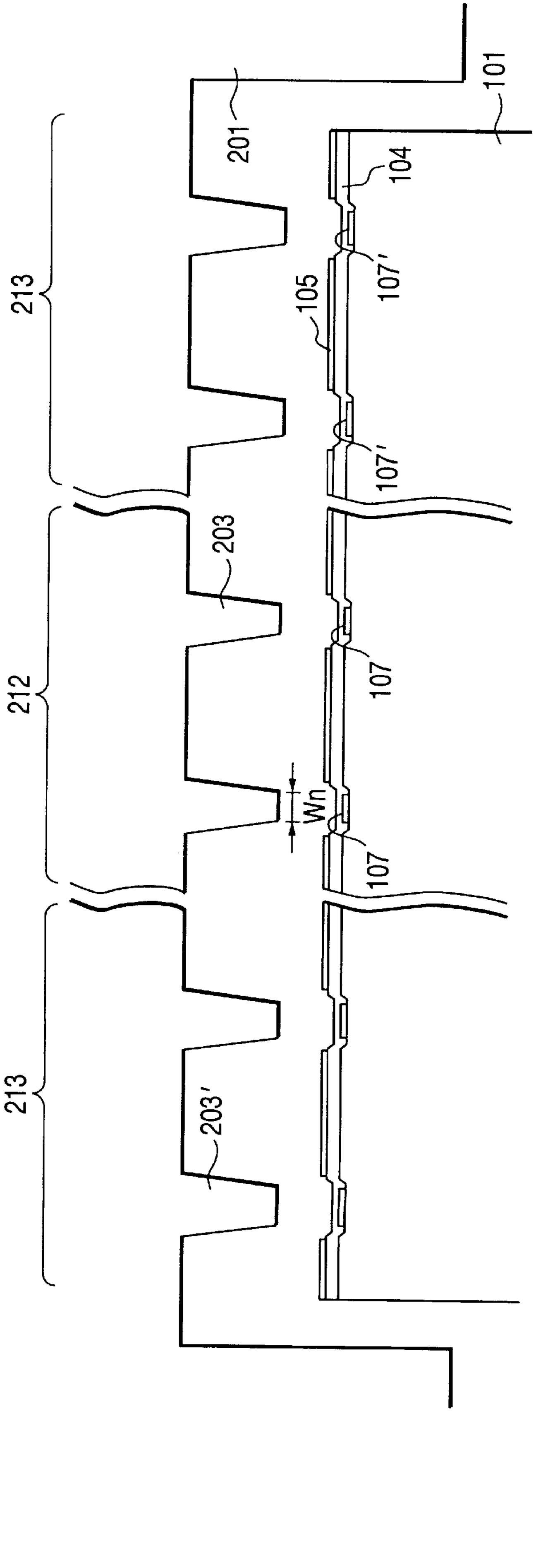
FIG. 42 is a schematic cross-sectional view of the printing head shown in FIG. 41.

FIG. 41 is a schematic plan view showing the configuration of the joining heaters in another embodiment of the ink jet printing head of the present invention, and FIG. 42 is a schematic cross-sectional view of the printing head shown in FIG. 41. This embodiment provides a configuration for obtaining a higher joining strength, in case the nozzle array of a polysulfone ceiling plate is joined, by spontaneous adhesive force, to the joining surface of the substrate.

In the configuration shown in FIG. 41, for generating a practical adhesive strength with the polysulfone resin, the $SiO_2$ protective layer 104 is exposed on the contact surface of the substrate. On the contacting surface there may also be exposed $Ta_2O_5$, obtained by local oxidation of Ta constituting the anticavitation layer 105. The nozzle pitch is 600 dpi for the entire nozzle array.

The present embodiment may be have the feature that, in the dummy nozzle groove arrays 213 positioned on both sides of the nozzle groove array 212, the width Wn' of the nozzle wall ends 209' is made larger than the width Wn of the nozzle wall ends 209. More specifically, Wn and Wn' are respectively 8 μm and 12 μm. For simplifying the configuration, the nozzle groove array 212 and the dummy nozzle groove array 213 do not constitute a step difference in the Z direction.

The widths Wh, Wh' in the X direction of the joining heaters 107, 107' corresponding to such nozzle walls are respectively 6 μm and 12 μm. The circuit design is so made that the heaters 107 and 107' can be driven in mutually different conditions, including the drive timing (cf. FIG. 40).

In the configuration of the ceiling plate shown in FIG. 41, the joining area per nozzle wall in the dummy nozzle groove array 213 is larger than that in the nozzle groove array 212, and a larger joining force can be obtained by heating the nozzle wall ends 208, 208'.

On the other hand, in order to melt the polysulfone resin at the nozzle wall ends, it is required to locally heat the contacting portions to 180° C. or higher. As the joining heaters 107 and 107' are different in that the latter is wider and in the area of the heating surface, they require different drive conditions, such as the voltage, current, application time, pulse duration or total pulse number, in order to melt the resin at the joining portions and not to cause overheating. It is generally preferable to select such conditions that the amount of heat generation per unit area of the joining heater becomes substantially same. On the other hand, the configuration of the present embodiment allows to select conditions for the joining heaters 107 and 107', suitable for the melting of the respectively corresponding groups of the nozzle walls.

In the configuration of the present embodiment, since the nozzle walls are arranged without the step difference in the direction of joining, the drive conditions for the joining heaters 107, 107' can be so selected as that the melting of the joining portions of the nozzle walls 203, 203' proceeds substantially simultaneously, in order to improve the thermal efficiency of melting. More preferably the joining heaters 107 and 107' are energized without mutual delay.

The configuration of the present embodiment has areas of a relatively high joining strength at both ends of the nozzle array where secure joining is required, thereby enabling satisfactory joining of the ceiling plate.

Embodiment 18

Figure 43:
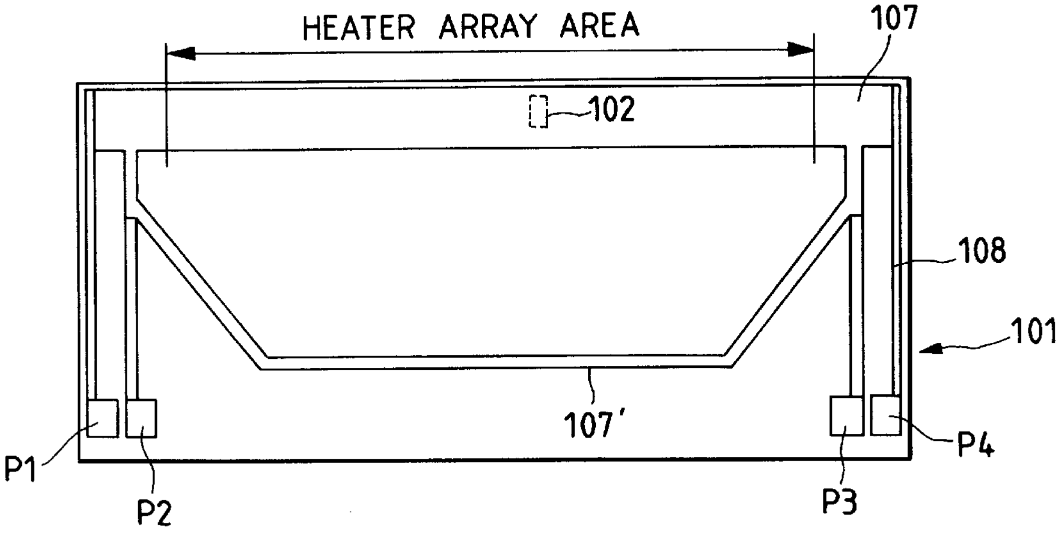
FIG. 43 is a schematic plan view of the substrate in another embodiment of the ink jet printing head of the present invention.
Figure 44:
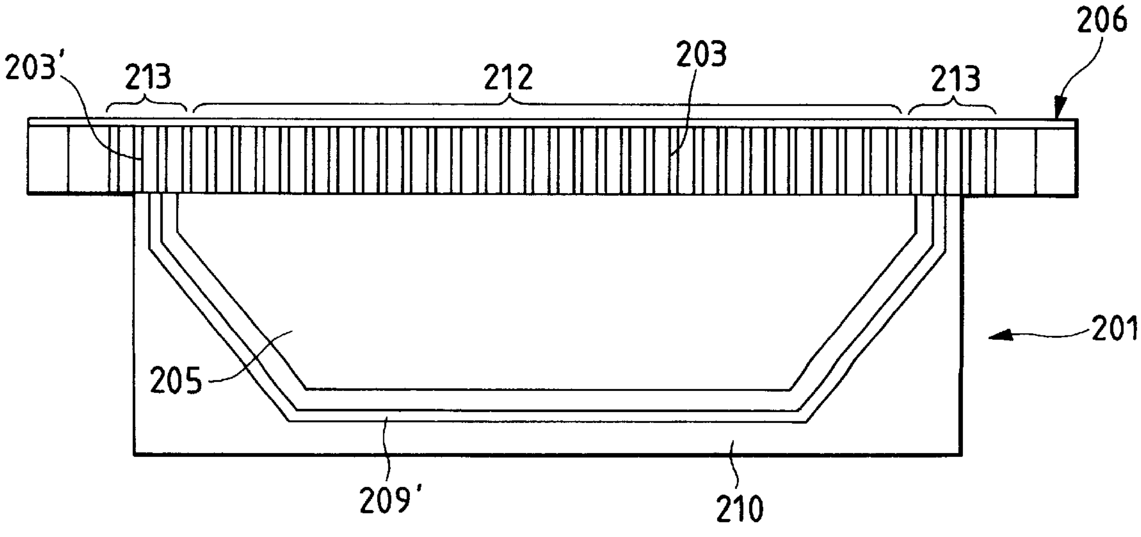
FIG. 44 is a schematic plan view of the ceiling plate of the printing head shown in FIG. 43.
Figure 45:
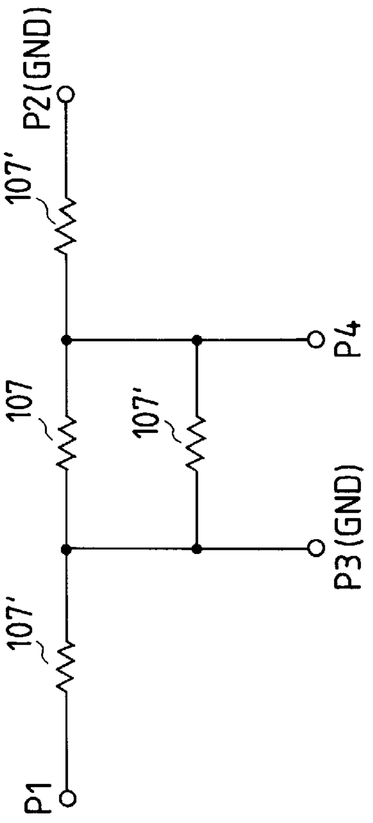
FIG. 45 is a circuit diagram of the printing head shown in FIG. 43.
Figure 46:
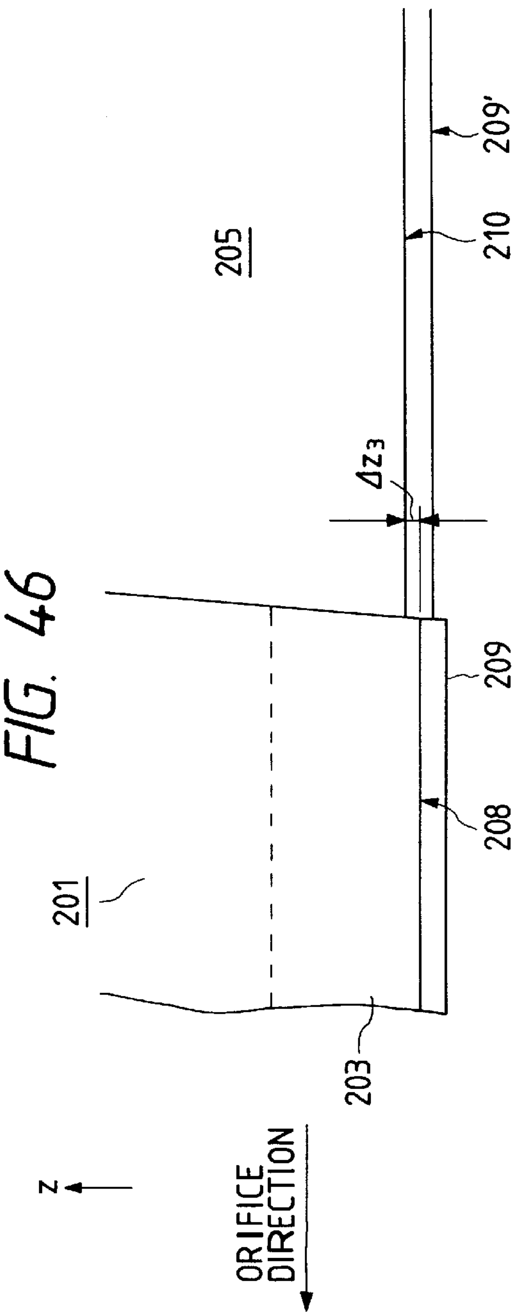
FIG. 46 is a schematic cross-sectional view showing the step relationship of a joining face in the present embodiment.

FIG. 43 is a schematic plan view showing the substrate in another embodiment of the ink jet printing head of the present invention, FIG. 44 is a schematic plan view showing the ceiling plate of the printing head shown in FIG. 43, FIG. 45 is a circuit diagram thereof, and FIG. 46 is a schematic cross-sectional view showing the step difference in the joining face of the present embodiment. In the present embodiment, the liquid chamber frame is joined to the substrate in order to assist the joining of the nozzle walls to the substrate.

In the present embodiment, there is provided, in addition to the joining heater 107 for heating and melting the nozzle wall end, a joining heater 107' for heating the contacting portion of the liquid chamber frame (FIG. 43). The joining heaters 107, 107' can be individually energized by selecting input points $P_1$–$P_4$ of the electrical signal (cf. FIG. 45). The joining heater 107 is functioned by supplying current to the Ta film exposed on the surface of the substrate from the exterior, and is also used as the anticavitation layer. The joining heater 107' also functions, as the heat generating member, which is made of a Ta film exposed to the surface of the substrate and simultaneously formed at the same patterning step of the Ta film as in formation of the heater 107. The surface of the joining heater 107' may be subjected to an oxidation process in advance, for ensuring the joining force between the substrate and the polysulfone resin constituting the ceiling plate, thereby improving the ink sealing property of the liquid chamber frame after the ceiling plate is joined.

The configuration of the ceiling plate to be joined to the substrate shown in FIG. 43 will be explained with reference to FIGS. 44 and 46.

FIG. 44 shows the ceiling plate 201 seen from the side of a recess constituting the liquid chamber, and there are shown a nozzle groove array 212, a dummy nozzle groove array 213 and a liquid chamber frame 210 which is provided with a projection 209' that can be easily crashed and deformed by contact with the substrate. The joining surface is provided with such step differences that, as shown in FIG. 46, the projection 209 at the end of the nozzles wall 203, the projection 209', the end of the nozzle wall and the liquid chamber frame 210 protrude in this order in the direction of joining. The nozzle walls do not have a step difference between the nozzle groove array 212 and the dummy nozzle groove array 213. In this configuration, even if the joining face of the ceiling plate has a certain bending deformation in the Z direction, when the ceiling plate and the substrate are joined, the nozzle array is at first joined with the substrate and then the projections 209' are joined with the joining heaters 107'. It is therefore also possible to effect the joining of the nozzle array, which is directly related with the ink discharge performance, without using the projections 209, and to employ the step differences in such a manner that the nozzle wall end, projection 209' and liquid chamber frame 210 protrude in this order in the direction of joining.

The step difference between the nozzle wall end and the liquid chamber frame should be as small as possible, for the formation of an ink path without leakage from the nozzle liquid chamber, which is the purpose of joining of the ceiling plate. The step difference ΔZ3 between the end 208, constituting the joining face of the nozzle wall, and the liquid chamber frame 210 is preferably 6 μm or less, more preferably 0 μm.

In the following there will be explained the steps of ceiling plate joining with reference to FIG. 47, which is a flow chart of the joining method in the present embodiment.

At first the ceiling plate and the substrate are aligned in a predetermined positional relationship and temporarily fixed, and a load is applied in the Z direction onto the ceiling plate to bring it in pressure contact with the substrate. In this step the projections 209, 209' are crashed and deformed on the substrate.

After the pressure contact is made, a current is supplied between P1 and P2 to generate heat from the joining heater 107, thereby melting the projection 209 and the nozzle wall end 208 and substantially filling the space between the joining portion of the ceiling plate and the substrate surface with the melton substance, thus achieving the joining in the principal portion of the nozzle array. When the dummy nozzles are provided on both sides of the nozzle array, current is supplied also between P1–P3 and between P2–P4 to achieve joining of the nozzle walls in such dummy nozzles. Also the Joining of the dummy nozzles may be omitted for the purpose of process simplification.

Finally a current is supplied between P3 and P4 to generate heat from the heater 107', thereby melting the projection 209' and completing the joining between the liquid chamber frame and the substrate.

Figure 47:
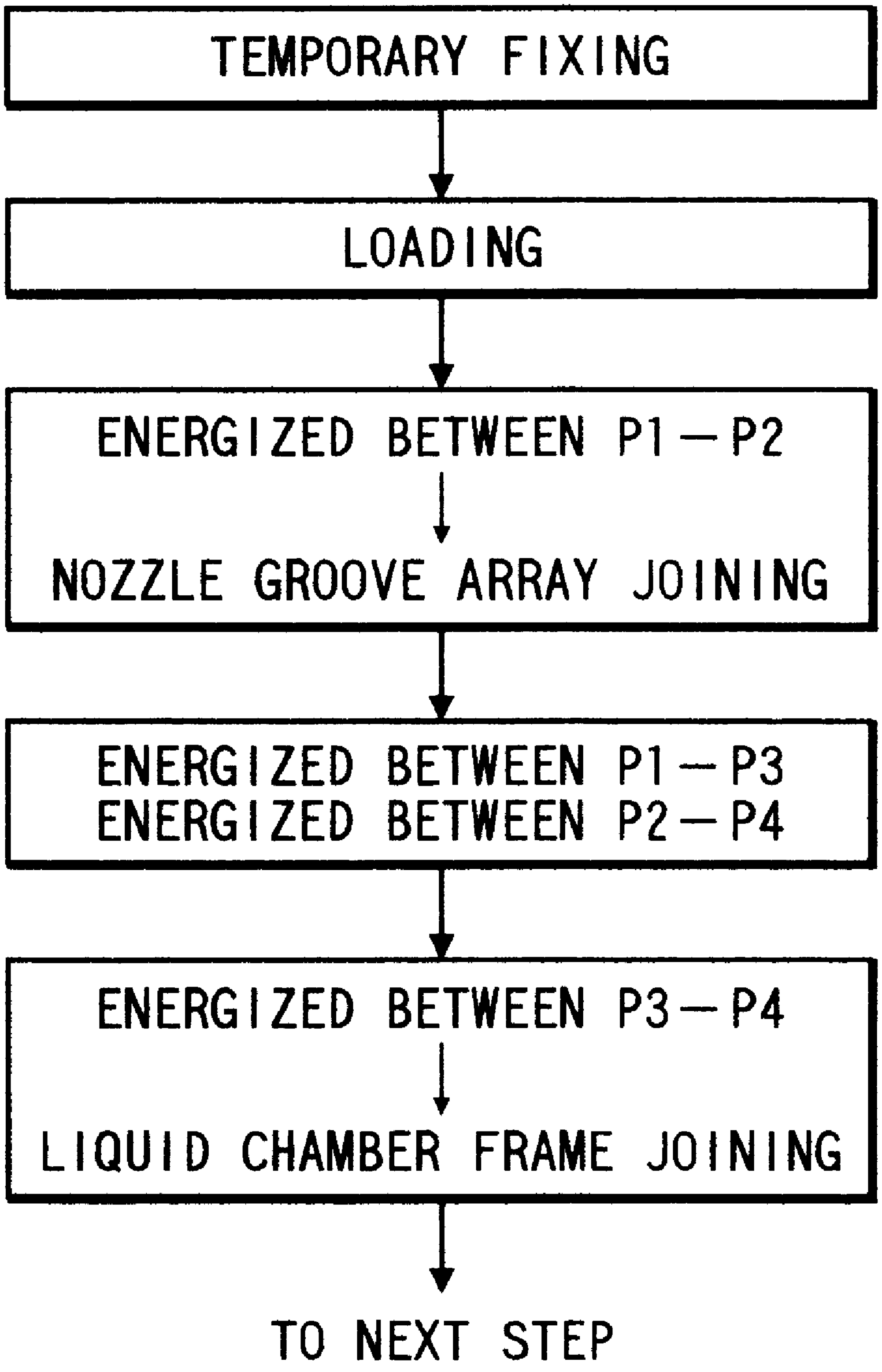
FIG. 47 is a flow chart showing the joining method in another embodiment of the manufacturing process for the ink jet printing head of the present invention.

The separation of the melting steps for the nozzle wall and for the liquid chamber frame as shown in FIG. 47 is to reduce the electrical load of the joining apparatus to thereby reduce the cost thereof, also to save the energy required in the process, and to avoid thermally induced drawback such as excessive rise in temperature of the substrate surface, resulting from the heating over a wide area including the liquid chamber frame and leading to the deformation of the resin constituting the ceiling plate.

Figure 48:
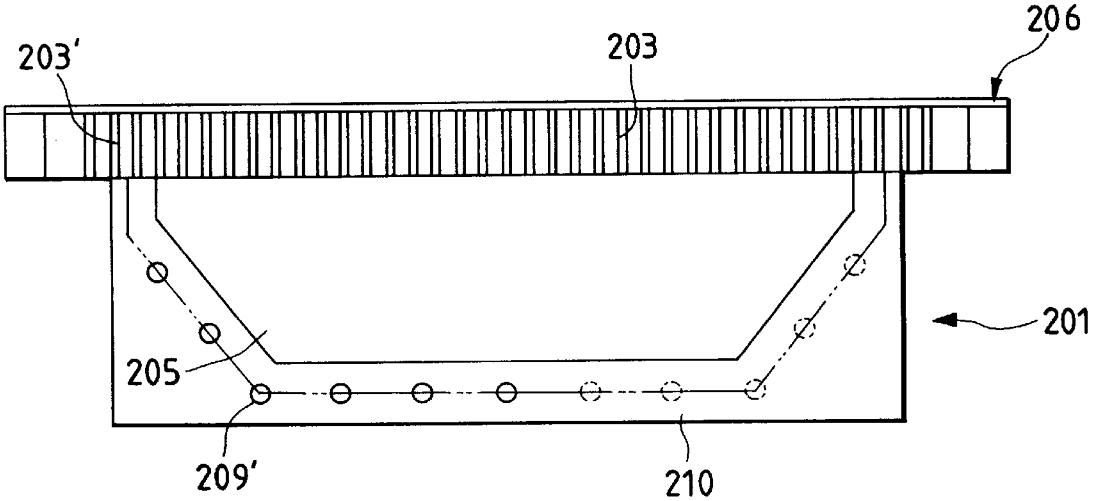
FIGS. 48 and 49 are schematic plan views showing other embodiments of the ink jet printing head of the present invention.

When it is required to improve not the sealing of the liquid chamber frame but merely reinforcing the joining of the ceiling plate and the substrate, it is also possible, instead of joining the entire periphery of the liquid chamber frame as in the present embodiment, to form joining points intermittently along the liquid chamber frame as shown in FIG. 48 and to provide such joining points with projections 209', thereby ensuring secure joining at such joining points.

Figure 49:
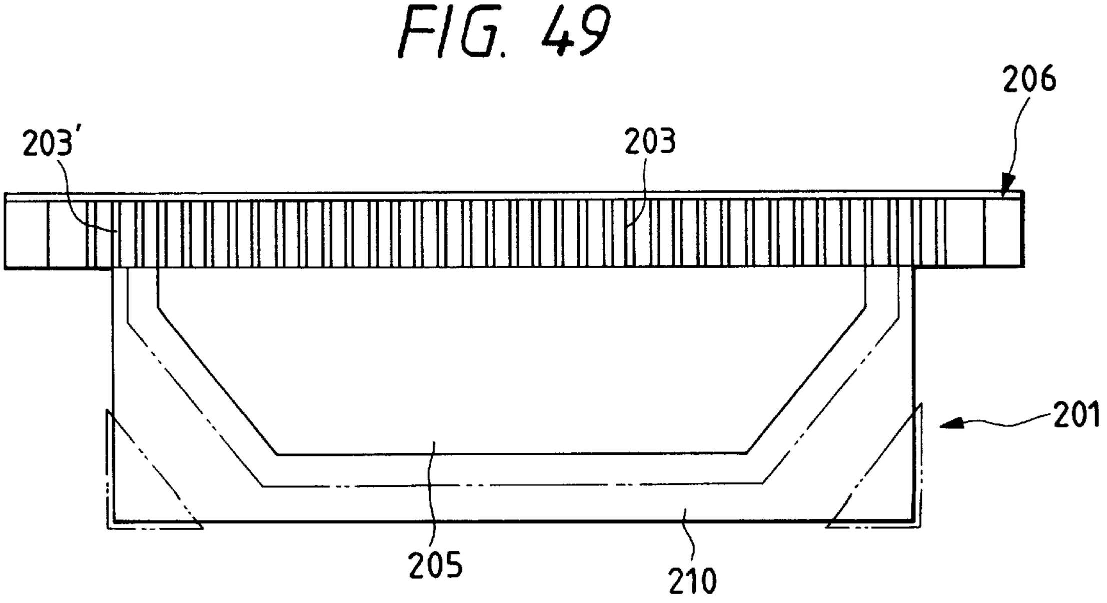

As a modified example of the present embodiment, it is also possible to provide the substrate with second joining heaters in positions indicated by double-dotted chain lines in FIG. 49 so as to be drivable independently from the joining heaters of the nozzle array, and to use such second joining heaters for temporary fixation of the ceiling plate and the substrate.

Figure 50:
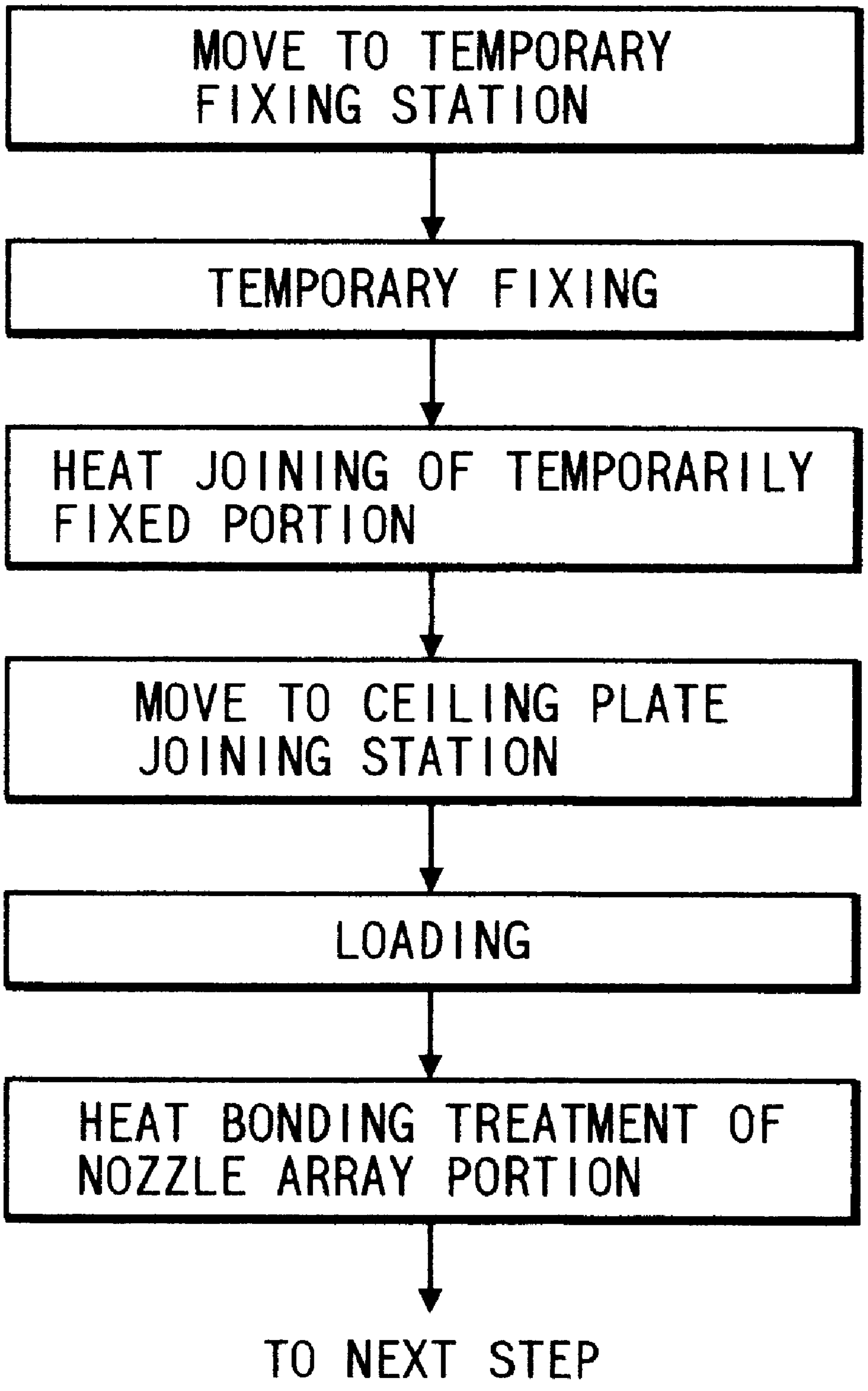
FIG. 50 is a flow chart showing the joining method in another embodiment of the manufacturing process for the ink jet printing head of the present invention.

In case the ceiling plate mounting step and the ceiling plate joining step are executed separately due to the limitation in the manufacturing space, the above-explained configuration facilitates the handling of the substrate and the ceiling plate while the ceiling plate and the substrate are maintained in the temporarily fixed state, according to the process shown in FIG. 50.

Embodiment 19

Figure 51:
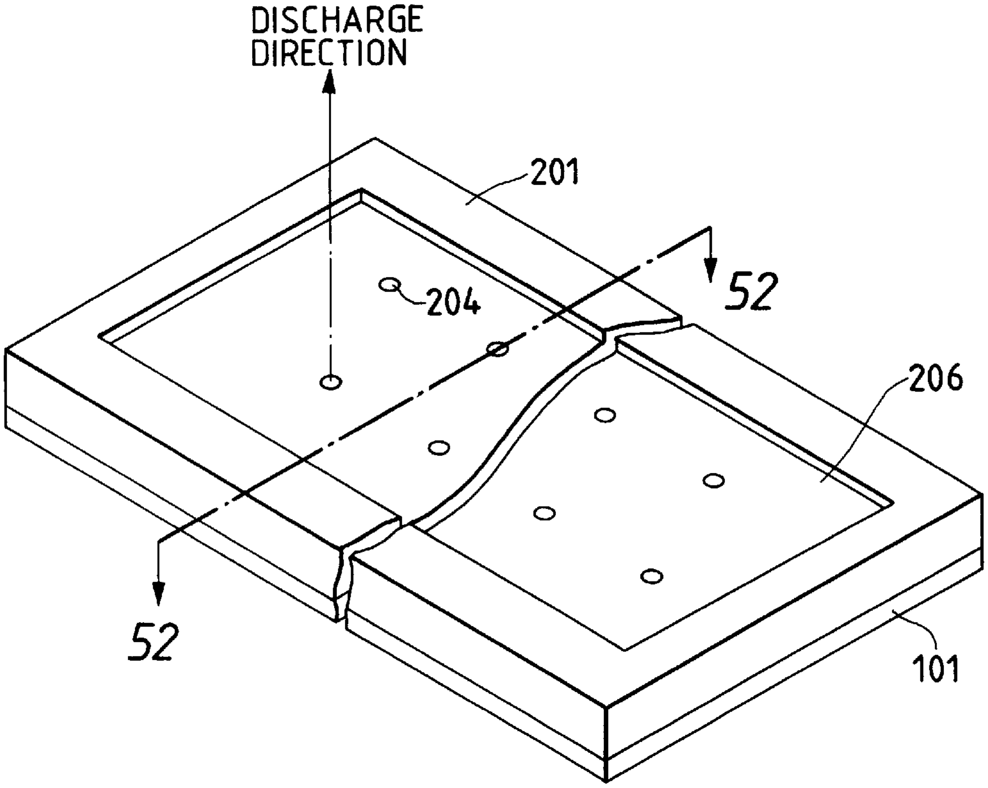
FIG. 51 is a schematic perspective view showing another embodiment of the ink jet printing head of the present invention.
Figure 52:
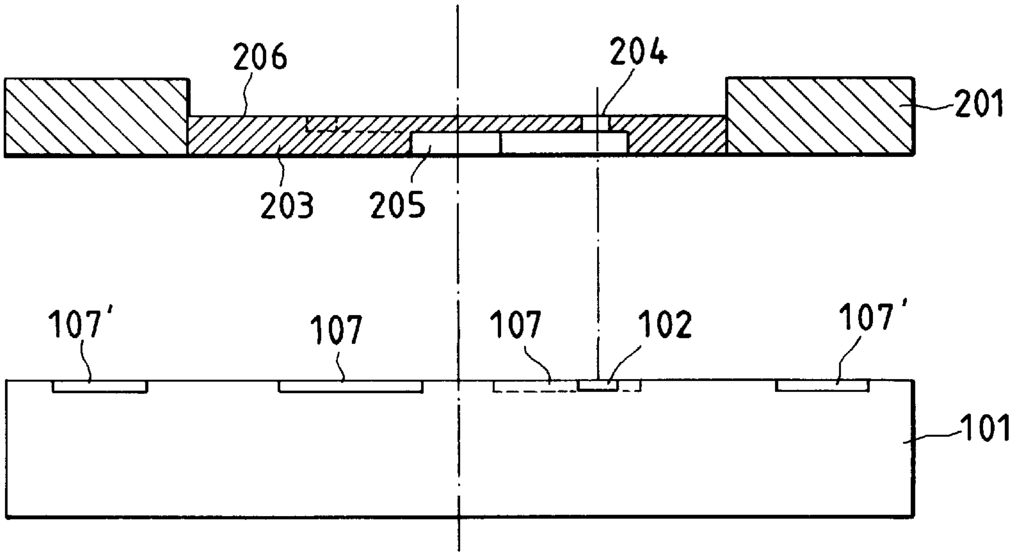
FIG. 52 is a cross-sectional view along a line 52—52 in FIG. 51.

FIG. 51 is a schematic perspective view showing another embodiment of the ink jet printing head of the present invention, and FIG. 52 is a cross-sectional view along the line 52—52 in FIG. 51.

In the present embodiment, in an ink jet printing head of so-called side shooter type as shown in FIG. 51 wherein the ink is discharged from an orifice 204 opposed to the face of a heater 102, a ceiling plate member 201 to be joined to the substrate 101 is formed by insertion molding of a film material in which the orifice 204 is formed.

In the ink jet printing head of the type shown in FIG. 52, it is required to reduce the distance between the heater 102 and the orifice 204, in order to generate a smaller droplet particularly for forming a high image quality. The above-mentioned distance in a practical thermal ink jet printing head is about 20 to 40 μm in order to obtain a discharge amount for example of about 10 pl.

In the present embodiment, in order to avoid the difficulty in molding the outer shape of the ceiling plate and the thin orifice plate at the same time, a film-shaped orifice plate 206 of a thickness of 30 μm is inserted into the molding of the outer shape of the resinous ceiling plate 201. The nozzle walls 203 and the orifices 204 are formed, after the molding of the ceiling plate, by excimer laser irradiation under gas cooling. When the outer part of the ceiling plate 201 and the orifice plate 206 are composed of different materials, they are preferably so selected that the linear expansion coefficient of the material of the outer part is equal to or larger than that of the material of the orifice plate, in order to maintain the flatness of the orifice plate at the time of heating the ceiling plate.

The present embodiment employs joining the ceiling plate by melting, and the joining heater 107 corresponding to the shape of the orifice plate 204 and the joinging heater 107' corresponding to the outer shape of the ceiling plate are rendered drivable under mutually independent drive conditions.

In the present embodiment, the nozzle walls formed with the external peripheral part of the ceiling plate and the orifice plate can both be easily joined to the substrate, without inducing deformation in the orifice plate by overheating in heating of such orifice plate which is significantly thinner than the external peripheral part of the ceiling plate. Even when the external peripheral part of the ceiling plate and the orifice plate are different in material, it is possible to carry out a heat treatment suitable for a various kind of material and resin to be used.

In the foregoing embodiments, the substrate is provided with grooves for accepting the joining portions of the ceiling plate and heat generating members for heating and melting such joining portions of the ceiling plate are provided in such grooves, but such grooves are not necessarily essential as long as the heat generating members are provided in the positions corresponding to the joining portions of the ceiling plate. However, in order to prevent the leaking flow of the melton substance of the end portions of the joining portions of the ceiling plate, it is preferably to provide the substrate with grooves and to fit the ends of the joining portions of the ceiling plate into such grooves. Also in order to avoid local separation of the ceiling plate from the substrate, the groove can be so formed as to have a bottom area larger than its aperture area, thereby creating an anchoring effect for the ceiling plate. Such configuration is effective, particularly in the multi-nozzle ink jet printing head of so-called side shooter type, for maintaining a uniform distance between the orifice face of the printing head and the print material (distance to paper).

In the following there will be explained other embodiments 20 to 24, in which the present invention is applied to an ink jet printing head of side shooter type.

Embodiment 20

Figure 54:
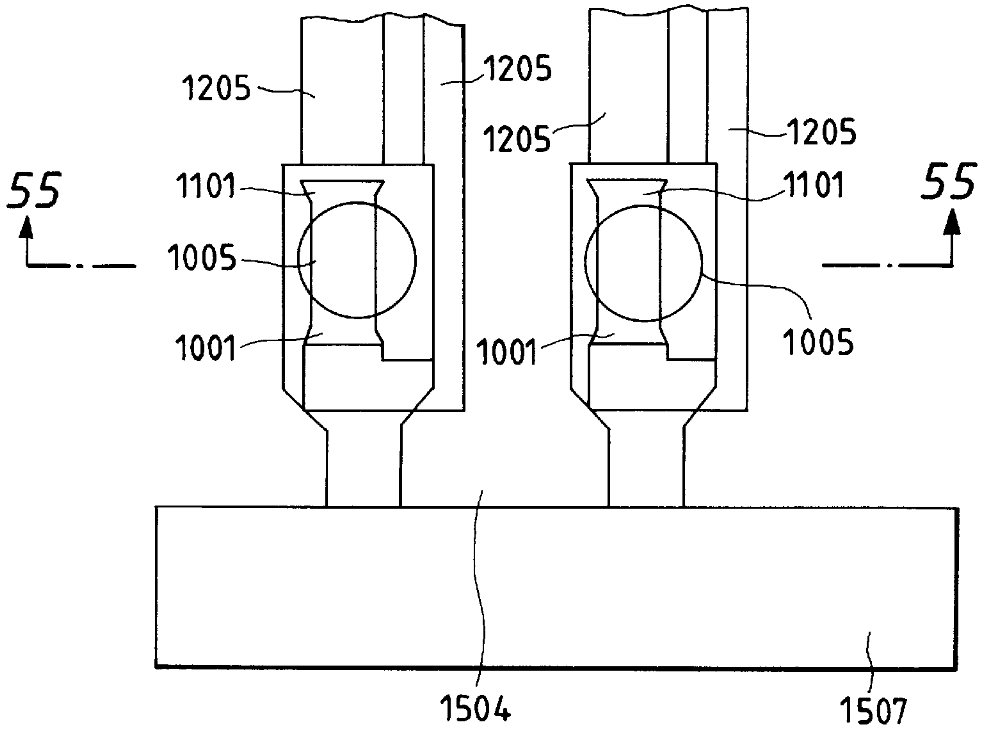
FIG. 54 is a plan view showing an embodiment of the ink jet printing head (side shooter type) of the present invention.
Figure 55:
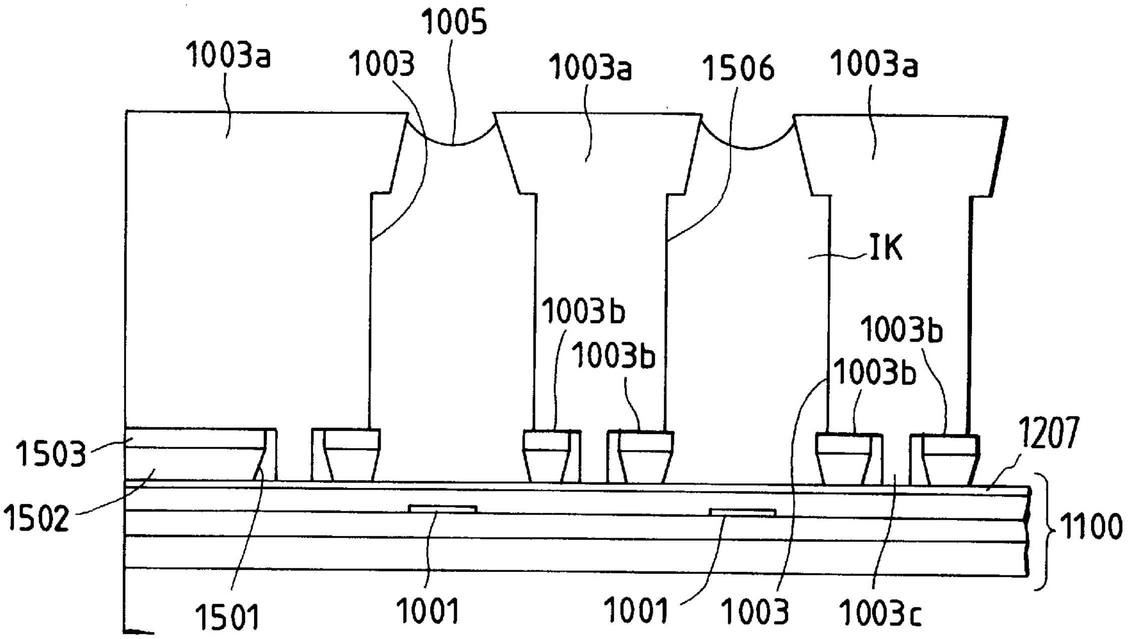
FIG. 55 is a cross-sectional view along a line 55—55 in FIG. 54.

FIG. 54 is a plan view showing an embodiment of the ink jet printing head (side shooter type) of the present invention, and FIG. 55 is a cross-sectional view along the line 55—55 in FIG. 54.

In the present embodiment, components equivalent to those in the foregoing embodiments are represented by the same number and will not be explained further.

In FIG. 55, an engaging groove or an engaging recess 1501 is provided on an anticavitation film 1207 of a printing head substrate 1100. The engaging groove 1501 is formed with inversely tapered walls showing an anchoring effect, by depositing a $SiO_2$ film 1502 of a thickness of ca. 2 μm on the anticavitation film 1207, further depositing a SiN film 1503 of a thickness of ca. 1 μm thereon, then patterning the SiN film 1503 by dry etching and wet etching the $SiO_2$ film 1502 at the bottom of thus etched portion. In FIGS. 54 and 55, a numeral 1504 indicates resinous ink path walls constituting walls of plural nozzles, and the ink path walls 1003*a* are formed as a part of the resinous orifice plate constituting nozzles as the ink paths when joined to the printing head substrate 1100 mentioned above. Each nozzle wall of the ink path walls 1003*a* is provided, at the bottom thereof, with a rib 1003*c* constituting an engaging protrusion for engaging with the engaging groove 1501. In order to achieve engagement of the rib 1003*c* into the engaging groove 1501 by drop-in fitting for example by vibration, a depth of 1 μm or larger is enough for the engaging groove 1501.

The configuration is so designed, when the rib 1003*c* of the ink path wall 1003*a* engages in the engaging groove 1501 of the printing head substrate 1100, that the top of the rib 1003*c* comes into contact with the bottom of the engaging groove 1501 and shoulders 1003*b* of the ink path wall 1003*a*, positioned on both sides of the rib 1003*c*, are in contact with the upper surface of the SiN film 1503 in the vicinity of the engaging groove 1501 of the printing head substrate 1100.

Between a plurality of ink path walls 1003*a*, there is formed a nozzle 1003, which is an ink path space on the printing head substrate 1100 corresponding to a heater 1101. Ink Ik is supplied to each nozzle 1003, as shown in FIG. 54, from an ink tank (not shown) through an ink supply path 1507 at an end of the printing head substrate 1100. At the front end of the nozzle 1003, there is formed a discharge opening 1005 for discharging a predetermined amount of ink Ik by an abrupt increase in the volume of the ink Ik by the function of thermal energy from the heater 1101 of the printing head substrate 1100.

The orifice plate mentioned above can be prepared by molding, including the ink path walls 1003*c* provided with nozzle 1003 and rib 1003*c* but excluding the discharge opening 1005. The orifice plate is preferably prepared by a process shown in FIGS. 56A–56D.

Figures 56A, 56B, 56C, 56D:
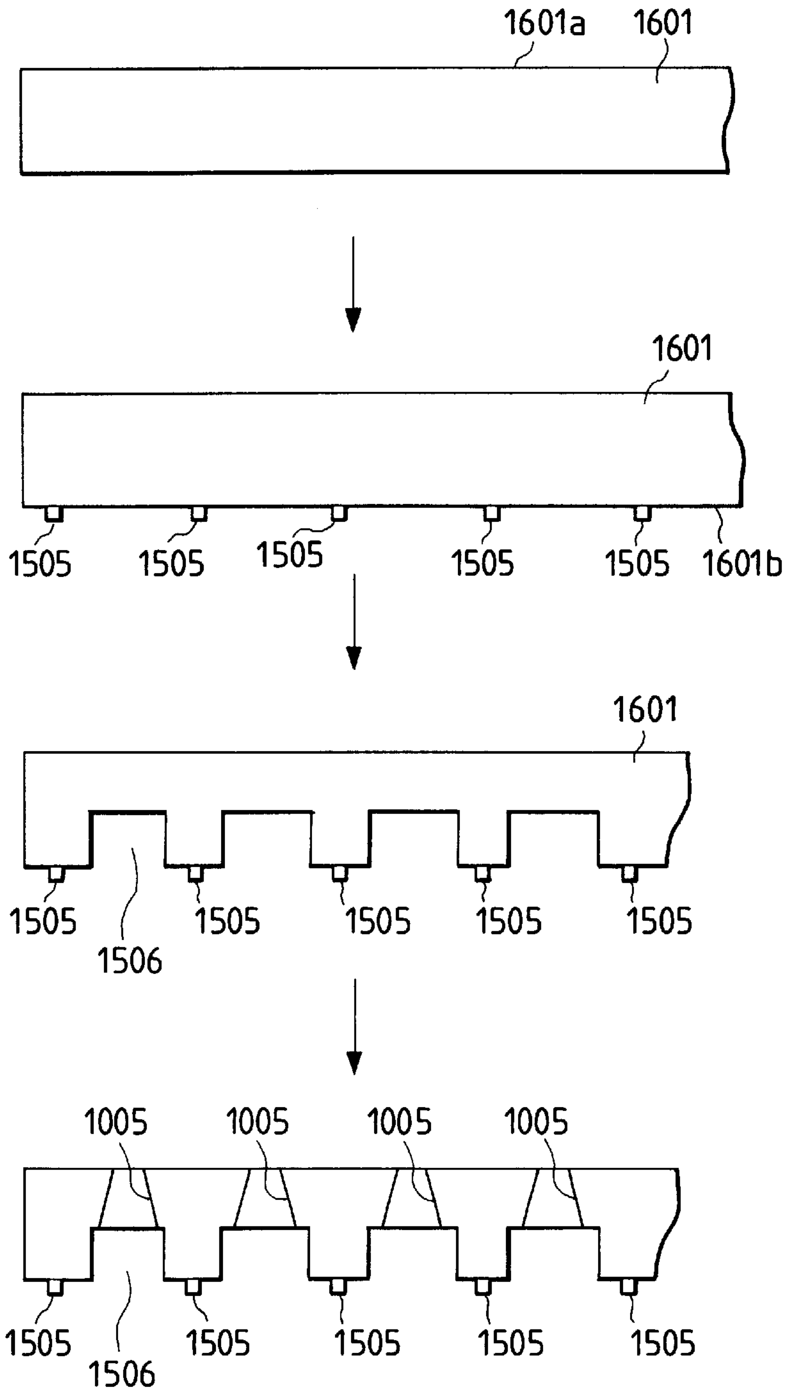
FIGS. 56A, 56B, 56C and 56D are cross-sectional views showing the manufacturing steps of an orifice plate to be employed in the ink jet printing head of the present invention.

Referring to FIG. 56A, a polysulfone sheet 1601 is prepared for example by molding or extension, and has a thickness of 100 μm in the present embodiment. A surface 1601*a* of the sheet 1601, on which the orifice is to be formed in a later step, is subjected to a water-repellent treatment.

Then, as shown in FIG. 56B, a mask (not shown) is applied so as to leave protruding ribs 1003*c* in predetermined positions of the other surface 1601*b* of the sheet 1601, and the excimer laser irradiation is applied thereon to effect surface working. The height of the rib 1003*c* is determined according to the depth of the engaging groove 1501 of the printing head substrate 1100 shown in FIG. 55. Also the surfaces on both sides of the rib 1003*c*, coming into contact with the upper surface of the SiN film 1503 in the vicinity of the engaging groove 1501 are preferably formed as flat as possible by surface working, in consideration of the structural stability of the orifice plate and the printing head substrate 1100.

Then, as shown in FIG. 56C, a mask (now shown) is applied so as to form precursor grooves of the nozzles 1003 in predetermined positions between the ribs 1003c on the other surface 1601*b*, and surface working is applied to the other surface 1601*b* by excimer laser irradiation.

Then, as shown in FIG. 56D, a mask (not shown) is applied so as to form a penetrated discharge opening 1005 at a predetermined position on the bottom of the precursor groove of the nozzle 1003, and excimer laser irradiation is directed to the bottom. The discharge opening 1005 has a cross sectional form wider at the side of the nozzle 1003 and narrower toward the surface 1601*a* of the orifice plate, and stable ink discharge is assured by such cross sectional form. The laser irradiation for opening the orifice is made, in the present embodiment, from the side of the nozzle (side of the other surface 1601*b*), but the irradiation from the side of the orifice (side of the surface 1601*a*) may be more preferable in certain cases. This is because, when the aperture diameter of the orifice becomes larger, the laser irradiation from the side of the nozzle may be unable to provide a sufficiently large aperture diameter due to the collision of the laser beam with a projecting part for example in the nozzle. On the other hand, the laser irradiation from the side of the orifice for avoiding such drawback will result in a tapering inverse to the desirable shape. The orifice of a tapered shape preferable for the stability of ink discharge performance can be obtained by providing the sheet to be worked with a sloped density in the thickness direction of the sheet, more specifically providing the sheet with the sloped density decreasing progressively from the side of the orifice toward the side of the nozzle or rib, and effecting the laser irradiation from the side of the orifice. Such orifice of a tapered shape preferable for the stability of ink discharge performance can otherwise be obtained by laminating, on the surface 1601*a* of the sheet 1601 for constituting the orifice plate, another sheet of a higher resin density and by effecting the laser irradiation from the side of the orifice.

In this embodiment, there was prepared a printing head for forming print dots of 100 μm in diameter at 360 dpi. The head employed a heater of a size of 40×85 μm, an orifice of a diameter of 30 μm, a nozzle wall with a height of 40 μm and a width of 15 μm, and a rib of a width of 5 μm and a height of 1 μm or more. The present embodiment was realizable with the rib height of 1 μm or more.

Embodiment 21

Figure 57:
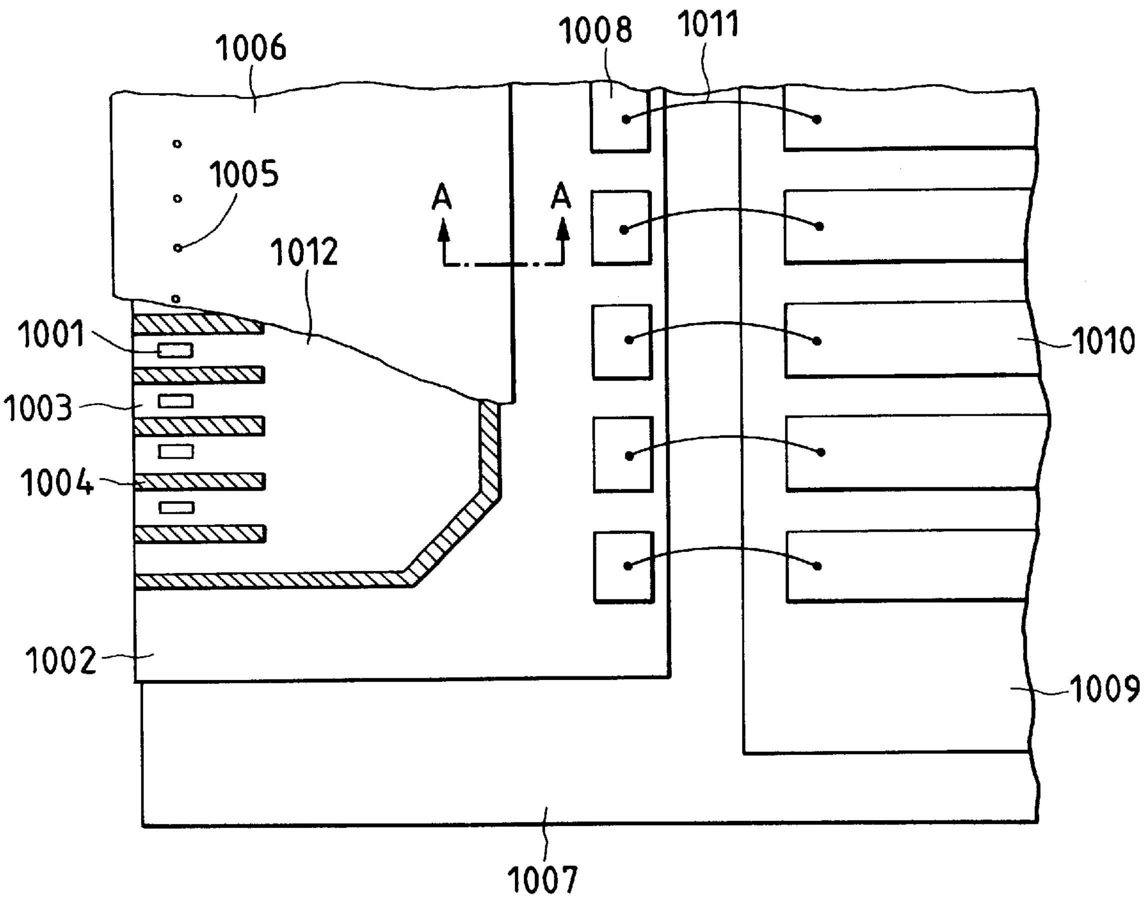
FIG. 57 is a partial plan view showing the principal parts of another embodiment of the ink jet printing head of the present invention.

FIG. 57 is a partial plan view showing another embodiment of the ink jet printing head (side shooter type) of the present invention.

In contrast to the foregoing embodiment, the present embodiment has the feature that the protruding portions formed on the ceiling plate are not limited to the ink path walls but expanded to the walls constituting the common liquid chamber 1012, and that recesses corresponding to the protruding portions are formed on the substrate. Such configuration securely prevents the intrusion of the sealant into the common liquid chamber 1012 in addition to the prevention of the crosstalk between the ink paths, and completely avoids the separation of the ceiling plate from the substrate, thereby enabling to maintain a constant distance to the paper and thus enabling to form the printed image of constant quality.

Figure 58:
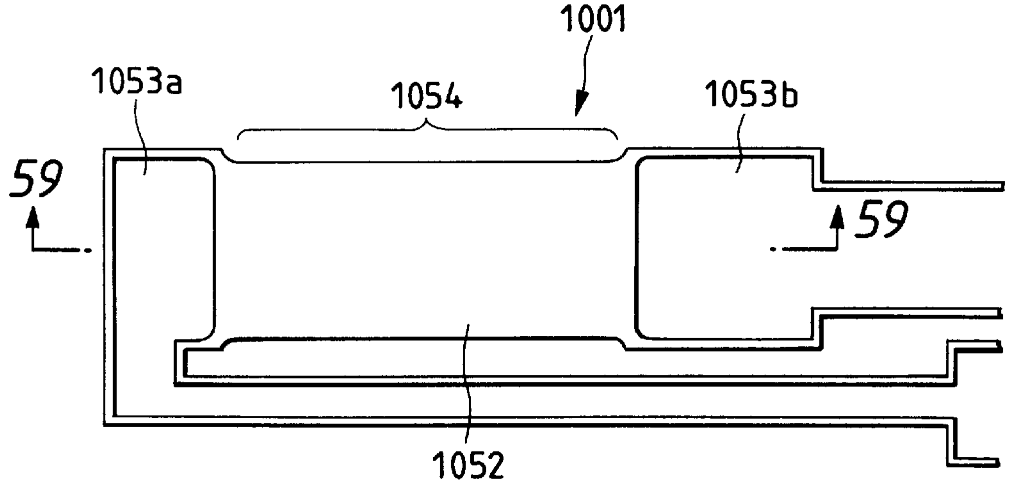
FIG. 58 is a magnified plan view of the electrothermal transducer shown in FIG. 57.
Figure 59:
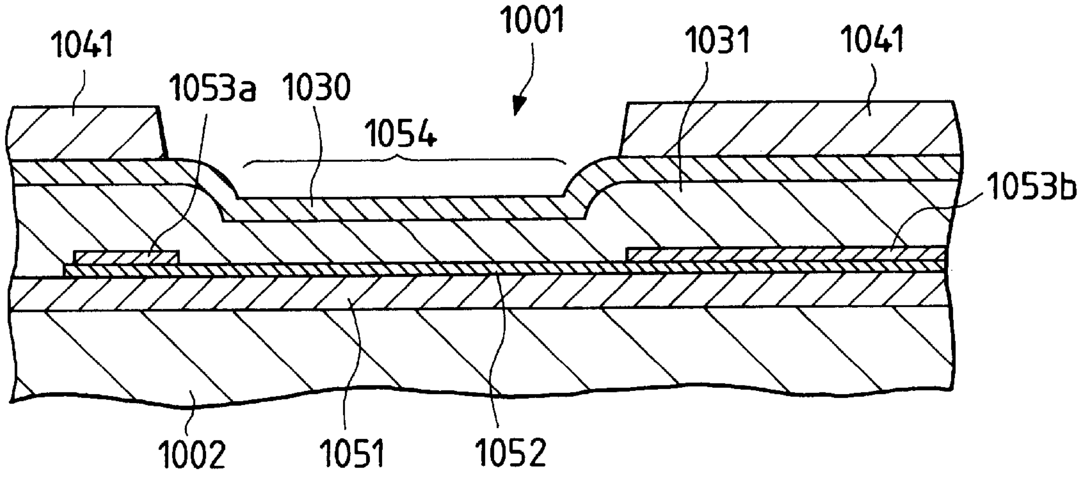
FIG. 59 is a cross-sectional view along a line 59—59 in FIG. 58.

In the following there will be given an explanation on the electrothermal transducer 1001 employed in the present embodiment. FIG. 58 is a magnified plan view of the electrothermal transducer 1001 shown in FIG. 57. FIG. 59 is a cross-sectional view along the line 59—59 in FIG. 58.

On a substrate 1002, as shown in FIGS. 58 and 59, an interlayer insulation film 1051, consisting of a $SiO_2$ film obtained by thermal oxidation and serving as a heat accumulation layer, is formed with a thickness of 1–7 μm, preferably 2–4 μm. On the heat accumulation layer 1051, there are formed a plurality of heat generating resistance layers 1052 respectively corresponding to the positions of ink paths 1003 (cf. FIG. 57). The heat generating resistance layer 1052 is composed for example of a $HfB_2$ film or a $TaN_x$-containing film with a thickness of 100–3000 Å, preferably 500–1500 Å.

Also a pair of electrodes 1053*a*, 1053*b* for power supply to the heat generating resistance layer 1052 are formed, together with wirings (not shown) of the aforementioned driving circuit, for example by forming an Al—Cu or Al—Si film with a thickness of 3000–10000 Å, preferably 5000–7000 Å, followed by photolithographic patterning into a desired shape. The heat generating resistance layer 1052 generates heat by a voltage application thereto through the pair of electrodes 1053*a*, 1053*b*. Thus the heat generating resistance layer 1052 and the pair of electrodes 1053*a*, 1053*b* constitute the electrothermal transducer 1001, and the portion present between the pair of electrodes 1053*a*, 1053*b* constitutes a heat action portion 1054 which provides the ink with thermal energy.

In case of multi-layered wiring, on the above-mentioned electrodes 1053*a*, 1053*b*, there is formed an interlayer insulation layer (not shown) by a $SiO_2$ film or a $SiN_x$-containing film with a thickness of 1–5 μm, preferably p 2–3 μm, and second electrodes (not shown) are formed by forming an Al, Al—Cu or Al—Si film with a thickness of 3000–10000 Å, preferably 5000–7000 Å, followed by patterning into a desired shape.

The above-mentioned layers are protected by a first protective layer 1031, and a second protective layer 1030 (also, referred to as "anticavitation layer") is further provided on the surface of the first protective layer 1031. The first protective layer 1031 is composed for example of a $SiO_2$ film or a $SiN_x$-containing film and formed by CVD or sputtering with a thickness of 0.5–2 μm. The second protective layer 1030 is provided for protecting the heat action portion 1054 from the shock generated at the vanishing of the bubble which is created by the heat transmitted from the heat action portion 1054. The second protective layer 1030 can be obtained, for example, by depositing a Ta film by sputtering with a thickness of 500–5000 Å, preferably 1000–2500 Å, followed by patterning into a desired shape.

A recess formed in a third protective layer 1041 provided on the second protective layer 1030 of the substrate 1002 is obtained by forming single or plural layers for example of a $SiO_2$ film or a $SiN_x$-containing film by CVD or sputtering with a thickness of 1–8 μm, preferably 2–5 μm, followed by photolithographic etching into a desired shape. In this operation, the third protective layer 1041 is eliminated not only in such recess portion but also an area surrounding the heat action portion (containing the entire electrothermal transducer 1001), in order to improve the bubble generating efficiency.

After the substrate 1002, on which a plurality of electrothermal transducers 1001 are formed in the above-explained manner, and a circuit board 1009 are fixed precisely in a desired position on a support member 1007, the ceiling plate 1006 can be positioned precisely on the substrate 1002 in such a manner that the electrothermal transducers 1001 correspond in one-to-one relationship to the ink paths 1003.

Then the electrode pads 1008 of the substrate 1002 fixed on the support member 1007 and the wirings on the circuit board 1009 are electrically connected with bonding wires 1011.

Figure 60A:
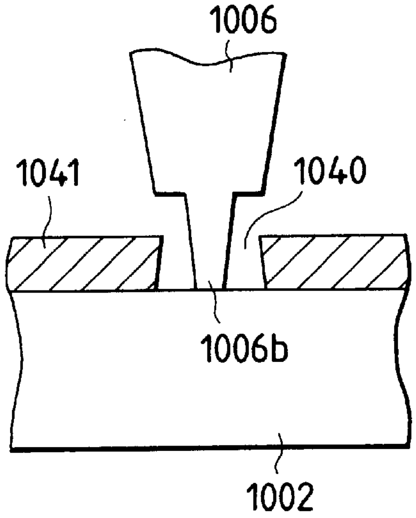
FIGS. 60A and 60B are cross-sectional views corresponding to a line A—A in FIG. 57 and showing the fused deformation of a protruding portion of the ceiling plate, in the joining portion, by heating in the recessed portion.
Figure 60B:
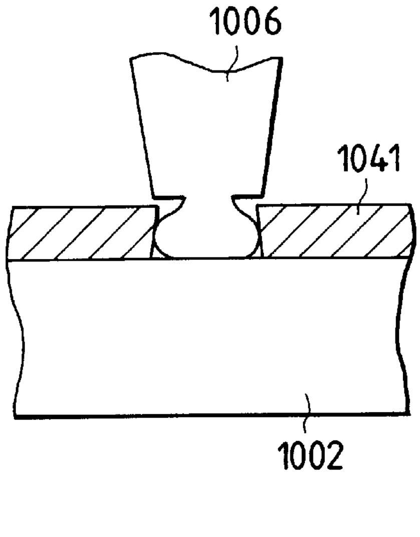

In the following there will be explained the heating of the joining portion, with reference to FIGS. 60A and 60B, which are cross-sectional views, along the line A—A in FIG. 57, showing the mode of thermal melting and deformation of a projecting portion 1006*b* of the ceiling plate 1006 in the recess 1040 of an overhanging shape. In the states in these drawings, the joining portion of the substrate 1002 and the ceiling plate 1006 is heated to a temperature within a range of 50–250° C., preferably 100–200° C., to cause melting and deformation of a projecting portion 1006*b* in the vicinity of the joining portion of the ceiling plate 1006, thereby filling the recess 1040 formed on the substrate 1002. The temperature of heating is not limited to that mentioned above but can naturally be selected according to the material constituting the ceiling plate 1006. The above-mentioned overhanging or inversely tapered shape can be easily obtained for example by electroless plating, which has an advantage of providing a film thickness of 4 $\mu$m or more.

After the joining force between the substrate 1002 and the ceiling plate 1006 is elevated in this manner, the joining portion between the substrate 1002 and the ceiling plate 1006, and the bonding wires 1011 are simultaneously sealed for example with silicone sealant (not shown).

Then the ink jet printing head is completed by placing thereon a protective member (also, referred to as "chip tank"; not shown) which serves to protect the ceiling plate 1006 and the bonding wires 1011 and is provided with a supply path for ink supply to the common liquid chamber 1012 formed in the ceiling plate 1006.

As explained in the foregoing, the joining force between the substrate 1002 and the ceiling plate 1006 can be increased by forming the recess 1040 on the substrate 1002, then positioning and fixing the ceiling plate 1006 so as to engage with the recess 1040, and heating the joining portion of the substrate 1002 and the ceiling plate 1006, thereby melting only the projecting portion 1006*b* provided in the vicinity of the joining portion of the ceiling plate 1006 and filling the recess 1040. Therefore, even in case the joining portion of the substrate 1002 and the ceiling plate 1006 is sealed with sealant of a low viscosity, there can be prevented the intrusion of such sealant into the common liquid chamber 1012 and the ink paths 1003. As a result, there can be obtained an ink jet printing head with excellent discharge performance and with high reliability. The recess 1040, enabling precise positioning of the substrate 1002 and the ceiling plate 1006, also serves to completely solve the drawback of pitch aberration in the joining of the ceiling plate.

In the present embodiment, the recesses 1040 are provided over the entire joining portion of the substrate 1002 and the ceiling plate 1006, but they may be provided only around the ink paths 1003 when there can be obtained satisfactory effect for preventing the intrusion of sealant, so that the number and the position of such recesses 1040 are not particularly limited.

Embodiment 22

Figure 61:
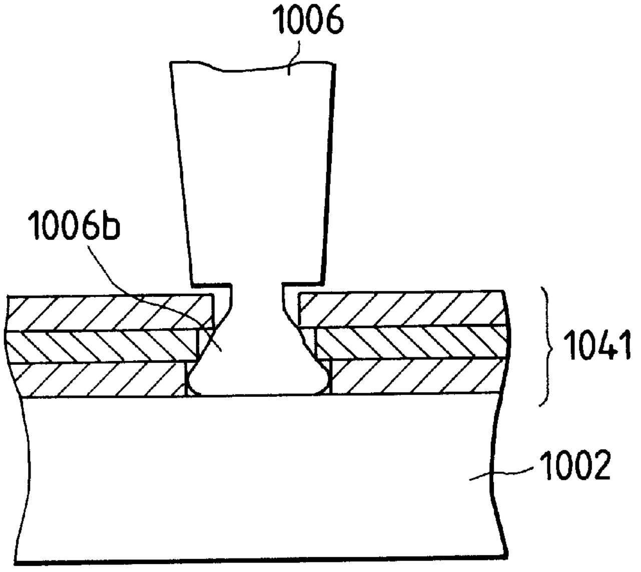
FIGS. 61 and 62 are partial cross-sectional views showing the principal parts of still other embodiments of the ink jet printing head of the present invention.

FIG. 61 is a partial cross-sectional view of still another embodiment of the ink jet printing head of the present invention, showing a state where the projecting portion 1006*b* of the ceiling plate 1006 is melton by the heating of the joining portion and fills the interior of the recess 1040.

Referring to FIG. 61, the ink jet printing head of the present embodiment is also essentially composed, similarly to the foregoing embodiment 21, of a single-crystal silicon substrate 1002 on which a plurality of electrothermal transducers 1001 are arranged in parallel manner at a predetermined pitch, and a ceiling plate 1006 provided with grooves 1004 which serve, upon joining to the substrate 1002, to constitute ink paths 1003 corresponding to the positions of the electrothermal transducers 1001.

The present embodiment is different from the foregoing one in that the recess 1040, formed by the third protective layer 1041 on the substrate 1002 and serving to engage with the ceiling plate 1002, has a cross-sectional shape wider at the lower side and narrower at the top side. Such shape may be formed with a single layer or with plural layers. Other structures may be same as those of the foregoing embodiment 21 and will not, therefore, be explained further.

Formation of the recess 1040 will be explained with reference to FIGS. 58 and 61. On the second protective layer 1030 of the substrate 1002, the third protective layer 1041 is formed by a plurality of layers of mutually different etching rates, and is etched with arbitrary etching liquid matching the material constituting the recess 1040. The above-mentioned shape can be obtained by constituting the third protective layer 1041 in such a manner that the etching rate thereof becomes larger toward the lower part thereof.

The illustrated example of the third protective layer 1041 is composed of three layers, but the configuration is naturally not limited to such number of layers.

The joining strength between the substrate 1002 and the ceiling plate 1006 can be increased as in the foregoing embodiment 21, since the ceiling plate 1006 can be precisely positioned with respect to the substrate 1002 and the recess 1040 has an inversely tapered cross-sectional shape, as in the foregoing embodiment 21.

Also in the present embodiment, as in the foregoing embodiment 21, the number of the recesses 1040 is not limited but can be arbitrarily selected as long as the intrusion of sealant into the ink paths 1003 and the common liquid chamber 1012 can be prevented. In order to obtain a sufficient effect for preventing the intrusion, the recess 1040 has to be so formed as to have an overhanging or inversely tapered cross section. On the other hand, with respect to the depth of the recess 1040, a larger depth increases the preventive effect for sealant intrusion, but also increases the internal stress of the layer 1041 constituting the recess 1040, eventually leading a bending of the substrate 1002 or a crack in the third protective layer 1041 around the recess 1040. Consequently the depth should be determined arbitrarily but in consideration of these two factors.

Embodiment 23

Figure 62:
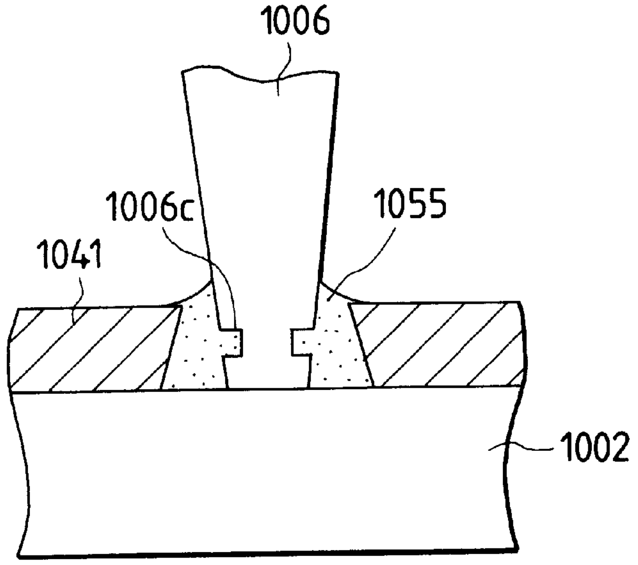

FIG. 62 is a partial cross-sectional view of still another embodiment of the ink jet printing head of the present invention, showing a state where the ceiling plate 1006 is fixed to the substrate 1002 with a thermosetting material 1055.

Referring to FIG. 62, the ink jet printing head of the present embodiment is also essentially composed, as in the foregoing embodiment 21 or 22, of a single-crystal silicon substrate 1002 on which a plurality of electrothermal transducers 1001 are arranged in parallel manner at a predetermined pitch, and a ceiling plate 1006 provided with grooves 1004 which serve, upon joining to the substrate 1002, to constitute ink paths 1003 corresponding to the positions of the electrothermal transducers 1001.

The present embodiment is different from the foregoing embodiment 22 in that, after the formation of the recess 1040 on the substrate 1002, a thermosetting material 1055 (for example Tonen Polysilazane, a thermosetting inorganic polymer manufactured by Tonen Co.) is coated as a thin layer of a thickness filling such recess 1040, and the joining portion is heated after the ceiling plate is contacted thereby hardening the above-mentioned thermosetting material while the joined state of the ceiling plate 1006 is maintained. Other structures are same as those in the foregoing embodiment 22 and will not therefore be explained further.

The present embodiment is superior to other embodiments in that it does not require the sealant nor the pressing with the plate spring, thus being significantly advantageous in the manufacturing cost. In the present configuration, the coated amount of the thermosetting material 1055 is an important factor. At a high coated amount, the material will be extended onto the heater, thereby making ink discharge unstable, while a low coated amount cannot provide sufficient strength or adhesion. Consequently, when spin coating method is employed for example, it is necessary to stepwise adjust the revolution and fill the recess 1040 only. For further increasing the joining strength, the end portion of the ceiling plate 1006 may be provided with one or plural notches 1006c into which the thermosetting material 1055 can enter. The shape of the notches 1006c is not limited to that shown in FIG. 62 but can be arbitrarily determined, in consideration of the required joining strength and the ease of formation of such notch, depending on the material constituting the ceiling plate 1006. Also the presence or absence of the notches 1006c can be arbitrarily selected according to the required joining strength. The heating method and other steps are same as those in the foregoing embodiment and will not therefore be explained further.

Embodiment 24

Figure 63:
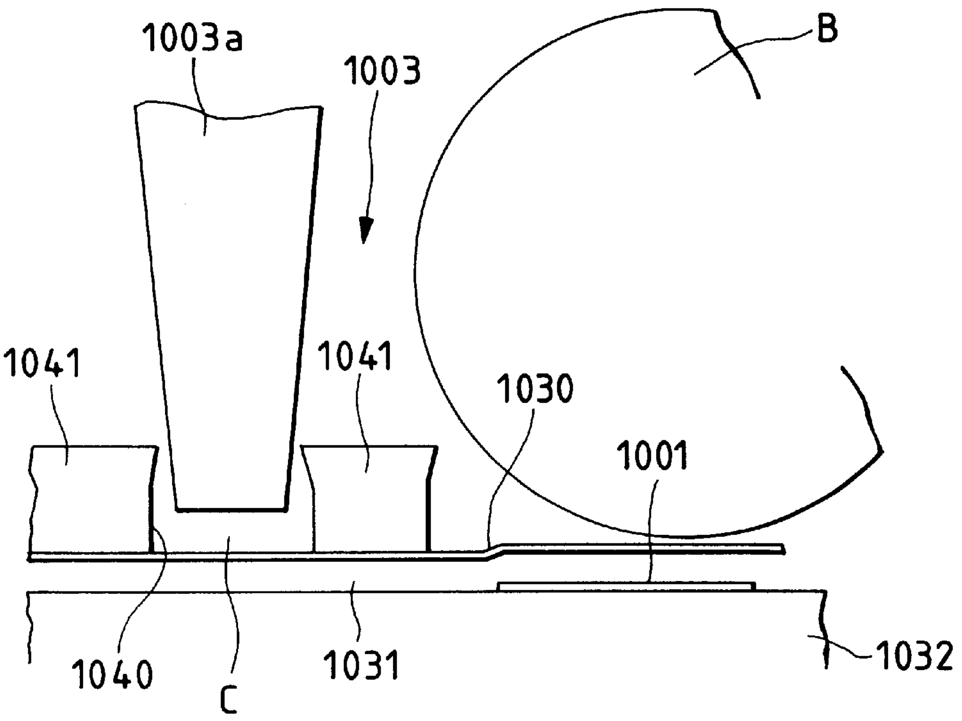
FIGS. 63 and 64 are schematic cross-sectional views showing other embodiments of the ink jet printing head of the present invention.

FIG. 63 is a partial schematic cross-sectional view showing another embodiment of the ink jet printing head of the present invention.

The recess 1040 of the present embodiment, formed in the recess forming layer 1041 is different from that in the foregoing embodiment and has a shape, as shown in FIG. 63, involving inwardly curved walls. The recess 1040 is formed by etching the recess forming layer 1041, and when the recess forming layer 1041 has a certain thickness, the internal walls of the recess 1040 formed by such etching become inwardly curved to provide an inversely tapered cross section. When the end portion of the ink path wall 1003*a* of the ceiling plate is fitted into the recess 1040 of such cross-sectional shape, the recess can exhibit an anchoring effect on such end portion.

The present embodiment does not employ any adhesive material for temporary fixing in the joining of the ceiling plate and the substrate but achieves joining with sufficient strength by melting the end portion of the ink path wall 1003*a* of the ceiling plate and the recess 1040 of the substrate. For this purpose the bottom face of the end portion of the ink path wall 1003*a* is formed as a flat surface, thereby increasing the contact area with the bottom of the recess 1040, and the size of the aperture at the top of the recess 1040 is made as close as possible to that of the end portion of the ink path wall 1003*a* in order to increase the area of contact. Such size of the top aperture of the recess 1040, made as close as possible to that of the end portion of the ink path wall 1003*a*, allows easy fitting of the ink path wall 1003*a* into the recess 1040 by a drop-in operation for example by vibration.

The recess forming layer 1041 is formed on a Ta film as the anticavitation by depositing an insulating material such as silicon nitride, alumina, silica or SOG, or a metal such as tantalum, aluminum, aluminum alloy, titanium, nickel or tungsten by CVD, sputtering, evaporation or spin coating, and the recess 1040 is formed by photolithographically patterning such recess forming layer 1041.

The recess forming layer 1041 can also be obtained with photosensitive resin such as α-540 (trade name of Tokyo Oka Kogyo Co.), or a polyimide coating material such as Photonice (trade name of Toray Co.) or PL3798 (trade name of Hitachi Chemical Co.).

Figure 64:
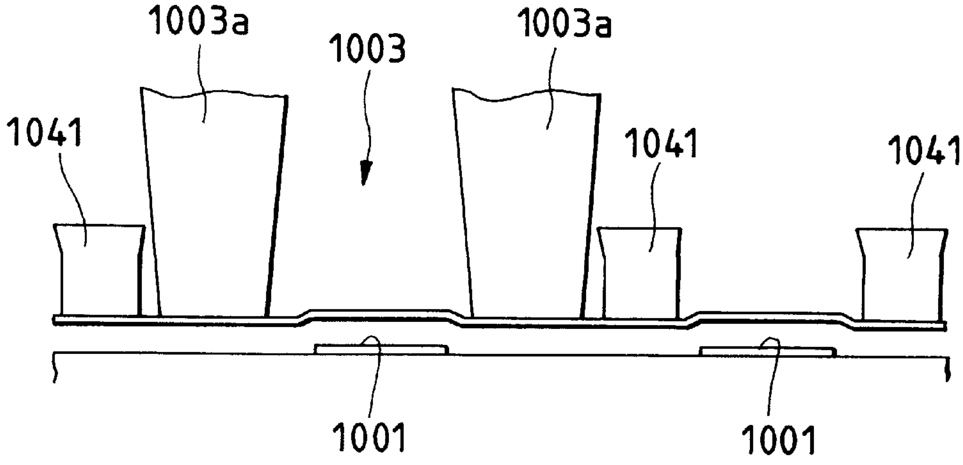

For each ink path wall 1003*a*, the recess 1040 is preferably so formed as to pinch the both surfaces of the ink path wall 1003*a*, as shown in FIG. 63. In case a recess 1040 cannot be formed for each space between the heaters for example because of the dimensional limitation of the substrate, the recess may be so provided as to press the left side and the right side of every two ink path walls 1003*a*, as shown in FIG. 64.

Figure 65:
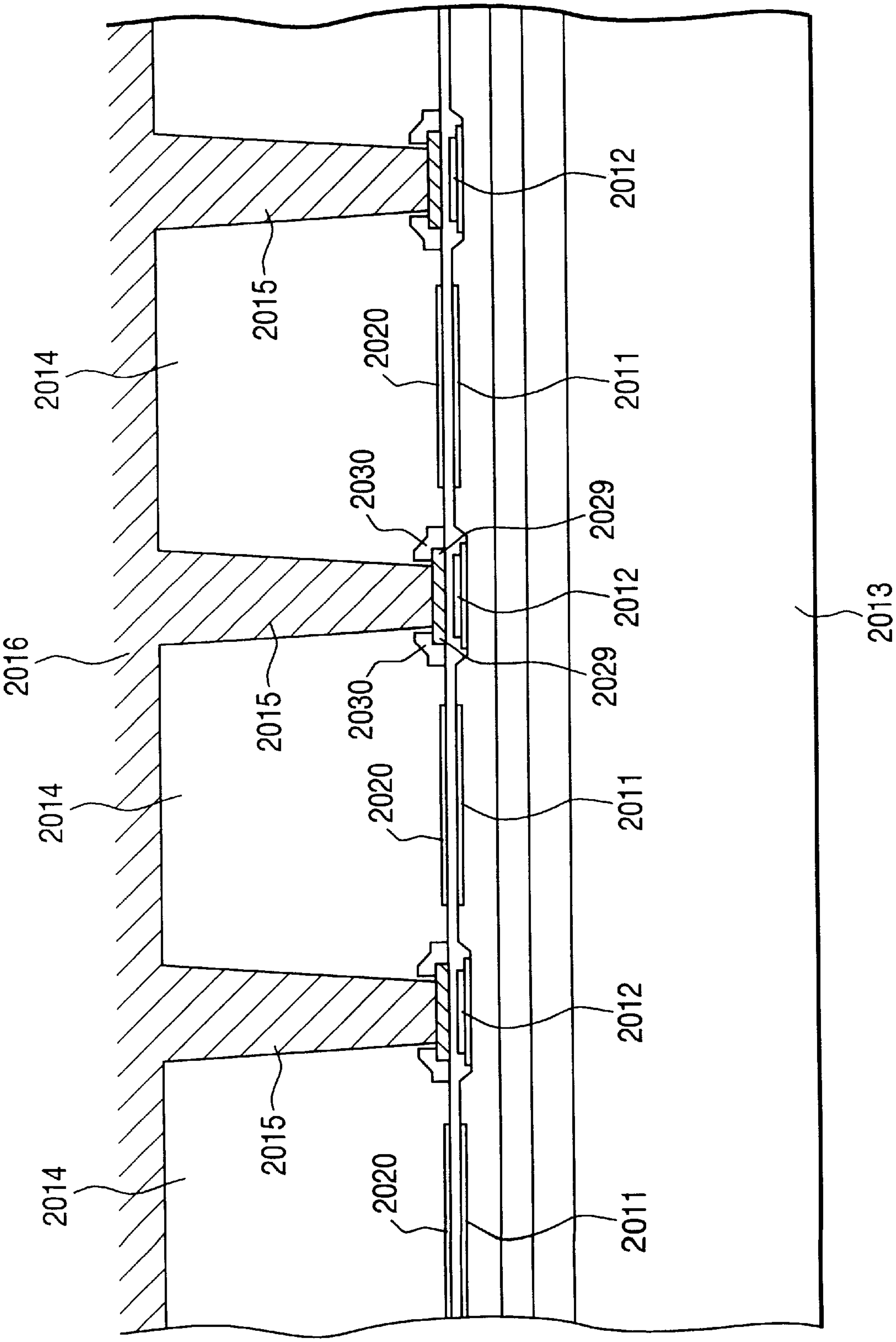
FIG. 65 is a cross-sectional view showing the configuration of the principal parts of an embodiment of the ink jet printing head of the present invention.

The recess forming layer 1041 may cover the entire substrate. The patterning of the entire head substrate can be conducted, for example as shown in FIG. 65, by forming the recess forming layer 1041 for example of silicon nitride on the entire area of the anticavitation Ta film, and, for mutually fitting the head substrate and the grooved ceiling plate, the recess forming layer 1041 is left in the external area outside the liquid chamber, the ink paths and the ceiling plate and the recesses 1040 are formed in the remaining area of the substrate. A numeral 1008 indicates the wire bonding pad for electrical connection with the exterior. Such configuration, realizing firm joining between the ceiling plate and the substrate, provides an ink jet printing head of extremely high stability of ink discharge, without crosstalk between the ink paths.

The recess forming layer 1041 preferably has a thickness of 1 μm or more, for enabling drop-in fitting by vibration and for avoiding crosstalk between the adjacent ink paths.

Embodiment 25

In the following still another embodiment of the ink jet printing head of the present invention will be explained in detail, with reference to FIG. 65 showing the schematic cross-sectional structure of the principal parts.

At the end of a nozzle wall 2015 of a grooved plate 2016, there are integrally formed a pair of engaging plate portions 2029, protruding laterally in both directions. Also on the surface of a substrate 2013, there are integrally formed a pair of holding members 2030, serving to hold the engaging plate portions 2029 in cooperation with the surface of the substrate 2013, in such a manner to sandwich the nozzle wall 2015. The substrate 2013, bearing thereon electrothermal transducers 2011 and electrodes 2012 arranged with a predetermined patch, is covered with an insulating protective layer 2019 in order to prevent corrosion of the electrothermal transducers 2011 and the electrodes 2012 by contact with the discharge medium. The electrothermal transducer 2011 is provided thereon with an anticavitation layer 2020 composed for example of tantalum in order to prevent destruction by the cavitation resulting from boiling of the discharge medium, and the above-mentioned holding members 2030 are formed on the anticavitation layer 2020.

Thus the engaging plate portions 2029 of the nozzle wall 2015 are engaged by the substrate 2013 and the holding members 2030 integral therewith, whereby the substrate 2013 and the grooved plate 2016 are maintained in the integrally joined state. An adjacent nozzle-shaped path 2014, being completely separated by the labyrinth structure in the joining part between the engaging plate portions 2029 at the end of the nozzle wall 2015 and the holding members 2030 of the substrate 2013, is maintained free of crosstalk.

In the present embodiment, the grooved plate 2016 mentioned above is formed with polysulfone resin and the nozzle wall 2015 theirs joined to the substrate 2013, but it is also possible to form the nozzle wall 2015 only or the end portion thereof only with the polysulfone resin and to form the remaining parts of the grooved plate 2016 with a resinous material other than polysulfone or with a metal.

Figure 66:
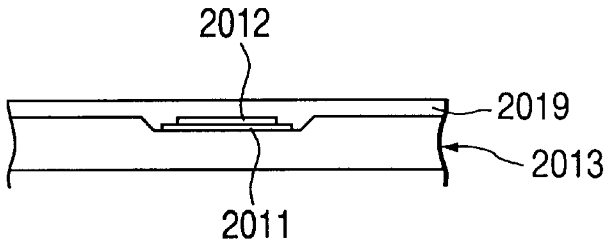
FIGS. 66 to 70 are schematic views showing the manufacturing process of the ink jet printing head shown in FIG. 65.

An embodiment of the producing process for such ink jet printing head will be explained in detail, with reference to FIGS. 66 to 70, showing the steps of such process. At first, as shown in FIG. 66, the substrate 2013, bearing thereon the electrothermal transducers 2011 and the electrodes 2012 arranged in a predetermined pitch, is surfacially covered with an insulating protective layer 2019.

Figure 67:
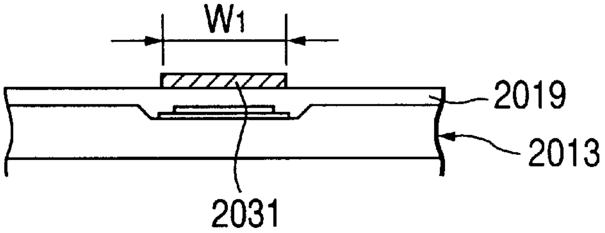

Then, as shown in FIG. 67, a joining resin layer 2031, principally composed of polysulfone and constituting the aforementioned engaging plate portions 2029, is formed on the insulating protective layer 2019, at the joining position of the nozzle wall 2015 of the grooved plate 2016.

The joining resin layer 2031 can be obtained by dissolving polysulfone resin in granular state into organic solvent such as cyclohexanone, then spin coating the obtained solution in a thin film on the substrate 2013 and patterning the film so as not to leave the polysulfone film on each electrothermal transducer 2011 provided in the nozzle-shaped path 2014 by excimer laser irradiation through a mask. The width $W_1$ of the joining resin layer 2031 is required to be larger than the width $W_2$ of the end face of the nozzle wall 2015 (cf. FIG. 70), but is preferably so limited as not to be positioned above each electrothermal transducer 2011 in the nozzle-shaped path 2014.

Figure 68:
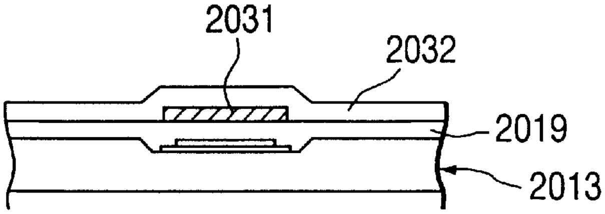

After the formation of the joining resin layer 2031 on the insulating protective layer 2019, a cover layer 2032 constituting the aforementioned holding members 2030 is so formed as to cover the joining resin layer 2031, as shown in FIG. 68. In the present embodiment, since the holding members 2030 and the anticavitation layer 2020 are formed in a same step, tantalum is used for the cover layer 2032 on the substrate 2013, but the cover layer 2032 may also be composed of a material different from that of the anticavitation layer 2020, such as a silicone-based film or photosensitive resin.

Figure 69:
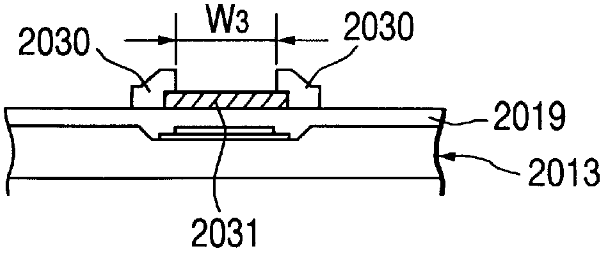

After the formation of the cover layer 2032, there is formed an engaging window 2033 into which the end portion of the nozzle wall 2015 is inserted and the cover layer 2032 is partially removed in an area not covering the joining resin layer 2031 as shown in FIG. 69, and, in this patterning step, the anticavitation layer 2020 is preferably formed directly above the electrothermal transducer 2011. The width $W_3$ of the engaging window 2033 is required to be smaller than the width $W_1$ of the joining resin layer 2031, but is preferably somewhat lager, for example by about 1 $\mu$m, then that width $W_2$ of the end face of the nozzle wall 2015. However, in consideration of the practical dimensional error, it has to be larger, by about 2 to 3 $\mu$m, than the width $W_2$ of the end fact of the nozzle wall 2015.

Figure 70:
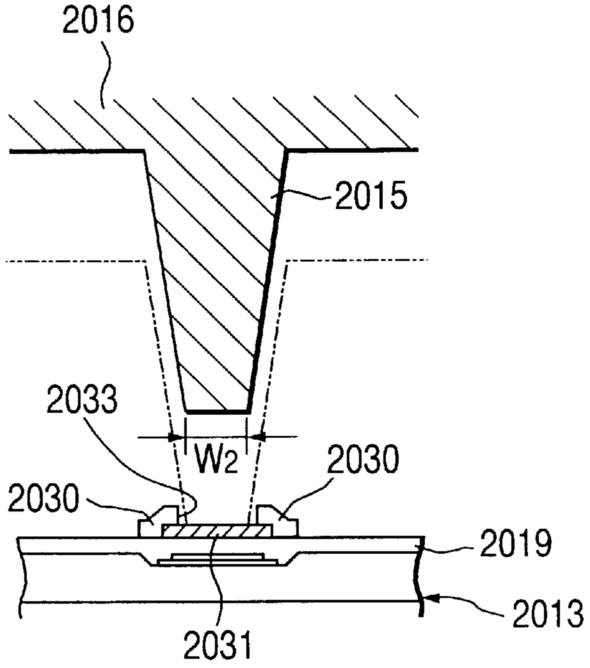

After the holding member 2030 surrounding the joining resin layer 2031 are formed in this manner, the grooved plate 2016 and the substrate 2013 are mutually superposed, as shown in FIG. 70, in such a manner that the end portion of the nozzle wall 2015 comes into contact with the joining resin layer 2031 through the engaging window 2033, and the substrate 2013 is heated with an unrepresented heater so as to soften and integrate at least the end portion of the nozzle wall 2015 and the joining resin layer 2013 in this state.

Such heating may be achieved by irradiating the joining portion with a YAG laser of a suitable energy density, or by providing the substrate 2013 with a heat generating member, similar to the electrothermal transducer 2011, under the joining resin layer 2031 and generating heat by power supply to such heat generating member. The preferred heating state of the joining resin layer 2031 and the end portion of the nozzle wall 2015 is such that the end face of the nozzle wall 2015 and the joining resin layer 2031 alone are fused but the portion of the nozzle wall 2015 positioned above the holding members 2030 is not fused.

Thereafter the heating of the joining portion is terminated, and the ink jet printing head of the structure shown in FIG. 65 can be obtained by cooling or spontaneous cooling.

In the embodiment explained above, the joining portions are heated in a state in which the end face of the nozzle wall 2015 impinges on the joining resin layer 2031, but it is also possible to soften or fuse the joining resin layer 2031 in advance by heating, and, in such state, to cause the end face of the nozzle wall 2015 to impinge on the joining resin layer 3031. It is also effective to form a shoulder at the end portion of the nozzle wall 2015, in order to render the portion of the nozzle wall 2015, positioned above the holding members 2030, less fusible.

In the following another embodiment of the manufacturing process of the ink jet printing head of the present invention will be explained with reference to FIG. 71 and 72, wherein components equivalent in function to those in the foregoing embodiment are represented by corresponding numbers and will not be explained further.

Figure 71:
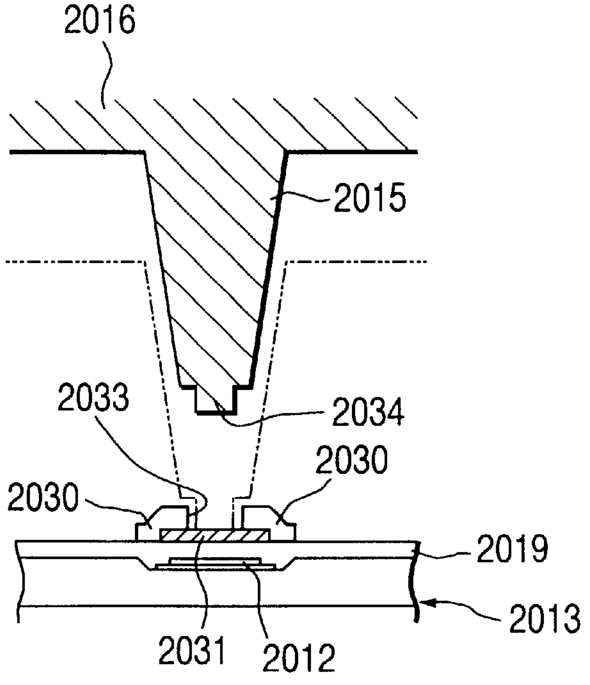
FIGS. 71 to 76 are schematic views showing the manufacturing process of another ink jet printing head of the present invention.
Figure 72:
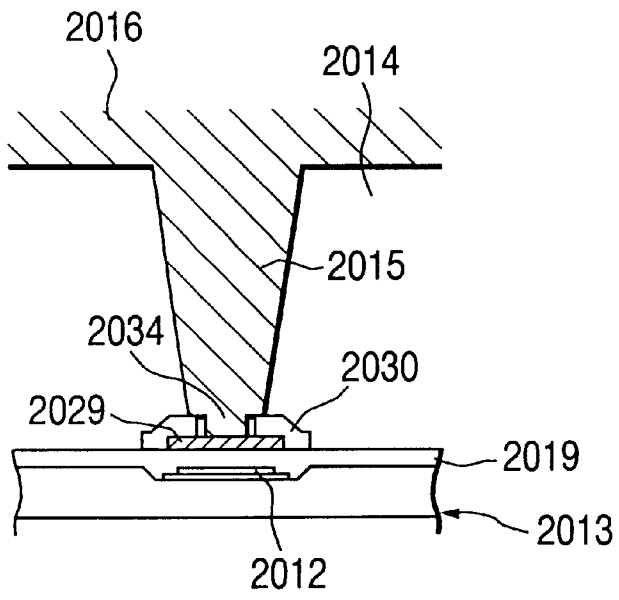

As shown in FIG. 71, the nozzle wall 2015 of the grooved plate 2016 is provided, at the end thereof, with a shouldered projection 2034, which is inserted into the engaging window 2033 and the end face is to be pressed to the joining resin layer 2031 supported by the holding members 2030. Then the end of the shouldered projection 2034 and the joining resin layer 2031 are heated while they are in a mutually impinging state, whereby, as shown in FIG. 72, the nozzle wall 2015 and the engaging plate portions 2029 constituting the joining resin layer 2031 are integrally joined through the shouldered projection 2034.

Since the nozzle wall 2015 and the joining resin layer 2031 are joined through the shouldered projection 2034 of a smaller width, the softening or fusing of such shouldered projection 2034 is accelerated at the heating, whereby the joining operation of these components can be completed within a short time and the fused deformation of the portion of the nozzle wall 2015 positioned above the holding members 2030 can be prevented.

In the above-explained embodiment, the joining resin layer 2031 is joined to the end of the nozzle wall 2015, but the end portion of the nozzle wall 2015 may be fused and expanded to form the engaging plate portions 2029 shown in FIG. 65.

In the following other embodiments of the manufacturing process of the ink jet printing head of the present invention will be explained with reference to FIGS. 73 to 76, wherein components equivalent in function to those in the foregoing embodiment are represented by corresponding numbers and will not be explained further.

Figure 73:
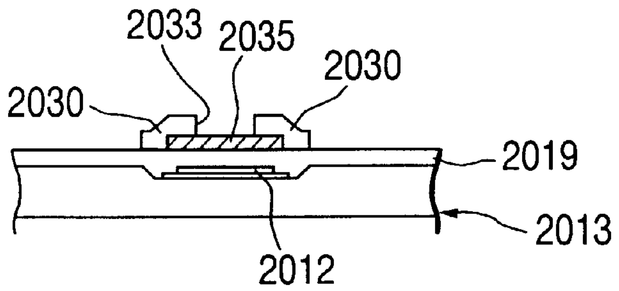

The holding members 2030 defining the engaging window 2033 are formed as shown in FIG. 73, and the interior of the holding members 2030 is filled with a built up layer 2035 similar to the aforementioned joining rein layer 2031. The resin constituting the built up layer 2035 can be, in addition to the polysulfone resin same as that constituting the grooved plate 2016, photosensitive resin soluble or dispersible in ketones such as acetone, alcohols or alkaline solutions.

Figure 74:
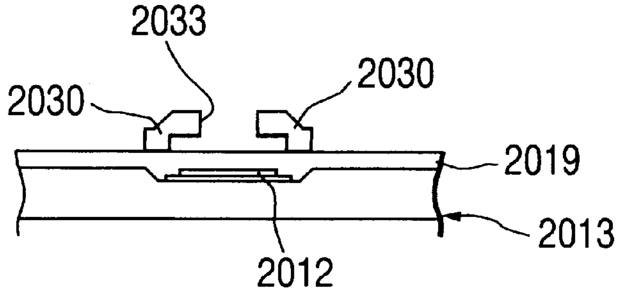

Then, as shown in FIG. 74, the built up layer 2035 is washed off for example with solvent. The present embodiment requires a newly added washing step in comparison with the foregoing two embodiments, but the range of selection of the resin constituting the built up layer 2035 can be widened since the joining resin layer 2031 supported by the holding members 2030 is not attacked by the ink during the use, and it does not overflow beyond the holding members 2030 at the thermal fusion.

Figure 75:
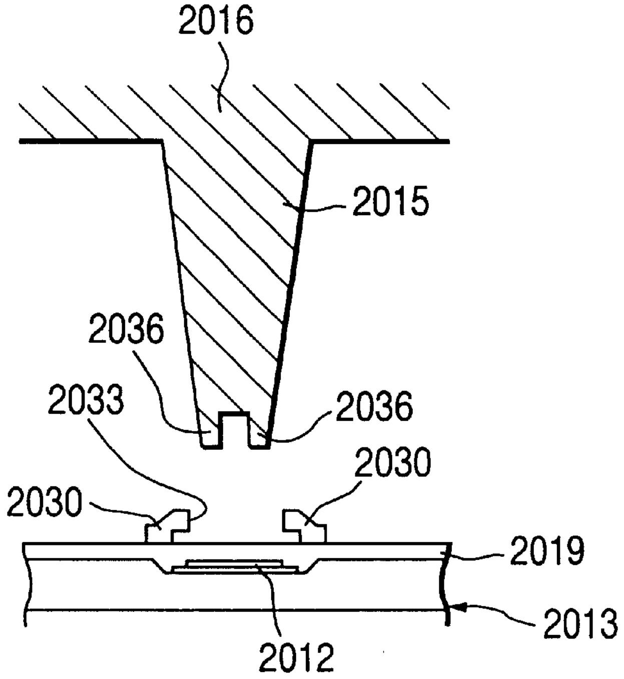

Also as shown in FIG. 75, a pair of mutually separated horns 2036 for constituting the aforementioned engaging plate portions 2029 are respectively formed on both sides, in the transversal direction, of the end portion of the nozzle wall 2015 of the grooved plate 2016, and these horns are inserted through the engaging window 2033 into the interior of the holding members 2030 and pressed to the insulating protective layer 2019 of the substrate 2013.

Figure 76:
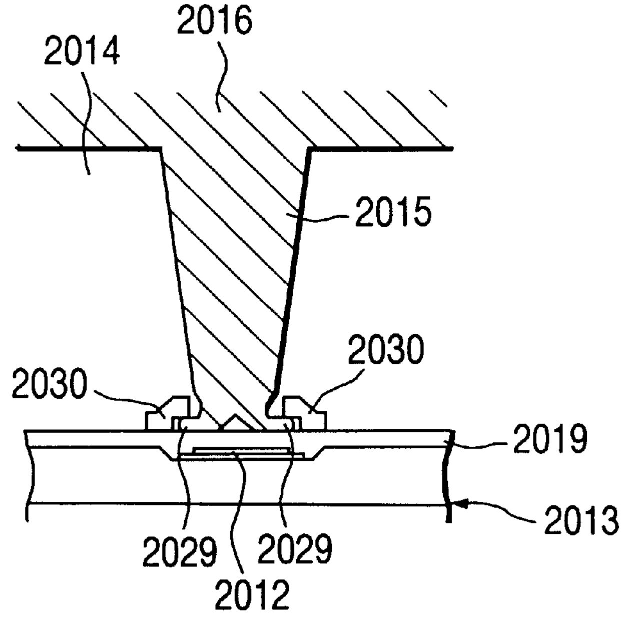

The horns 2036 are heated and softened while they are pressed to the insulating protective layer 2019 of the substrate 2013, whereby the horns 2036 are spread inside the holding members 2030 as shown in FIG. 76 to constitute the engaging plate portion 2029 which engage with the holding members 2030.

In the embodiments shown in FIGS. 66 to 72, if the joining resin layer 2031 constituting the engaging plate portions 2029 and the end portion of the nozzle wall 2015 of the grooved plate 2016 are composed of different materials, these components may not be integrated chemically in the heated state, so that a sufficient joining strength may not be obtained. In such case, there may be effectively employed another embodiment of the manufacturing process for the ink jet printing head of the present invention. Such embodiment is shown in FIGS. 77 and 78, in which components equivalent in function to those in the foregoing embodiment are represented by corresponding numbers and will not be explained further.

Figure 77:
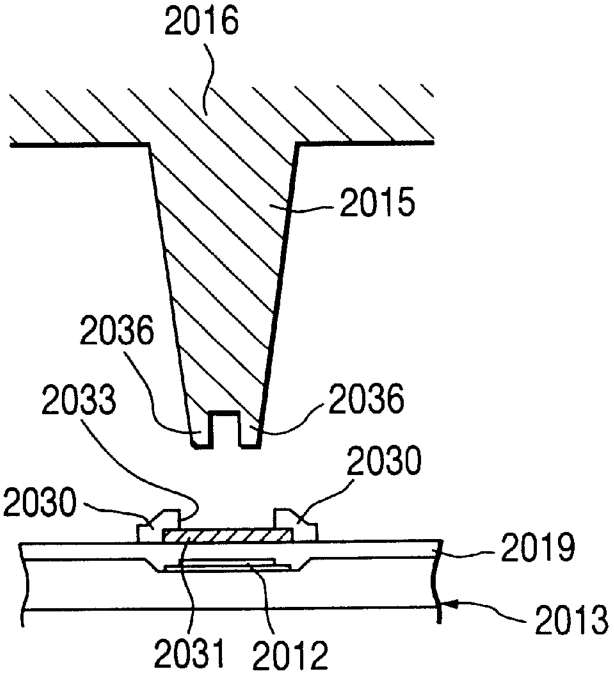
FIGS. 77 to 80 are schematic views showing the manufacturing process of still another ink jet printing head of the present invention.

As shown in FIG. 77, the holding members 2030 are formed on the insulating protective film 2019 of the substrate 2013 so as to expose the joining resin layer 2031 through the engaging window 2033, and the mutually separated paired horns 2036 for constituting the aforementioned engaging plate portions 2029 are respectively formed on both sides, in the transversal direction, of the end portion of the nozzle wall 2015 of the grooved plate 2016, and these horns are inserted through the engaging window 2033 into the interior of the holding member 2030 and pressed to the insulating protective layer 2019 of the substrate 2013.

Figure 78:
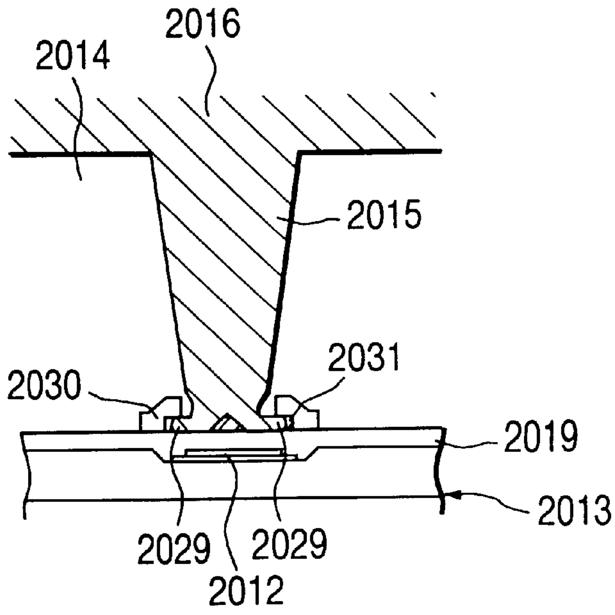

The horns 2036 are heated and softened while they are pressed to the insulating protective layer 2019 of the substrate 2013, whereby the borns 2036 are spread inside the holding members 2030 as shown in FIG. 78 to constitute the engaging plate portions 2029, and the joining resin layer 2031 is made to intrude between these components whereby the gap therebetween is filled with the joining resin.

Thus, in the solidified state, the interior of the holding members 2030 is filled, without space, by the engaging plate portions 2029 and the joining resin, thereby generating an extremely large joining strength. In this case the Joining resin functions also as the adhesive.

In order not to cause unnecessary deformation in the nozzle wall 2015 of the grooved plate 2016 at the heating, the resinous material constituting the joining resin layer 2031 preferably has a transition point not exceeding that of the grooved plate 2016, and more preferably not exceeding the softening point thereof.

In the foregoing embodiments, the nozzle wall 2015 is provided, at the end portion thereof, with the engaging plate portions 2029 and the holding members 2030 which mechanically engage with such engaging plate portions 2029 are employed for joining the end portion of the nozzle wall 2015 and the substrate 2013, but it is also possible to attain a similar effect with a simpler configuration.

Figure 79:
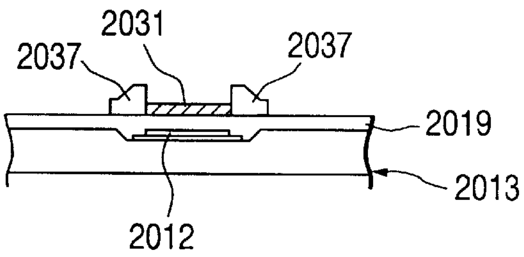
Figure 80:
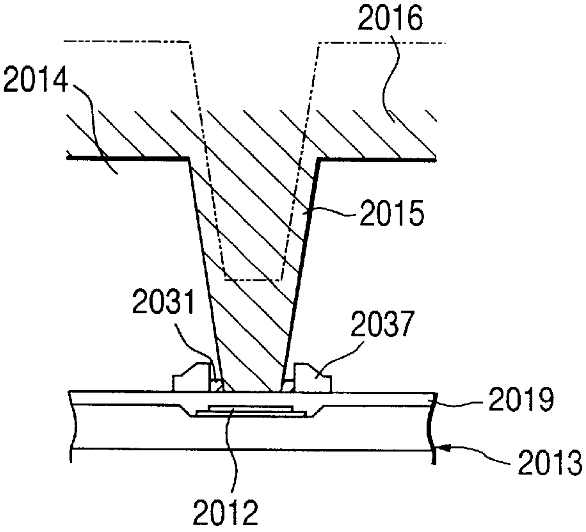

Such another embodiment of the manufacturing process, for the ink jet printing head of the present invention, is illustrated in FIGS. 79 and 80, in which components equivalent in function to those in the foregoing embodiment are represented by corresponding numbers and will not be explained further.

More specifically, the cover layer 2032 is formed on the substrate 2013 in the same manner as in the foregoing embodiment shown in FIGS. 66 to 68, but the width of the joining resin layer 2031 is selected as the aforementioned value $W_3$ which is slightly larger than the width of the end portion of the nozzle wall 2015. Then, as shown in FIG. 79, the cover layer 2032 is etched to expose the entire joining resin layer 2031, thereby forming dike portions 2037, composed of the cover layer 2032, on both sides of the joining resin layer 2031 in the transversal direction.

Then, as shown in FIG. 80, the end of the nozzle wall 2015 is pressed to the joining resin layer 2031 present between the dike portions 2037 and the joining resin layer 2031 is heated and fused in this state, whereby the joining resin is made to intrude between the dike portion 2037 and the side faces of the end portion of the nozzle wall 2015 and these components are integrally joined. In this state the dike portions 2037 serve to prevent the overflow of the fused resin of the joining resin layer 2031 toward the nozzle-shaped path 2014 and to increase the contact area between the nozzle wall 2015 and the joining resin.

This embodiment is suitable for example in case the width of the Joining resin layer 2031 cannot be made larger because of a limited pitch of arrangement of the nozzle-shaped paths 2014. However, it is also possible to further increase the joining force by physicochemically modifying the above-mentioned dike portions 2037.

Figure 81:
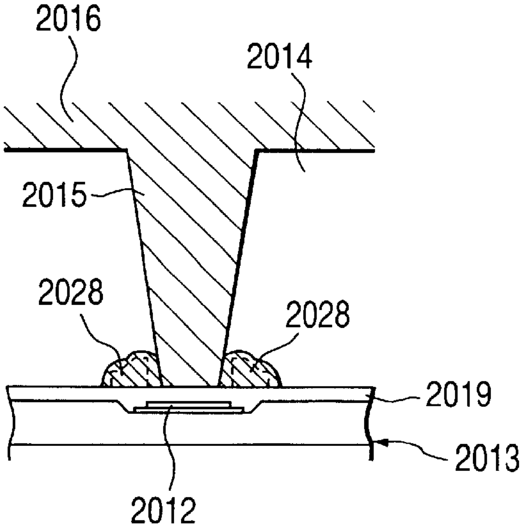
FIG. 81 is a cross-sectional view showing the schematic configuration of the principal parts of another embodiment of the ink jet printing head of the present invention.

FIG. 81 shows the cross-sectional structure of such joining portion of the ink jet printing head of the present invention, wherein components equivalent in function to those in the foregoing embodiment are represented by corresponding numbers and will not be explained further.

In this case, the dike portions 2037 are heated in the state shown in FIG. 80 to induce growth of the crystalline particles of the material constituting the dike portions 2037, thereby causing physical deformation. Thus the dike portions 2037 are changed to modified portions 2038, whereby a larger joining force is obtained.

In the present embodiment, the dike portions 2037 are formed by patterning an aluminum film. The sputtered aluminum film is empirically known, when maintained at about 300° C., to cause an irreversible growing deformation of the surface form. In the present case, the grooved plate 2016 and the nozzle wall 2015 are preferably formed with a material of which glass transition temperature is equal to or higher than the crystal growing temperature of the dike portions 2037, such as glass, and the electrodes 2012 are preferably composed of a material other than aluminum, such as gold.

In the above-mentioned embodiment the thermal modification is made in the dike portions 2037, but an irreversible modification may be made in the end portion of the nozzle wall 2015.

In the following there will be explained the ink jet printing apparatus of the present invention, in which the ink jet printing head of the foregoing configurations can be loaded.

Figure 53:
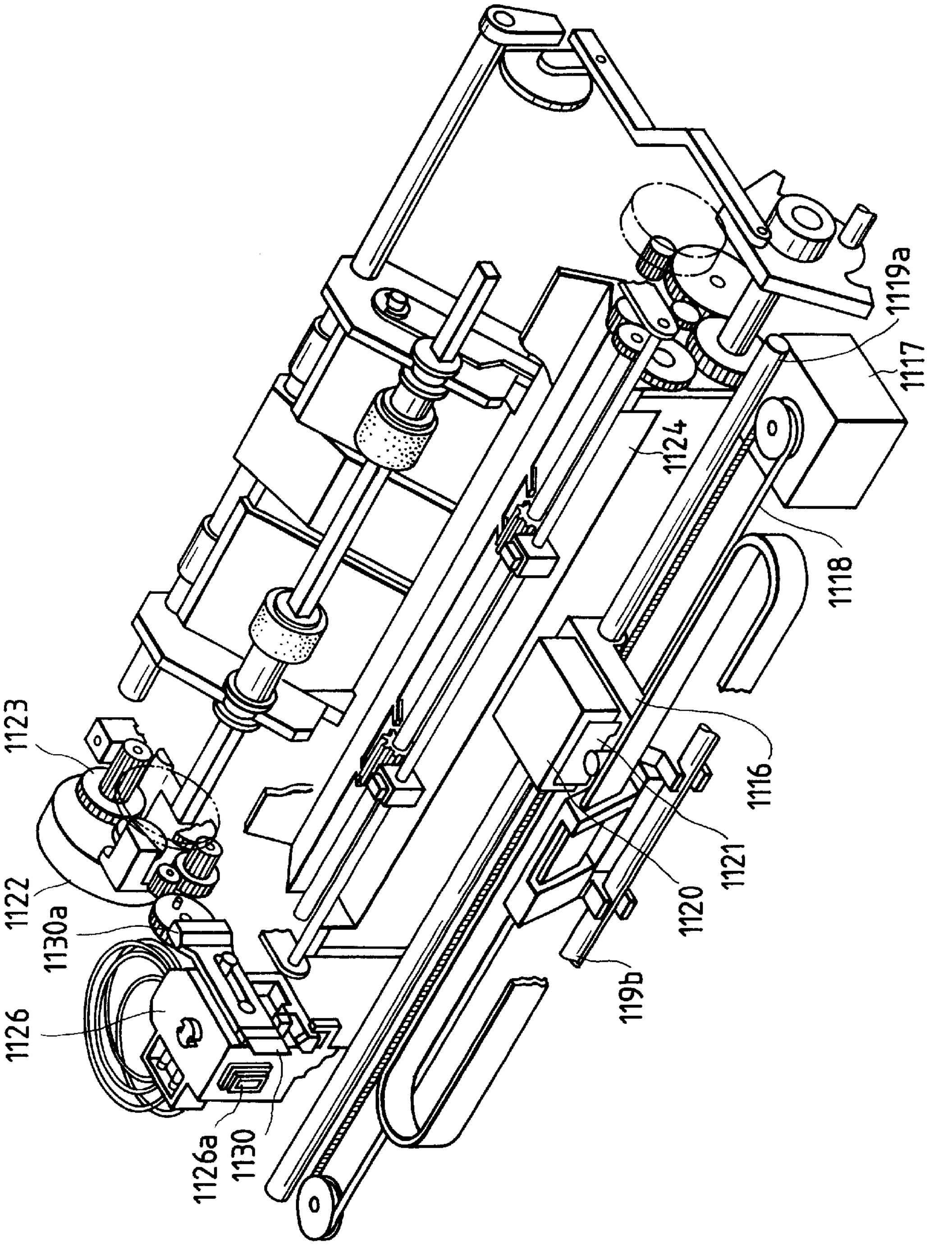
FIG. 53 is a schematic perspective view of an embodiment of the ink jet printing apparatus of the present invention.

FIG. 53 is a schematic perspective view of an embodiment of the ink jet printing apparatus of the present invention, wherein an ink jet head cartridge 1120 is integrally composed of an ink jet printing head 1121 constructed as explained in the foregoing and an ink tank (not shown) for containing ink for supply to the ink jet printing head 1121, and is detachably supported on a carriage 1116 constituting a member for supporting the ink jet printing head 1121. The carriage 1116 is connected to a part of a driving belt 1118 which transmits the driving force of a driving motor 1117, and is slidably mounted on mutually parallel two guide shafts 1119*a*, 1119*b*. An orifice face, provided with the discharge openings (not shown), of the ink jet printing head 1121 is opposed to a platen 1124, and recording operation is achieved over the entire width of a printing medium or a recording sheet (not shown) transported on the platen 1124, by providing the ink jet printing head 1121 with recording signals to induce ink discharge, while driving the ink jet head cartridge 1120 in reciprocating motion by the driving force of the motor 1117. Since satisfactory electrical connections are maintained for the electrothermal transducers (not shown) and the circuit board (not shown) for the ink jet printing head 1121 as explained in the foregoing, the recording signals from the main body of the printing apparatus are securely transmitted to the ink jet printing head 1121, thereby enabling satisfactory recording.

A head recovery unit 1126 is provided outside the reciprocating range of the ink jet head cartridge 1120 in the recording operation, for example in a position corresponding to a home position. The head recovery unit 1126 is provided with a cap member 1126*a* for capping the orifice face of the ink jet printing head 1121, and is driven by the driving force of a cleaning motor 1122, through a transmission mechanism 1123. In cooperation with the capping of the ink jet printing head 1121 by the capping member 1226*a*, there is executed ink suction by suitable suction means provided in the head recovery unit 1126 or pressurization by suitable pressurizing means provided in the ink supply path to the ink jet printing head 1121, thereby forcedly discharging the ink from the discharge openings and achieving the discharge recovery such as elimination of the viscous ink in the ink paths of the ink jet printing head 1121. Also the ink jet printing head is protected by capping at the end of the recording operation.

At the side of the head recovery unit 1126 there is provided a blade 1130 constituting a wiping member composed of silicone rubber. The blade 1130 is supported by a blade support member 1130*a* through a cantilever mechanism, and is driven, like the heat recovery unit 1126, by the cleaning motor 1122 and the transmission mechanism 1123 so as to be pressed to the orifice face of the ink jet printing head 1121. Thus, at a suitable timing in the course of the recording operation of the ink jet printing head 1121 or after the discharge recovery operation by the head recovery unit 1126, the blade 1130 is made to protrude in the moving path of the ink jet printing head 1121, thereby wiping off liquid drops, wet liquid or dust on the orifice face of the ink jet printing head 1121 in the moving operation thereof.

Among various ink jet printing systems, the present invention brings about excellent effects particularly in a printing head or printing device of the type provide with (such as electrothermal transducer or laser beam) for generating thermal energy to be used for discharging ink and adapted to induce a state change of the ink by such thermal energy, since such system can achieve a higher density and a higher definition of the recorded image.

As to its representative configuration and principle, for example the one practiced by the use of the basic principle disclosed in the U.S. Pat. Nos. 4,723,129 and 4,740,796 is preferred. This system is applicable to either of the so-called on-demand type and the continuous type. Particularly the case of the on-demand type is effective because, by applying at least one driving signal which gives rapid temperature elevation exceeding nucleus boiling corresponding to the recording information on an electrothermal transducer arranged corresponding to the sheets or liquid channels holding liquid (ink), thermal energy is generated at the electrothermal transducer to induce film boiling at the heat action surface of the printing head, and a double can be consequently formed in the liquid (ink) corresponding one-to-one to the driving signals. By discharging the liquid (ink) through a discharge opening by the growth and shrinkage of the bubble, at least a droplet is formed. By forming the driving signals into pulse shapes, growth and shrinkage of the bubble can be effected instantly and adequately to accomplish more preferable discharging of the liquid (ink) particularly excellent in the response characteristics. As the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heat action surface.

As the configuration of the printing head, in addition to the combinations of the discharging opening, liquid channel and electrothermal transducer (linear liquid channel or right-angled liquid channel) as disclosed in the above-mentioned respective specifications, the configuration by the use of the U.S. Pat. Nos. 4,558,333 and 4,459,600 disclosing the configuration having the heat action portion arranged in the flexed region is also included in the present invention. In addition, the present invention can also be effectively applied to the configuration of the Japanese Patent Application Laid-open No. 59-123670 using a slit common to a plurality of electrothermal transducers as the discharging portion of the electrothermal transducers or of the Japanese Patent Application Laid-open No. 59-138461 having the opening for absorbing a pressure wave of thermal energy corresponding to the discharging portion. This is because the present invention can achieve secure and efficient recording, regardless of the configuration of the printing head.

Furthermore, the present invention is effectively applicable to the printing head of the full line type having a length corresponding to the maximum width of the printing medium which can be recorded by the printing device, and such printing head may have a configuration realizing such length by the combination of plural printing heads, or a configuration constituted by an integrally formed single printing head.

In addition, the present invention is effective, within the printing devices of the serial type mentioned above, in a printing head fixed to the main body of the printing device, or an exchangeable chip-type printing head enabling electrical connection with the main body of the printing device or ink supply from such main body by being mounted on the main body, or the printing head of a cartridge type in which an ink tank is integrally provided in the printing head itself.

Also in the configuration of the printing device of the present invention, the addition of discharge restoration means for the printing head, preliminary auxiliary means etc. is preferable, because the effect of the present invention can be further stabilized. Specific examples of these may include, capping means, cleaning means, pressurization or aspiration means, preliminary heating means for effecting heating by an electrothermal transducer, another heating element or a combination thereof, and preliminary discharge means for effecting an idle discharge independent from that for printing.

Furthermore, as to the kind and number of the printing head to be mounted, there may be provided only one printing head corresponding to the ink of a single color, or plural printing heads corresponding to plural inks different in printing color or density. More specifically, the present invention is not limited to a recording mode for recording a single main color such as black, but is extremely effective also in the printing head for recording plural different colors or full color by color mixing, wherein the printing head is either integrally constructed or is composed of plural units.

Furthermore, the printing head of the present invention is applicable, not only to liquid ink, but also to ink which is solid below room temperature but softens or liquefies at room temperature, or which softens or liquefies within a temperature control range from 30° to 70° C., which is ordinarily adopted in the ink jet recording. Thus the ink only needs to be liquid when the recording signal is given. Besides the printing head of the present invention can employ ink liquefied by thermal energy provided corresponding to the recording signal, such as the ink in which the temperature elevation by thermal energy is intentionally absorbed by the state change from solid to liquid, or the ink which remains solid in the unused state for the purpose of prevention of ink evaporation. Thus the present invention is applicable to also to the case of liquefying the ink by the thermal energy provided corresponding to the recording signal and discharging thus liquefied ink, or the case of using ink which starts to solidify upon reaching the recording medium. In these cases the ink may be supported as solid or liquid in recesses or holes of a porous sheet, as described in the Japanese Patent Application Laid-open Nos. 54-56847 and 60-71260, and placed in an opposed state to the electrothermal transducer. The present invention is most effective when the above-mentioned film boiling is induced in the ink of the above-mentioned forms.

Furthermore, the ink jet recording apparatus of the present invention may assume the form of an image output terminal for an information processing equipment such as a computer, a copying apparatus combined with a reader or the like, or a facsimile apparatus having transmitting and receiving functions.

Effect of the Invention

As explained in the foregoing, the ink jet printing head of the present invention allows joining the substrate and the ceiling plate without giving heat to unnecessary parts of the ceiling plate or the substrate other than the portions to be thermally fused and thus without destruction of the fine structures such as ink paths, by providing the substrate with heat generating members for heating and fusing the end portions of the ink path walls, in positions corresponding to such ink path walls of the ceiling plate. As the heat generating members are provided corresponding to the entire joining parts of the ceiling plate, there can be achieved joining with sufficient strength without the use of the conventional spring member.

Also in case the substrate is provided with grooves of an overhanging or inversely tapered shape in positions corresponding to the joining portions of the ceiling plate and the heat generating members are provided on the bottom of such grooves, an anchoring effect can be obtained by fusing and deforming the end portions only of the joining portions in such grooves, thereby improving the adhesion and enhancing the strength of joining.

Also according to the producing method for the ink jet printing head of the present invention, the control of the timing of energization of the heat generating members allows to fuse only the end portions of the ink path walls, without elevating the temperature of the entire head or the entire ink paths.

Also in the energization of the joining heaters, the present invention allows to prevent the undesired flow of the fused resin, thus facilitating the control of the drive of the joining heaters. Also the present invention realizes uniform heating of the predetermined portions, in contract with the joining heaters, of the joining portions of the ceiling plate, and/or the adhesive layer, thereby enabling uniform fusion or curing reaction in the entire adhesive layer and improving the reliability of joining.

The present invention ensures the joining particularly in the nozzle portions, which strongly influence the discharge performance of the ink jet printing head, and reduces the leakage of the discharge energy to the adjacent nozzles in the head driving operation, thereby enabling stable discharge of liquid droplets.

Depending on the configuration of the ink jet printing head, in order to attain the joined state of higher reliability, the present invention can be also applied to the ink jet printing head of the type utilizing a pressing spring for joining the ceiling plate and the substrate or to the producing method therefor.

Also the present invention realizes a joining process without excessive fusion in the joining portions, such as nozzle walls, requiring highly reliable and precise joining in consideration of the performance of the ink jet printing head, thereby providing the ink jet printing head with sufficient joining strength.

In the present invention, the joining surface of the substrate is preferably provided in advance with an oxide layer, in order to obtain a spontaneous joining strength between the substrate and the resinous ceiling plate. The joining surface of the substrate, if composed of tantalum, scarcely generates joining strength with resin, but the close contract between the ceiling plate and the substrate can be realized by the use of auxiliary means such as a pressing spring. Consequently, even in case the materials constituting the ceiling plate and the substrate are of a combination that does not generate the spontaneous joining strength, the configurations employing the joining heaters for dispersing the local heating or differentiating the supplied energy are evidently included in the present invention.

What is claimed is:

1. A method for producing an ink jet printing head comprising:

a substrate having plural discharge energy generating elements for generating energy to be utilized for discharging an ink; and a ceiling plate of a resinous material to be joined to said substrate to constitute, between said ceiling plate and said substrate, ink paths including discharge openings for discharging said ink and plural grooves communicating with said discharge openings and formed in positions corresponding respectively to said discharge energy generating elements, said method comprising the steps of:

preparing said substrate provided with said plural discharge energy generating elements;

positioning and contacting said ceiling plate and said substrate in such a manner that said discharge energy generating elements are respectively positioned in said grooves; and thermally fusing the contacting portions of said ceiling plate with said substrate while pressing said substrate and said ceiling plate in the positioned state, thereby joining said substrate and said ceiling plate.

2. A method according to claim 1, wherein said ceiling plate is composed of a thermoplastic resin.

3. A method according to claim 1, wherein said substrate is provided with recesses in positions coming into contact with the contacting portions of said substrate, and the contacting portions of said ceiling plate with said substrate engage with said recesses.

4. A method according to claim 3, wherein said recess has an overhanging shape or an inversely tapered shape.

5. A method according to claim 3, wherein a process for forming said recesses includes steps of forming at least a recess forming layer on said substrate, and eliminating predetermined portions of said recess forming layer, corresponding to the contacting portions of said ceiling plate.

6. A method according to claim 5, wherein the elimination of layer in said recess forming process is carried out by etching.

7. A method according to claim 5, wherein the formation of layer in said recess forming process includes steps of forming a layer of a faster etching rate closer to said substrate, and forming a layer of a slower etching rate farther from said substrate.

8. A method for producing an ink jet printing head comprising:

a substrate having plural discharge energy generating elements for generating energy to be utilized for discharging an ink; and a ceiling plate of a resinous material to be joined to said substrate to constitute, between said ceiling plate and said substrate, ink paths including discharge openings for discharging said ink and plural grooves communicating with said discharge openings and formed in positions corresponding respectively to said discharge energy generating elements, said method comprising the steps of:

preparing said substrate provided with plural joining heat generation members in positions different from the positions for arranging said plural discharge energy generating elements and corresponding to joining portions of said ceiling plate; and joining said substrate and said ceiling plate by the heat generated from said joining heat generation members while the joining portions of said ceiling plate are maintained in contact with the positions of said joining heat generation members of said substrate.

9. A method according to claim 8, wherein said joining heat generation members are driven under mutually different conditions to generate heat, prior to or after the Joining of said ceiling plate and said substrate.

10. A method according to claim 8, wherein said joining heat generation members are driven in mutually different timings to generate heat, prior to or after the joining of said ceiling plate and said substrate.

11. A method for producing an ink jet printing head comprising:

a substrate having plural discharge energy generating elements for generating energy to be utilized for discharging an ink; and a ceiling plate of a resinous material to be joined to said substrate to constitute, between said ceiling plate and said substrate, ink paths including discharge openings for discharging said ink and plural grooves communicating with said discharge openings and formed in positions corresponding respectively to said discharge energy generating elements, said method comprising the steps of:

preparing said ceiling plate provided with a joining portion including two or more faces mutually constituting a step difference, at least until joining, with respect to the joining direction with said substrate;

preparing said substrate provided with heat generation members corresponding to the two or more faces of the joining portion of said ceiling plate; and respectively heating and fusing the two or more faces of the joining portion of said ceiling plate by the heat generated from said joining heat generation members while the joining portions of said ceiling plate are maintained in contact with the joining heat generation members of said substrate, thereby joining said substrate and said ceiling plate.

12. A method according to claim 11, wherein said heat generation members are driven at mutually different drive timings thereby fusing at least a part of the joining portion with said substrate.

13. A method according to claim 11, wherein, of the joining portion of said ceiling plate, a most protruded part in the joining direction with said substrate is fused earliest.

14. A method according to claim 11, wherein, in the joining, in a state where the joining portion to be fused of said ceiling plate is maintained in contact with the heat generation member of said substrate, said contacting part is thermally fused.

15. A method for producing an ink jet printing head comprising a substrate having discharge energy generation means for discharging a liquid droplet, and a grooved plate to be superposed with a surface, bearing said discharge energy generation means, of said substrate and provided with nozzle walls surrounding said discharge energy generation means, by mutually joining the end portions of said nozzle walls of said grooved plate with a surface, bearing said discharge energy generation means, of said substrate, said method comprising the steps of:

forming a resin layer, on a surface, bearing said discharge energy generation means, of said substrate, in positions where the end portions of said nozzle walls are to be superposed;

forming a cover layer, covering said resin layer, on the surface of said surface bearing said discharge energy generation means;

removing a part of said cover layer in a shape corresponding to the faces of said end portions of said nozzle walls, thereby exposing said resin layer; and thermally fusing said resin layer while the end portions of said nozzle walls are pressed to said exposed resin layer, thereby causing the resin, constituting said resin layer, to be present between the end portions of said nozzle walls and said cover layer.

16. A method according to claim 15, further comprising a step of irreversibly modifying said cover layer after thermal fusion of said resin layer.

17. A method according to claim 16, wherein said modification of said cover layer is generated by maintaining said cover layer in a heated state.

18. A method according to claim 15, wherein at least one of the end portions of said nozzle walls and the resin constituting said resin layer is composed of thermoplastic resin.

19. A method according to claim 15, wherein the end portions of said nozzle walls and said resin layer are composed of the same resin.

20. A method according to claim 15, wherein said substrate has a thermal energy generation means for heating said resin layer.

21. A method for producing an ink jet printing head comprising a substrate having discharge energy generation means for discharging a liquid droplet, and a grooved plate to be superposed with a surface, bearing said discharge energy generation means, of said substrate and provided with nozzle walls surrounding said discharge energy generation means, by mutually joining the end portions of said nozzle walls of said grooved plate with a surface, bearing said discharge energy generation means, of said substrate, said method comprising the steps of:

forming joining resin layers of an area larger than an area of the end faces of said nozzle walls, on a surface, bearing said discharge energy generation means, of said substrate, in positions where the end portions of said nozzle walls are to be superposed;

forming a cover layer, covering said resin layer, on the surface of said surface bearing said discharge energy generation means;

removing a part of said cover layer in a shape corresponding to the faces of said end portions of said nozzle walls, thereby exposing a part of each of said joining resin layers; and heating the exposed portions of said joining resin layers and the end portions of said nozzle walls in a mutually contacted state thereof, thereby joining said joining resin layers and the end portions of said nozzle walls.

22. A method according to claim 21, wherein at least one of the end portions of said nozzle walls and the resin constituting said joining resin layers is composed of a thermoplastic resin.

23. A method according to claim 21, wherein the end portions of said nozzle walls and said resin layer are composed of the same resin.

24. A method according to claim 21, wherein said substrate has a thermal energy generation means for heating the end portions of said nozzle walls and the joining portions of said joining resin layers.

25. A method for producing an ink jet printing head comprising a substrate having discharge energy generation means for discharging a liquid droplet, and a grooved plate to be superposed with a surface, bearing said discharge energy generation means, of said substrate and provided with nozzle walls surrounding said discharge energy generation means, by mutually joining the end portions of said nozzle walls of said grooved plate with a surface, bearing said discharge energy generation means, of said substrate, said method comprising the steps of:

forming built up layers of an area greater than an area of the end faces of said nozzle walls, on a surface, bearing said discharge energy generation means, of said substrate, in positions where the end portions of said nozzle walls are to be superposed;

forming a cover layer, covering said built up layers, on the surface of said surface bearing said discharge energy generation means;

removing a part of said cover layer in a shape corresponding to the faces of said end portions of said nozzle walls, thereby forming engaging windows exposing a part of each of said built up layers;

removing said built up layers in said cover layer through said engaging windows; and pressing the end portions of said nozzle walls into said cover layer through said engaging windows and expanding the end portions of said nozzle walls with plastic deformation in said cover layer.

26. A method according to claim 25, wherein the end portions of said nozzle walls are composed of a thermoplastic resin.

27. A method for producing an ink jet printing head comprising a substrate having discharge energy generation means for discharging a liquid droplet, and a grooved plate to be superposed with a surface, bearing said discharge energy generation means, of said substrate and provided with nozzle walls surrounding said discharge energy generation means, by mutually joining the end portions of said nozzle walls of said grooved plate with a surface, bearing said discharge energy generation means, of said substrate, said method comprising the steps of:

forming resin layers of an area greater than an area of the end faces of said nozzle walls, on a surface, bearing said discharge energy generation means, of said substrate, in positions where the end portions of said nozzle walls are to be superposed;

forming a cover layer, covering said resin layers, on the surface of said surface bearing said discharge energy generation means;

removing a part of said cover layer in a shape corresponding to the faces of said end portions of said nozzle walls, thereby forming engaging windows exposing a part of each of said resin layers; and pressing the end portions of said nozzle walls into said resin layers through said engaging windows and thermally fusing said resin layer, thereby expanding the end portions of said nozzle walls with plastic deformation in said cover layer and causing the resin constituting said resin layers to enter between the end portions of said nozzle walls and said cover layer.

28. A method according to claim 27, wherein at least one of the end portions of said nozzle walls and the resin constituting said resin layers is composed of a thermoplastic resin.

29. A method according to claim 27, wherein the end portions of said nozzle walls and said resin layers are composed of the same resin.

30. A method according to claim 27, wherein said substrate has a thermal energy generation means for heating said resin layers.

* * * * *

UNITED STATES PATENT AND TRADEMARK OFFICE
CERTIFICATE OF CORRECTION

PATENT NO. : 6,180,018 B1
DATED : January 30, 2001
INVENTOR(S) : Masashi Miyagawa et al.

It is certified that error appears in the above-identified patent and that said Letters Patent is hereby corrected as shown below:

Title page,
Insert Item -- [*] Notice: This patent issued on a continued pro-ecution application filed under 37 CFR 1.53(d), and is subject to the twenty year patent term provisions of 35 U.S.C. 154(a)(2). --.

Column 2,
Line 55, “being” should be deleted.

Column 3,
Line 23, “in” should be deleted; and
Line 41, “is however” should read -- is, however, --.

Column 7,
Line 17, “3A, 3B and 3C” should read -- 3A to 3C --;
Line 20, “4A, 4B, 4C, 4D and 4E” should read -- 4A to 4E --;
Line 41, “is” should read -- is a --;
Line 56, “14A, 14B, 14C and 14D” should read -- 14A to 14D --; and
Line 60, “16A, 16B, 16C, 16D, 16E, 16F, 16G and 16H” should read -- 16A to 16H --.

Column 8,
Line 16, “24A, 24B, 24C and 24D” should read -- 24A to 24D --;
Line 45, “34A, 34B, 34C, 34D and 34E” should read -- 34A to 34E --; and
Line 60, “38A, 38B, 38C, 38D and 38E” should read -- 38A to 38E --.

Column 9,
Line 39, “56A, 56B, 56C and 56D” should read -- 56A to 56D --.

Column 10,
Line 21, “FIGS. 8A” should read -- FIG. 8A --.

Column 11,
Line 9, “ladder” should read -- latter --;
Line 25, “A” should be deleted;
Line 55, “Fuji-Hunt Co.)” should read -- Fuji-Hunt Co.). --; and
Line 65, “the just” should read -- just the --.

UNITED STATES PATENT AND TRADEMARK OFFICE

CERTIFICATE OF CORRECTION

PATENT NO. : 6,180,018 B1
DATED : January 30, 2001
INVENTOR(S) : Masashi Miyagawa et al.

It is certified that error appears in the above-identified patent and that said Letters Patent is hereby corrected as shown below:

Column 12,
Line 5, “arranged,.” should read -- arranged, --;
Line 48, “material” should read -- material is --; and
Line 62, “portion” should read -- portions --.

Column 15,
Line 46, “flows” should read -- flow --;
Line 50, “of joining” should read -- the joining --; and
Line 65, “Joining” should read -- joining --.

Column 17,
Line 23, “entire” should read -- entirely --.

Column 18,
Line 10, “same.” should read -- the same. --.

Column 21,
Line 29, “a” should be deleted.

Column 22,
Line 52, “generation,” should read -- generation; --.

Column 24,
Line 22, “walls” should read -- wall --.

Column 25,
Line 45, “2091” should read -- 209’ --; and
Line 55, “2081” should read -- 208’ --.

Column 26,
Line 32, “be” should be deleted;
Line 32, “Joining” should read -- joining --;
Line 44, “in” should read -- In --; and
Lines 51 and 57, “melton” should read -- melted --.

Column 27,
Line 31, “melton” should read -- melted --; and
Line 41, “reduced” should read -- be reduced --.

UNITED STATES PATENT AND TRADEMARK OFFICE

CERTIFICATE OF CORRECTION

PATENT NO. : 6,180,018 B1
DATED : January 30, 2001
INVENTOR(S) : Masashi Miyagawa et al.

It is certified that error appears in the above-identified patent and that said Letters Patent is hereby corrected as shown below:

Column 28,
Line 33, “be” should be deleted.

Column 29,
Line 55, “nozzles” should read -- nozzle --.

Column 30,
Line 25, “melton” should read -- melted --; and
Line 30, “Joining” should read -- joining --.

Column 31,
Line 35, “joinging” should read -- joining --;
Line 48, “for a various kind” should read -- for various kinds --;
Line 58, “melton” should read -- melted --; and
Line 59, “preferably” should read -- preferable --.

Column 33,
Line 12, “(now” should read -- (not --.

Column 34,
Line 41, “p 2-3” should read -- 2-3 --.

Column 36,
Line 10, “melton” should read -- melted --.

Column 39,
Line 21, “theirs” should be deleted.

Column 40,
Line 5, “then” should read -- than --;
Line 9, “member” should read -- members --; and
Line 44, “FIG. 71” should read -- FIGS. 71 --.

Column 41,
Line 14, “rein” should read -- resin --; and
Line 41, “engage” should read -- engages --.

UNITED STATES PATENT AND TRADEMARK OFFICE

CERTIFICATE OF CORRECTION

PATENT NO. : 6,180,018 B1
DATED : January 30, 2001
INVENTOR(S) : Masashi Miyagawa et al.

It is certified that error appears in the above-identified patent and that said Letters Patent is hereby corrected as shown below:

Column 42,
Line 3, “borns” should read -- horns --; and
Lines 11 and 54, “Joining” should read -- joining --.

Column 44,
Line 15, “provide” should read -- provided --.

Column 45,
Line 50, “to” (first occurrence) should be deleted.

Signed and Sealed this

Sixth Day of December, 2005

JON W. DUDAS
*Director of the United States Patent and Trademark Office*